(12) United States Patent
Slepchenkov et al.

(10) Patent No.: US 12,316,240 B2
(45) Date of Patent: May 27, 2025

(54) MULTI-PHASE MODULE-BASED ENERGY SYSTEM FRAMEWORKS AND METHODS RELATED THERETO

(71) Applicant: TAE Technologies, Inc., Foothill Ranch, CA (US)

(72) Inventors: Mikhail Slepchenkov, Lake Forest, CA (US); Roozbeh Naderi, Foothill Ranch, CA (US)

(73) Assignee: TAE TECHNOLOGIES, INC., Foothill Ranch, CA (US)

( * ) Notice: Subject to any disclaimer, the term of this patent is extended or adjusted under 35 U.S.C. 154(b) by 0 days.

(21) Appl. No.: 18/410,818

(22) Filed: Jan. 11, 2024

(65) Prior Publication Data

US 2025/0023483 A1    Jan. 16, 2025

Related U.S. Application Data

(63) Continuation of application No. 17/952,975, filed on Sep. 26, 2022, now Pat. No. 11,894,781, which is a
(Continued)

(51) Int. Cl.
*H02M 7/00* (2006.01)
*H02J 3/38* (2006.01)
*H02J 7/00* (2006.01)

(52) U.S. Cl.
CPC .............. *H02M 7/003* (2013.01); *H02J 3/38* (2013.01); *H02J 7/0042* (2013.01)

(58) Field of Classification Search
CPC ........... H02M 7/003; H02J 3/38; H02J 7/0042
See application file for complete search history.

(56) References Cited

U.S. PATENT DOCUMENTS

2014/0022738 A1* 1/2014 Hiller .................. H05K 7/1432
361/730
2016/0344277 A1 11/2016 Peyrl et al.
(Continued)

FOREIGN PATENT DOCUMENTS

CN    103792854 A    5/2014

OTHER PUBLICATIONS

Extended Search Report in European Appln. No. 21873608.0, mailed on Oct. 23, 2024, 10 pages.
(Continued)

*Primary Examiner* — Jared Fureman
*Assistant Examiner* — Aqeel H Bukhari
(74) *Attorney, Agent, or Firm* — Alston & Bird LLP

(57) ABSTRACT

A housing and/or installation frameworks for a modular multi-level energy system includes a set of similar cabinets configured for orthogonal (e.g., vertical and horizontal) alignment of the modules. The cabinets are configured so modules of a particular phase are oriented along an axis parallel to a reference plane. Modules of the same level of the multi-level arrangement but of different phases are mounted in each cabinet, arranged such that a module for each phase is a defined distance from the reference plane. The cabinets are arranged equidistant and orthogonal to the reference plane, minimizing distance for connections between modules of the same phase across multiple cabinets, and facilitating convenient addition or removal of levels. The framework also facilitates data and reference signal connections between local control devices of the modules, and between the local control devices and a master control device for the system.

20 Claims, 33 Drawing Sheets

Related U.S. Application Data continuation of application No. 17/486,607, filed on Sep. 27, 2021, now Pat. No. 11,923,782.

(60) Provisional application No. 63/084,110, filed on Sep. 28, 2020.

(56) References Cited

U.S. PATENT DOCUMENTS

| | | | |
|---|---|---|---|
| 2020/0212511 A1* | 7/2020 | Adachi | H02J 7/007182 |
| 2020/0303929 A1* | 9/2020 | Watanabe | H02J 7/02 |
| 2021/0170887 A1* | 6/2021 | Slepchenkov | H02J 7/0013 |

OTHER PUBLICATIONS

George et al., "A Modular Multi-Level Converter for Energy Management of Hybrid Storage System in Electric Vehicles," Proceedings of the 2018 IEEE Transportation Electrification Conference and Expo (ITEC), Long Beach, CA, USA, Jun. 13-15, 2018, pp. 336-341.

* cited by examiner

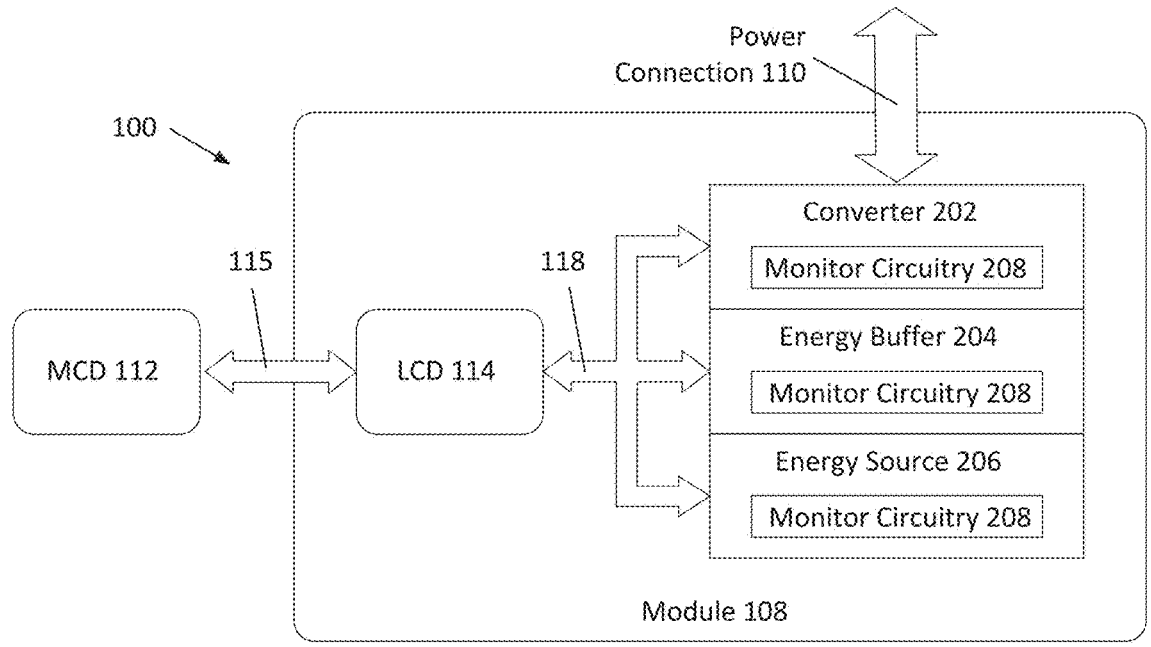
FIG. 2B
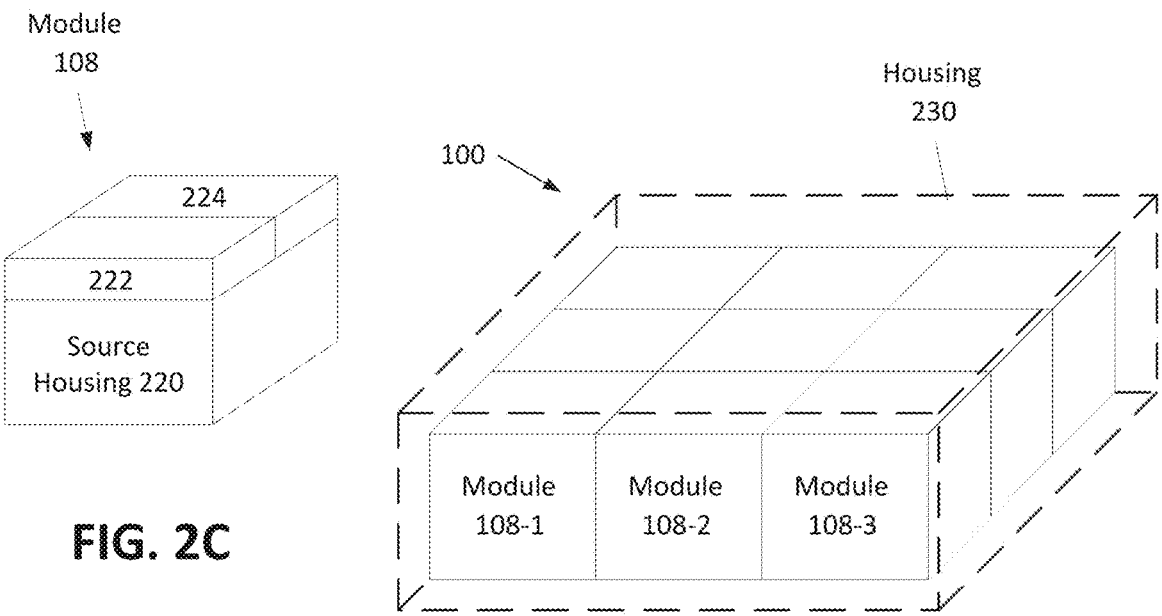
FIG. 2C
FIG. 2D

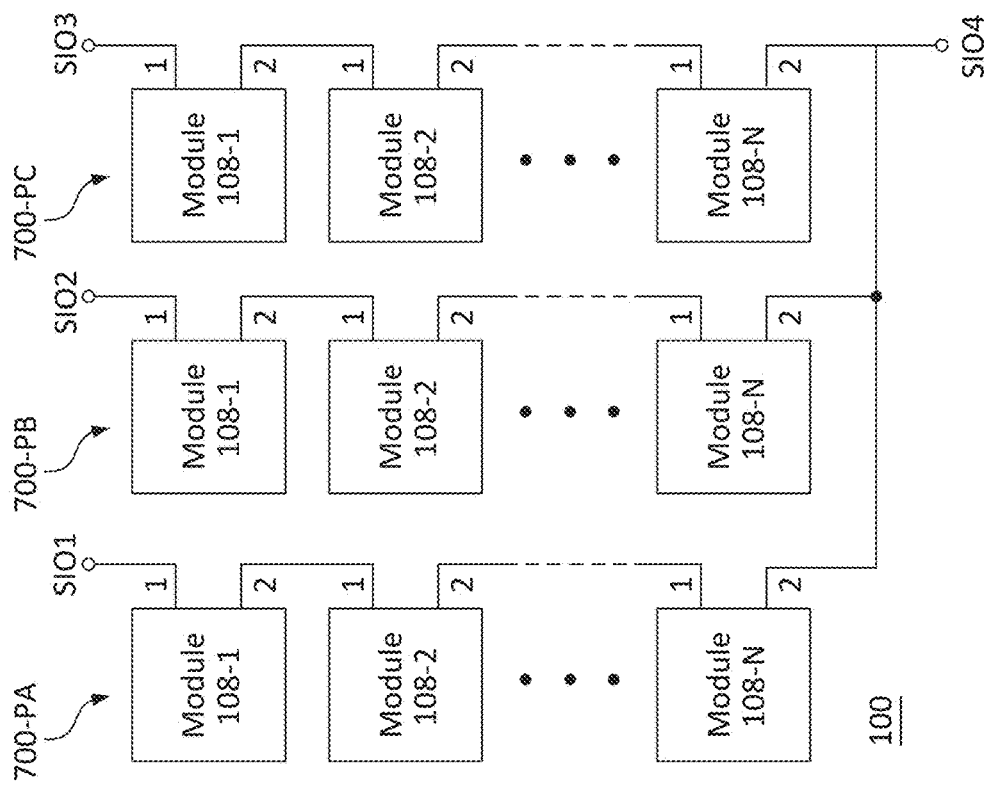
FIG. 7C
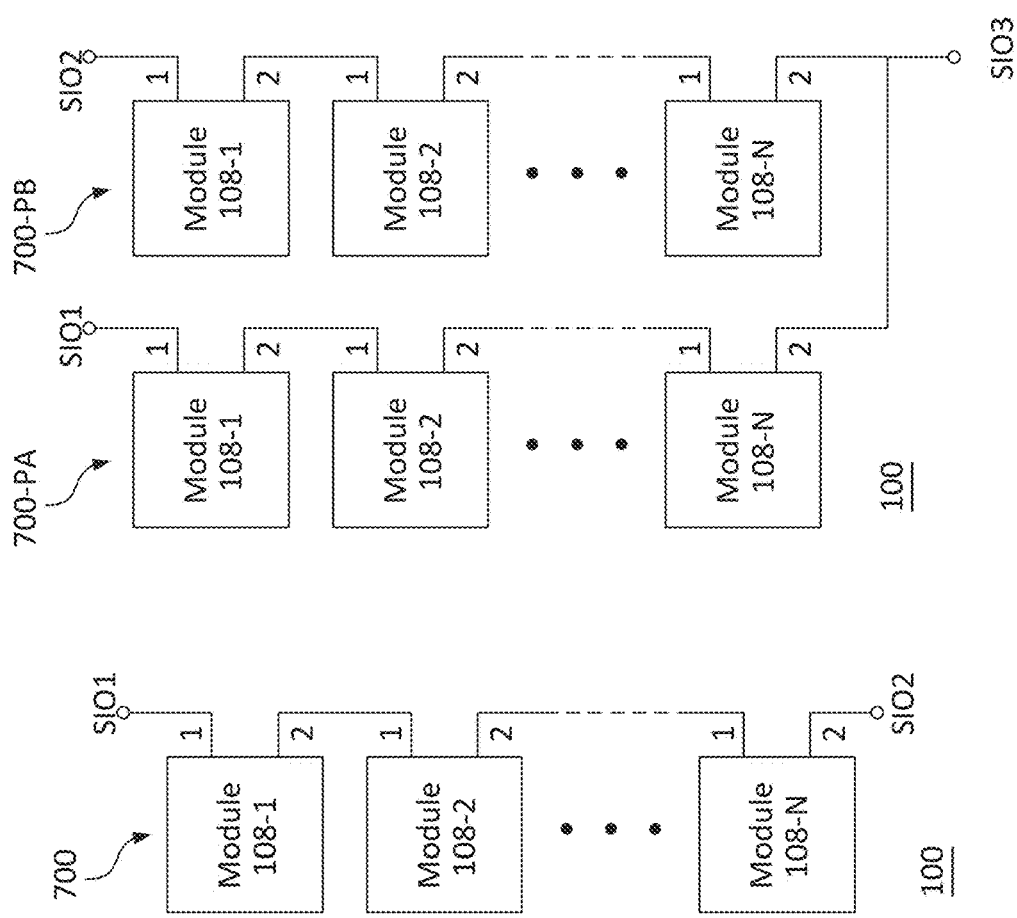
FIG. 7B
FIG. 7A

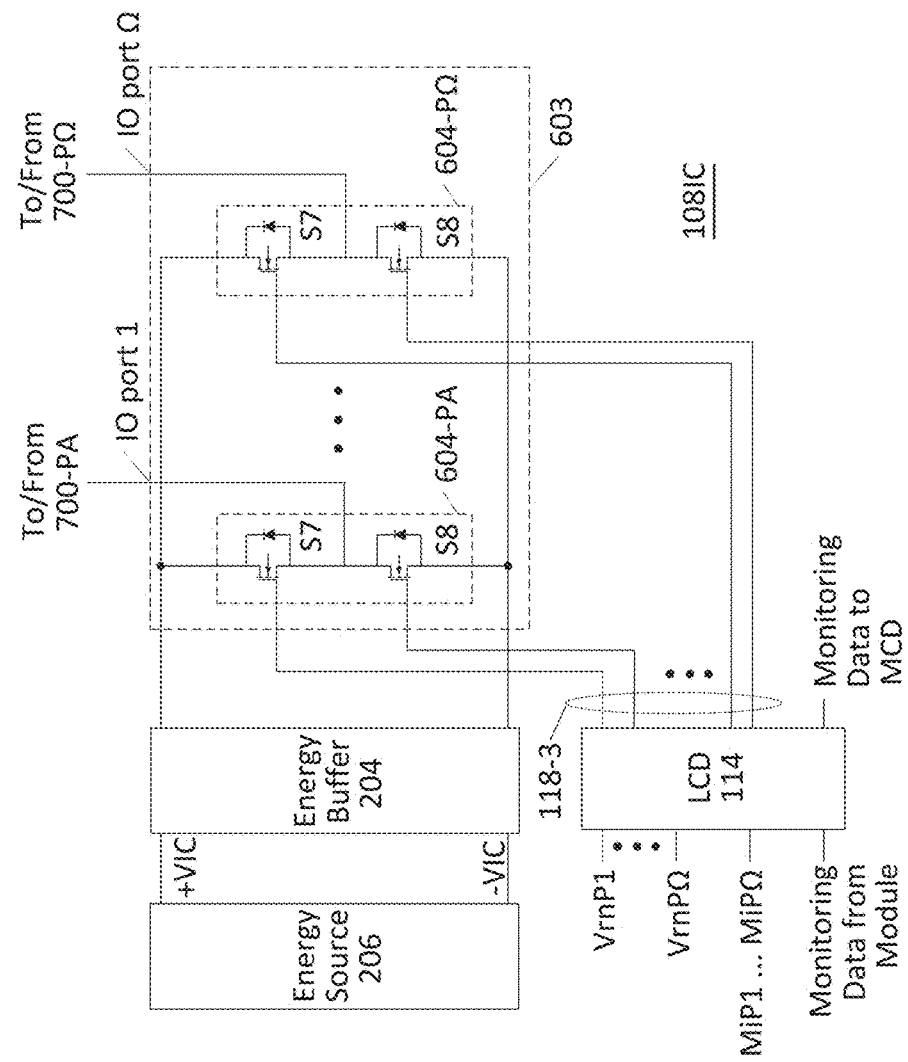
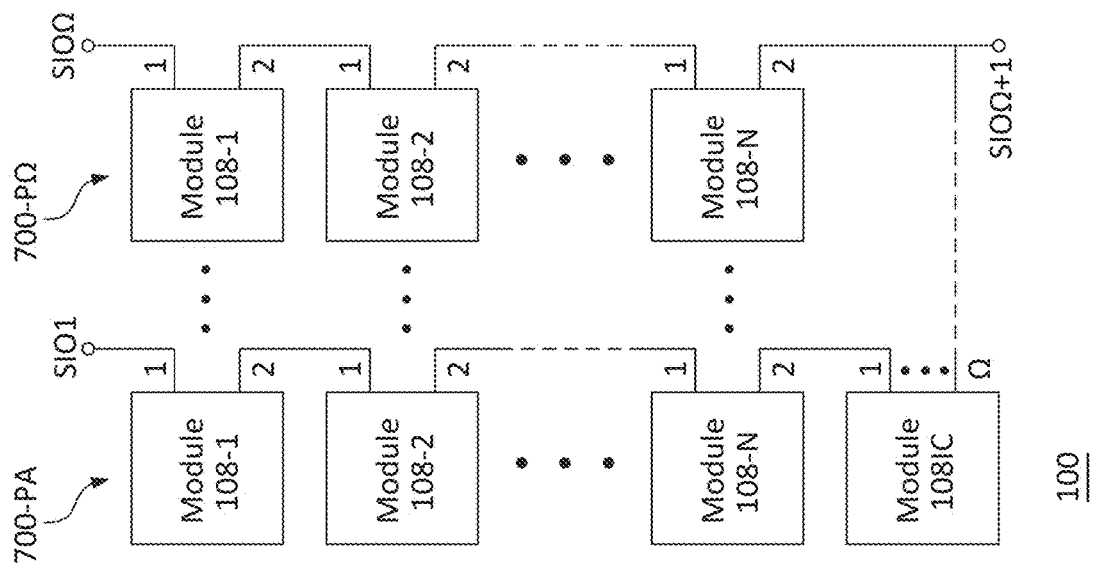
FIG. 10B
FIG. 10A

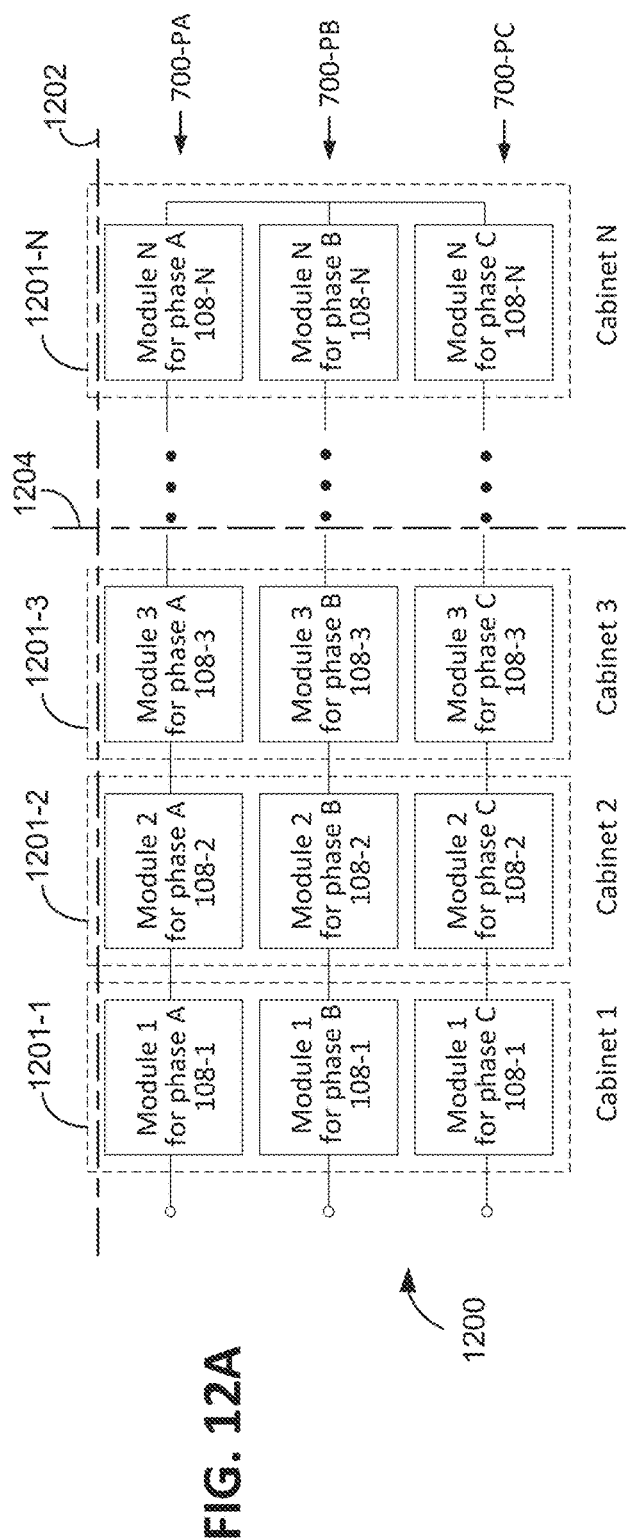
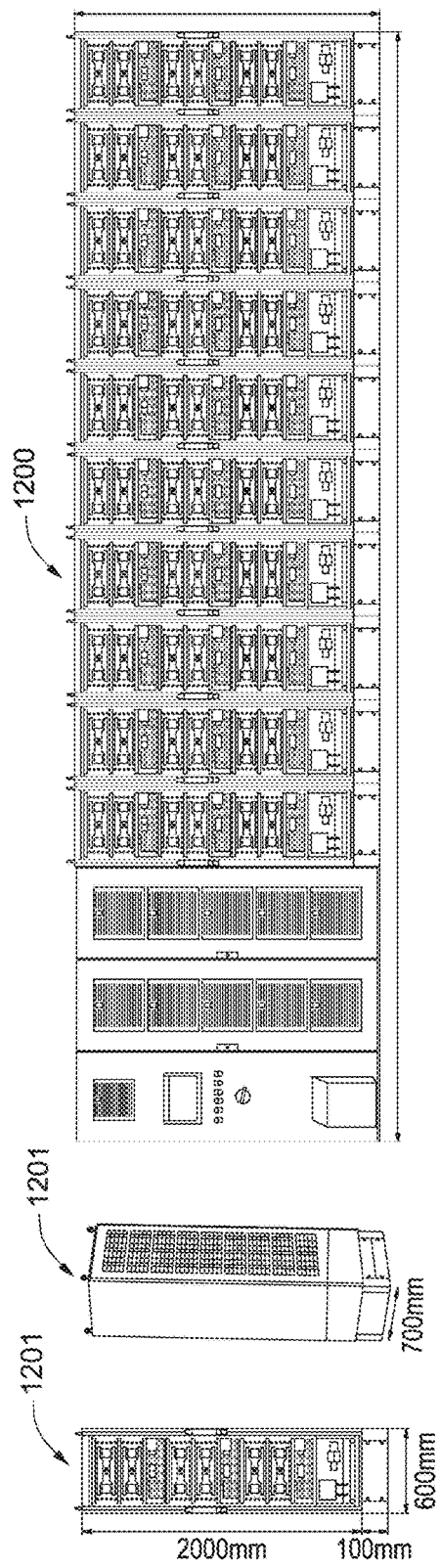
FIG. 12A
FIG. 12B
FIG. 12C
FIG. 12D

MULTI-PHASE MODULE-BASED ENERGY SYSTEM FRAMEWORKS AND METHODS RELATED THERETO

CROSS-REFERENCE TO RELATED APPLICATIONS

This patent application is a continuation (and claims the benefit of priority under 35 USC 120) of U.S. patent application Ser. No. 17/952,975, filed Sep. 26, 2022, which is a continuation (and claims the benefit of priority under 35 USC 120) of U.S. patent application Ser. No. 17/486,607, filed Sep. 27, 2021, which claims the benefit of, and priority to, U.S. Provisional Application No. 63/084,110, filed Sep. 28, 2020, all which are incorporated by reference herein in their entirety and for all purposes.

FIELD

The subject matter described herein relates generally to multi-phase module-based energy system frameworks, and systems, devices, and methods that facilitate the installation and interconnection of multi-phase module-based energy systems.

BACKGROUND

Energy systems having multiple energy sources or sinks are used in many industries. Multiple energy sources can include batteries or other energy storage devices. Prior-art systems are not well suited to high-power fixed installations, for example, industrial and other applications. New modular energy systems can be adapted for industrial scale power in stationary or large vessel applications, but systems, apparatus, and methods for installation and interconnection of the new energy systems do not exist, or are not optimized for requirements.

For these and other reasons, new and improved systems, devices, and methods for installation and interconnection of multi-phase module-based energy systems are needed.

SUMMARY

Example embodiments of systems, devices, and methods are provided herein for multi-phase module-based energy system frameworks, useful for installation, interconnection, and adaptation of the energy systems for various applications. In many of these embodiments, a module-based energy system includes multiple modules, where each module includes at least an energy source and a converter. More complex configurations of each module are also disclosed. The modules of the system can be connected together in different arrangements of varying complexities to perform functions specific to the particular technological application to which the system is applied. The system can be configured to monitor status information, at least one operating characteristic, or other parameter of each module repeatedly during use of the system, assess the state of each module based on that monitored status information, operating characteristic, or other parameter, and control each module independently in an effort to achieve and/or maintain one or more desired targets, such as electrical performance, thermal performance, lifespan, and others. This control can occur to facilitate energy provision from the system (e.g., discharging) and/or energy consumption (e.g., charging). For convenience, certain features are summarized below.

Energy sources of the modular, multi-phase energy systems may include, for example, a high energy density (HED) capacitor (such as an ultra-capacitor or super-capacitor), a battery, and/or a fuel-cell. The systems may include at least two converter-source modules connected in a one-dimensional array or in a multi-dimensional array. At least two one-dimensional arrays can be connected together, for example, at different rows and columns directly or by one or more additional modules. In such configurations, an output voltage of any shape and frequency can be generated at the outputs of the module-based energy system as a superposition of output voltages of individual modules.

Advantages of the modular multi-phase energy systems may include intraphase and inter-phase power management within a single module-based energy system (e.g., an industrial-scale battery pack) and inter-system power management between multiple module-based energy systems (e.g., battery packs), as well as connection of auxiliary loads to the system(s), and maintenance of uniform distribution of energy provided to those loads from all modules of such systems. Further advantages may include enabling the control of power sharing among modules. Such control enables, for example, regulation of parameters like State of Charge (SOC) of the energy sources of the modules to be balanced, in real time and continually during cycling, as well as at rest, which fosters utilization of the full capacity of each energy source regardless of possible differences in their capacities. In addition, such control can be used to balance the temperature of the energy sources of the modules. Temperature balancing, for example, can increase the power capability of the system (e.g., a battery pack) and provide more uniform aging of the energy sources regardless of their physical location within the system and differences in their thermal resistivity. The modular multi-phase energy systems may include multiple levels for each power phase. The levels may also be modular, enabling convenient adjustment of system capacity after installation by adding or subtracting levels.

These and similar modular multi-phase energy systems are made more practical by using a housing and/or installation framework. Useful housing and/or installation frameworks for the modular multi-level converter system are disclosed. In some embodiments, the framework is composed of a series of racks or cabinets that enable vertical and horizontal alignment of the modules. Modules of a particular phase are oriented horizontally so that all modules of one phase are located on the same or similar height off the floor or other base (e.g., same horizontal plane). The phases are stacked on top of each other, such that each phase is located at a different but shared height. Modules of the same level of the multi-level arrangement, but of different phases, may be aligned vertically to be in the same cabinet. This arrangement minimizes the distance for connections between modules of the same phase, and allows the number of levels in the system to be easily increased by simply adding another cabinet (and conversely for easy reduction of the number of levels). The framework also facilitates data and reference signal connections between local control devices, and also between the local control devices and the master control.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIGS. 2A-2B are block diagrams depicting example embodiments of a module and control system within an energy system.

FIG. 2C is a block diagram depicting an example embodiment of a physical configuration of a module.

FIG. 2D is a block diagram depicting an example embodiment of a physical configuration of a modular energy system.

FIGS. 7A-7E are block diagrams depicting example embodiments of modular energy systems having various topologies.

FIG. 10A is a block diagram depicting an example embodiment of a multiphase modular energy system having interconnection module.

FIG. 10B is a schematic diagram depicting an example embodiment of an interconnection module in the multiphase embodiment of FIG. 10A.

FIG. 12A is a block diagram depicting an example embodiment of a housing framework corresponding to the figurative arrangements shown in FIGS. 11A and 11B.

FIGS. 12B and 12C are views depicting an example embodiment of an electronic rack for use in a rack-based installation.

FIG. 12D is an elevation view depicting an example embodiment of a rack-based installation consistent with the foregoing figures.

FIGS. 14A, 14B and 14C are schematic diagrams depicting example embodiments of modules in a multi-phase module-based energy system framework.

DETAILED DESCRIPTION

Figure 1A:
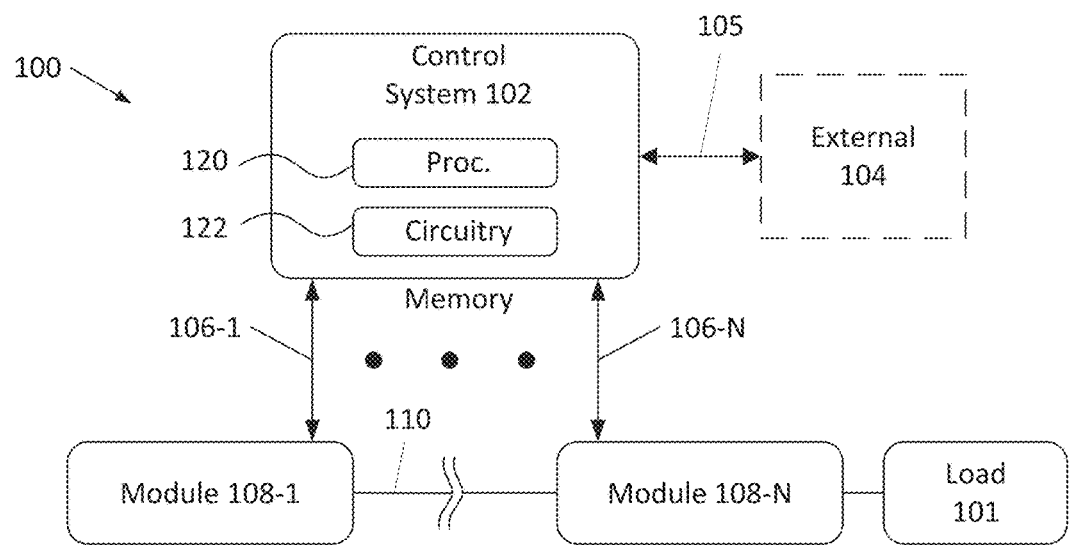
FIGS. 1A-1C are block diagrams depicting example embodiments of a modular energy system.

Before the present subject matter is described in detail, it is to be understood that this disclosure is not limited to the particular embodiments described, as such may, of course, vary. The terminology used herein is for the purpose of describing particular embodiments only, and is not intended to be limiting, since the scope of the present disclosure will be limited only by the appended claims.

Example embodiments of multi-phase module-based energy system frameworks are described herein as are: example embodiments of devices, circuitry, software, and components within such frameworks; example embodiments of methods of operating and using such frameworks; and example embodiments of applications (e.g., apparatuses, machines, grids, locales, structures, environments, etc.) in which such frameworks can be implemented or incorporated or with which such systems can be utilized. The frameworks permit ready customization to add to or detract from the number of modules present in multi-level modular converter systems for providing multi-phase power to a load.

Before describing the example embodiments pertaining to frameworks, it is first useful to describe these underlying systems in greater detail. With reference to FIGS. 1A through 10E, the following sections describe various applications in which embodiments of the modular energy systems can be implemented, embodiments of control systems or devices for the modular energy systems, configurations of the modular energy system embodiments with respect to charging sources and loads, embodiments of individual modules, embodiments of topologies for arrangement of the modules within the systems, embodiments of control methodologies, embodiments of balancing operating characteristics of modules within the systems, and embodiments of the use of interconnection modules.

Examples of Applications

Stationary applications are those in which the modular energy system is located in a fixed location during use, although it may be capable of being transported to alternative locations when not in use. The module-based energy system resides in a static location while providing electrical energy for consumption by one or more other entities, or storing or buffering energy for later consumption. Examples of stationary applications in which the embodiments disclosed herein can be used include, but are not limited to: energy systems for use by or within one or more residential structures or locales, energy systems for use by or within one or more industrial structures or locales, energy systems for use by or within one or more commercial structures or locales, energy systems for use by or within one or more governmental structures or locales (including both military and non-military uses), energy systems for charging the mobile applications described below (e.g., a charge source or a charging station), and systems that convert solar power, wind, geothermal energy, fossil fuels, or nuclear reactions into electricity for storage. Stationary applications often supply loads such as grids and microgrids, motors, and data centers. A stationary energy system can be used in either a storage or non-storage role.

Mobile applications, sometimes referred to as traction applications, are generally ones where a module-based energy system is located on or within an entity, and stores and provides electrical energy for conversion into motive force by a motor to move or assist in moving that entity. Examples of mobile entities with which the embodiments disclosed herein can be used include, but are not limited to, electric and/or hybrid entities that move over or under land, over or under sea, above and out of contact with land or sea (e.g., flying or hovering in the air), or through outer space. Examples of mobile entities with which the embodiments disclosed herein can be used include, but are not limited to, vehicles, trains, trams, ships, vessels, aircraft, and spacecraft. Examples of mobile vehicles with which the embodiments disclosed herein can be used include, but are not limited to, those having only one wheel or track, those having only two-wheels or tracks, those having only three wheels or tracks, those having only four wheels or tracks, and those having five or more wheels or tracks. Examples of mobile entities with which the embodiments disclosed herein can be used include, but are not limited to, a car, a bus, a truck, a motorcycle, a scooter, an industrial vehicle, a mining vehicle, a flying vehicle (e.g., a plane, a helicopter, a drone, etc.), a maritime vessel (e.g., commercial shipping vessels, ships, yachts, boats or other watercraft), a submarine, a locomotive or rail-based vehicle (e.g., a train, a tram, etc.), a military vehicle, a spacecraft, and a satellite.

In describing embodiments herein, reference may be made to a particular stationary application (e.g., grid, microgrid, data centers, cloud computing environments) or mobile application (e.g., an electric car). Such references are made for ease of explanation and do not mean that a particular embodiment is limited for use to only that particular mobile or stationary application. Embodiments of systems providing power to a motor can be used in both mobile and stationary applications. While certain configurations may be more suitable to some applications over others, all example embodiments disclosed herein are capable of use in both mobile and stationary applications unless otherwise noted.

Examples of Module-Based Energy Systems

FIG. 1A is a block diagram depicts an example embodiment of a module-based energy system 100. Here, system 100 includes control system 102 communicatively coupled with N converter-source modules 108-1 through 108-N, over communication paths or links 106-1 through 106-N, respectively. Modules 108 are configured to store energy and output the energy as needed to a load 101 (or other modules 108). In these embodiments, any number of two or more modules 108 can be used (e.g., N is greater than or equal to two). Modules 108 can be connected to each other in a variety of manners as will be described in more detail with respect to FIGS. 7A-7E. For ease of illustration, in FIGS. 1A-1C, modules 108 are shown connected in series, or as a one dimensional array, where the Nth module is coupled to load 101.

System 100 is configured to supply power to load 101. Load 101 can be any type of load such as a motor or a grid. System 100 is also configured to store power received from a charge source. FIG. 1F is a block diagram depicting an example embodiment of system 100 with a power input interface 151 for receiving power from a charge source 150 and a power output interface for outputting power to load 101. In this embodiment system 100 can receive and store power over interface 151 at the same time as outputting power over interface 152. FIG. 1G is a block diagram depicting another example embodiment of system 100 with a switchable interface 154. In this embodiment, system 100 can select, or be instructed to select, between receiving power from charge source 150 and outputting power to load 101. System 100 can be configured to supply multiple loads 101, including both primary and auxiliary loads, and/or receive power from multiple charge sources 150 (e.g., a utility-operated power grid and a local renewable energy source (e.g., solar)).

Figure 1B:
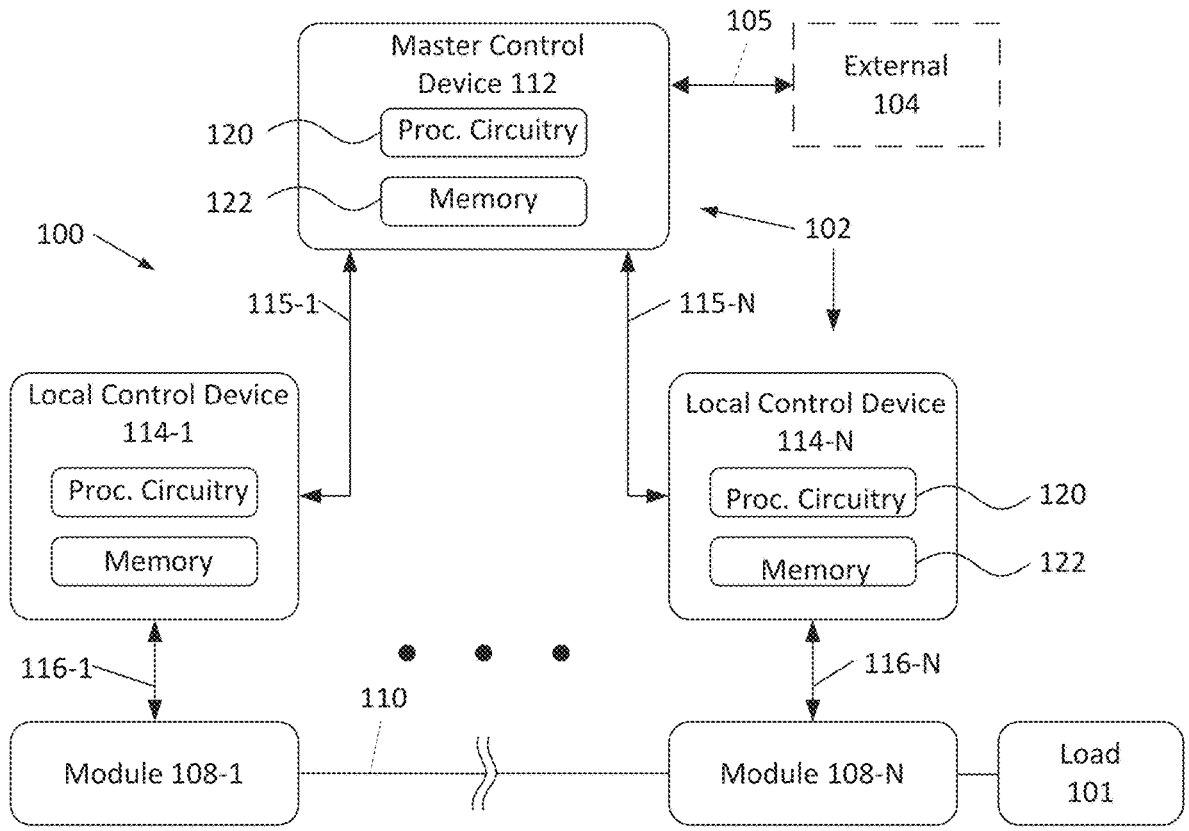

FIG. 1B depicts another example embodiment of system 100. Here, control system 102 is implemented as a master control device (MCD) 112 communicatively coupled with N different local control devices (LCDs) 114-1 through 114-N over communication paths or links 115-1 through 115-N, respectively. Each LCD 114-1 through 114-N is communicatively coupled with one module 108-1 through 108-N over communication paths or links 116-1 through 116-N, respectively, such that there is a 1:1 relationship between LCDs 114 and modules 108.

Figure 1C:
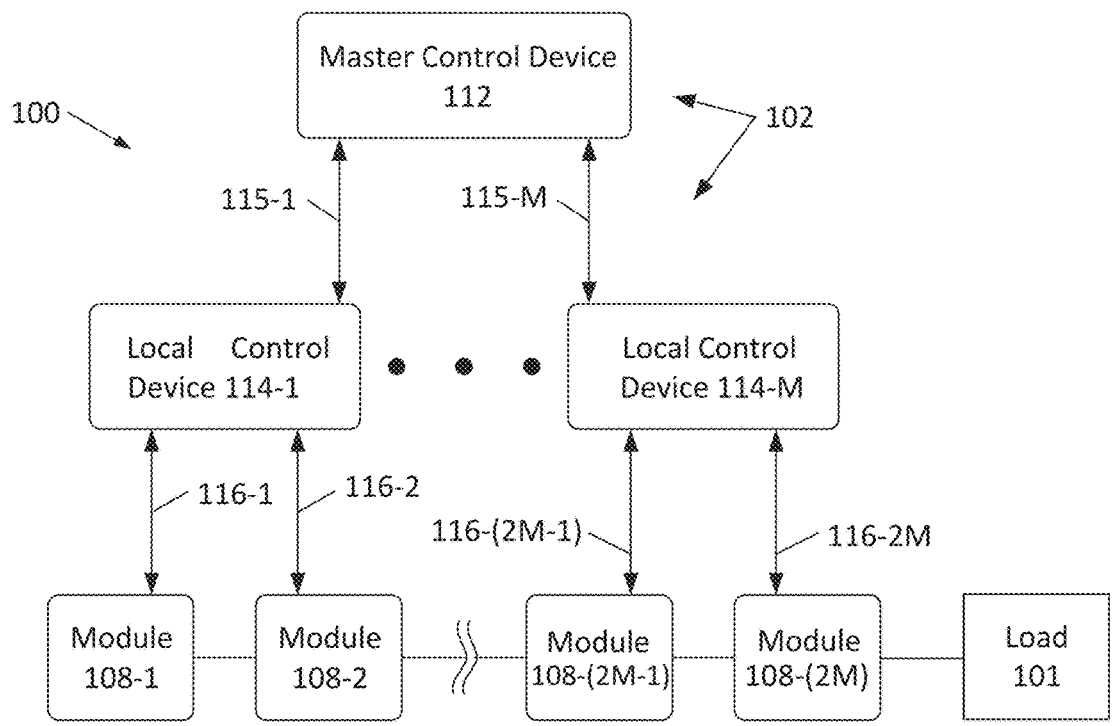

FIG. 1C depicts another example embodiment of system 100. Here, MCD 112 is communicatively coupled with M different LCDs 114-1 to 114-M over communication paths or links 115-1 to 115-M, respectively. Each LCD 114 can be coupled with and control two or more modules 108. In the example shown here, each LCD 114 is communicatively coupled with two modules 108, such that M LCDs 114-1 to 114-M are coupled with 2M modules 108-1 through 108-2M over communication paths or links 116-1 to 116-2M, respectively.

Control system 102 can be configured as a single device (e.g., FIG. 1A) for the entire system 100 or can be distributed across or implemented as multiple devices (e.g., FIGS. 1B-1C). In some embodiments, control system 102 can be distributed between LCDs 114 associated with the modules 108, such that no MCD 112 is necessary and can be omitted from system 100.

Control system 102 can be configured to execute control using software (instructions stored in memory that are executable by processing circuitry), hardware, or a combination thereof. The one or more devices of control system 102 can each include processing circuitry 120 and memory 122 as shown here. Example implementations of processing circuitry and memory are described further below.

Control system 102 can have a communicative interface for communicating with devices 104 external to system 100 over a communication link or path 105. For example, control system 102 (e.g., MCD 112) can output data or information about system 100 to another control device 104 (e.g., the Electronic Control Unit (ECU) or Motor Control Unit (MCU) of a vehicle in a mobile application, grid controller in a stationary application, etc.).

Communication paths or links 105, 106, 115, 116, and 118 (FIG. 2B) can each be wired (e.g., electrical, optical) or wireless communication paths that communicate data or information bidirectionally, in parallel or series fashion. Data can be communicated in a standardized (e.g., IEEE, ANSI) or custom (e.g., proprietary) format. In automotive applications, communication paths 115 can be configured to communicate according to FlexRay or CAN protocols. Communication paths 106, 115, 116, and 118 can also provide wired power to directly supply the operating power for system 102 from one or more modules 108. For example, the operating power for each LCD 114 can be supplied only by the one or more modules 108 to which that LCD 114 is connected and the operating power for MCD 112 can be supplied indirectly from one or more of modules 108 (e.g., such as through a car's power network).

Control system 102 is configured to control one or more modules 108 based on status information received from the same or different one or more of modules 108. Control can also be based on one or more other factors, such as requirements of load 101. Controllable aspects include, but are not limited to, one or more of voltage, current, phase, and/or output power of each module 108.

Status information of every module 108 in system 100 can be communicated to control system 102, from which system 102 can independently control every module 108-1 . . . 108-N. Other variations are possible. For example, a particular module 108 (or subset of modules 108) can be controlled based on status information of that particular module 108 (or subset), based on status information of a different module 108 that is not that particular module 108 (or subset), based on status information of all modules 108 other than that particular module 108 (or subset based on status information of that particular module 108 (or subset) and status information of at least one other module 108 that is not that particular module 108 (or subset), or based on status information of all modules 108 in system 100.

The status information can be information about one or more aspects, characteristics, or parameters of each module 108. Types of status information include, but are not limited to, the following aspects of a module 108 or one or more components thereof (e.g., energy source, energy buffer, converter, monitor circuitry): State of Charge (SOC) (e.g., the level of charge of an energy source relative to its capacity, such as a fraction or percent) of the one or more energy sources of the module, State of Health (SOH) (e.g., a figure of merit of the condition of an energy source compared to its ideal conditions) of the one or more energy sources of the module, temperature of the one or more energy sources or other components of the module, capacity of the one or more energy sources of the module, voltage of the one or more energy sources and/or other components of the module, current of the one or more energy sources and/or other components of the module, and/or the presence of absence of a fault in any one or more of the components of the module.

LCDs 114 can be configured to receive the status information from each module 108, or determine the status information from monitored signals or data received from or within each module 108, and communicate that information to MCD 112. In some embodiments, each LCD 114 can communicate raw collected data to MCD 112, which then algorithmically determines the status information on the basis of that raw data. MCD 112 can then use the status information of modules 108 to make control determinations accordingly. The determinations may take the form of instructions, commands, or other information (such as a modulation index described herein) that can be utilized by LCDs 114 to either maintain or adjust the operation of each module 108.

For example, MCD 112 may receive status information and assess that information to determine a difference between at least one module 108 (e.g., a component thereof) and at least one or more other modules 108 (e.g., comparable components thereof). For example, MDC 112 may determine that a particular module 108 is operating with one of the following conditions as compared to one or more other modules 108: with a relatively lower or higher SOC, with a relatively lower or higher SOH, with a relatively lower or higher capacity, with a relatively lower or higher voltage, with a relatively lower or higher current, with a relatively lower or higher temperature, or with or without a fault. In such examples, MCD 112 can output control information that causes the relevant aspect (e.g., output voltage, current, power, temperature) of that particular module 108 to be reduced or increased (depending on the condition). In this manner, the utilization of an outlier module 108 (e.g., operating with a relatively lower SOC or higher temperature), can be reduced so as to cause the relevant parameter of that module 108 (e.g., SOC or temperature) to converge towards that of one or more other modules 108.

The determination of whether to adjust the operation of a particular module 108 can be made by comparison of the status information to predetermined thresholds, limits, or conditions, and not necessarily by comparison to statuses of other modules 108. The predetermined thresholds, limits, or conditions can be static thresholds, limits, or conditions, such as those set by the manufacturer that do not change during use. The predetermined thresholds, limits, or conditions can be dynamic thresholds, limits, or conditions, that are permitted to change, or that do change, during use. For example, MCD 112 can adjust the operation of a module 108 if the status information for that module 108 indicates it to be operating in violation (e.g., above or below) of a predetermined threshold or limit, or outside of a predetermined range of acceptable operating conditions. Similarly, MCD 112 can adjust the operation of a module 108 if the status information for that module 108 indicates the presence of an actual or potential fault (e.g., an alarm, or warning) or indicates the absence or removal of an actual or potential fault. Examples of a fault include, but are not limited to, an actual failure of a component, a potential failure of a component, a short circuit or other excessive current condition, an open circuit, an excessive voltage condition, a failure to receive a communication, the receipt of corrupted data, and the like. Depending on the type and severity of the fault, the faulty module's utilization can be decreased to avoid damaging the module, or the module's utilization can be ceased altogether.

MCD 112 can control modules 108 within system 100 to achieve or converge towards a desired target. The target can be, for example, operation of all modules 108 at the same or similar levels with respect to each other, or within predetermined thresholds limits, or conditions. This process is also referred to as balancing or seeking to achieve balance in the operation or operating characteristics of modules 108. The term "balance" as used herein does not require absolute equality between modules 108 or components thereof, but rather is used in a broad sense to convey that operation of system 100 can be used to actively reduce disparities in operation between modules 108 that would otherwise exist.

MCD 112 can communicate control information to LCD 114 for the purpose of controlling the modules 108 associated with the LCD 114. The control information can be, e.g., a modulation index and a reference signal as described herein, a modulated reference signal, or otherwise. Each LCD 114 can use (e.g., receive and process) the control information to generate switch signals that control operation of one or more components (e.g., a converter) within the associated module(s) 108. In some embodiments, MCD 112 generates the switch signals directly and outputs them to LCD 114, which relays the switch signals to the intended module component.

All or a portion of control system 102 can be combined with a system external control device 104 that controls one or more other aspects of the mobile or stationary application. When integrated in this shared or common control device (or system), control of system 100 can be implemented in any desired fashion, such as one or more software applications executed by processing circuitry of the shared device, with hardware of the shared device, or a combination thereof. Non-exhaustive examples of external control devices 104 include: a vehicular ECU or MCU having control capability for one or more other vehicular functions (e.g., motor control, driver interface control, traction control, etc.); a grid or micro-grid controller having responsibility for one or more other power management functions (e.g., load interfacing, load power requirement forecasting, transmission and switching, interface with charge sources (e.g., diesel, solar, wind), charge source power forecasting, back up source monitoring, asset dispatch, etc.); and a data center control subsystem (e.g., environmental control, network control, backup control, etc.).

Figures 1D, 1E:
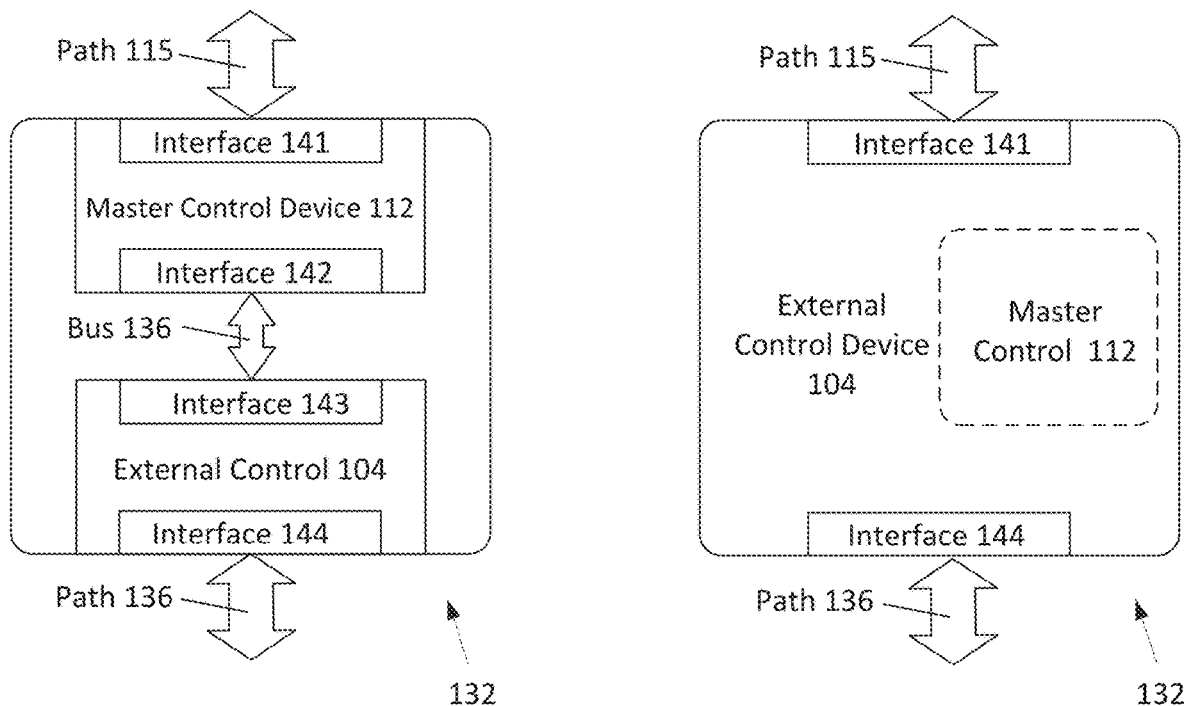
FIGS. 1D-1E are block diagrams depicting example embodiments of control devices for an energy system.
Figure 1F:
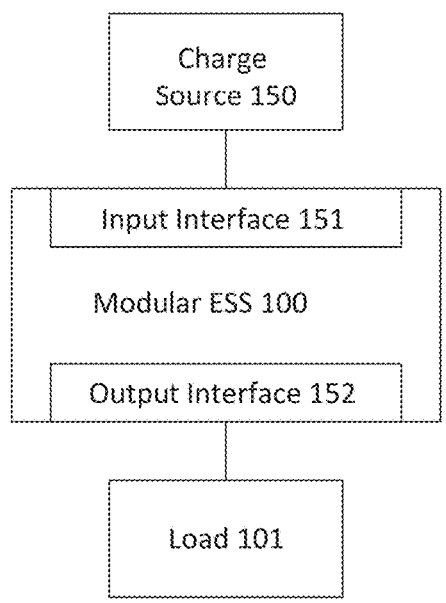
FIGS. 1F-1G are block diagrams depicting example embodiments of modular energy systems coupled with a load and a charge source.
Figure 1G:
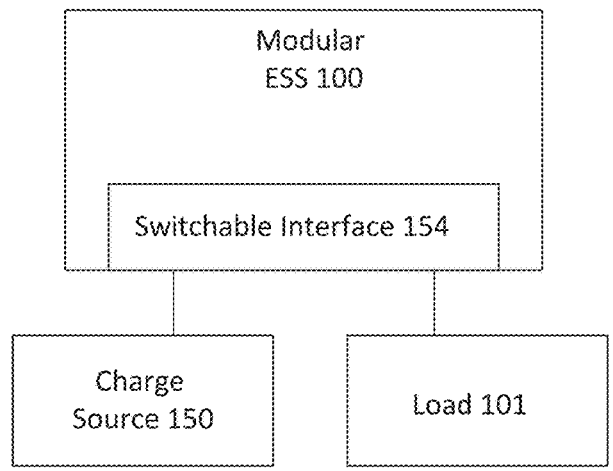

FIGS. 1D and 1E are block diagrams depicting example embodiments of a shared or common control device (or system) 132 in which control system 102 can be implemented. In FIG. 1D, common control device 132 includes master control device 112 and external control device 104. Master control device 112 includes an interface 141 for communication with LCDs 114 over path 115, as well as an interface 142 for communication with external control device 104 over internal communication bus 136. External control device 104 includes an interface 143 for communication with master control device 112 over bus 136, and an interface 144 for communication with other entities (e.g., components of the vehicle or grid) of the overall application over communication path 136. In some embodiments, common control device 132 can be integrated as a common housing or package with devices 112 and 104 implemented as discrete integrated circuit (IC) chips or packages contained therein.

In FIG. 1E, external control device 104 acts as common control device 132, with the master control functionality implemented as a component within device 104. This component 112 can be or include software or other program instructions stored and/or hardcoded within memory of device 104 and executed by processing circuitry thereof. The component can also contain dedicated hardware. The component can be a self-contained module or core, with one or more internal hardware and/or software interfaces (e.g., application program interface (API)) for communication with the operating software of external control device 104. External control device 104 can manage communication with LCDs 114 over interface 141 and other devices over interface 144. In various embodiments, device 104/132 can be integrated as a single IC chip, can be integrated into multiple IC chips in a single package, or integrated as multiple semiconductor packages within a common housing.

In the embodiments of FIGS. 1D and 1E, the master control functionality of system 102 is shared in common device 132, however, other divisions of shared control or permitted. For example, part of the master control functionality can be distributed between common device 132 and a dedicated MCD 112. In another example, both the master control functionality and at least part of the local control functionality can be implemented in common device 132 (e.g., with remaining local control functionality implemented in LCDs 114). In some embodiments, all of control system 102 is implemented in common device (or system) 132. In some embodiments, local control functionality is implemented within a device shared with another component of each module 108, such as a Battery Management System (BMS).

Examples of Modules within Cascaded Energy Systems

Figure 2A:
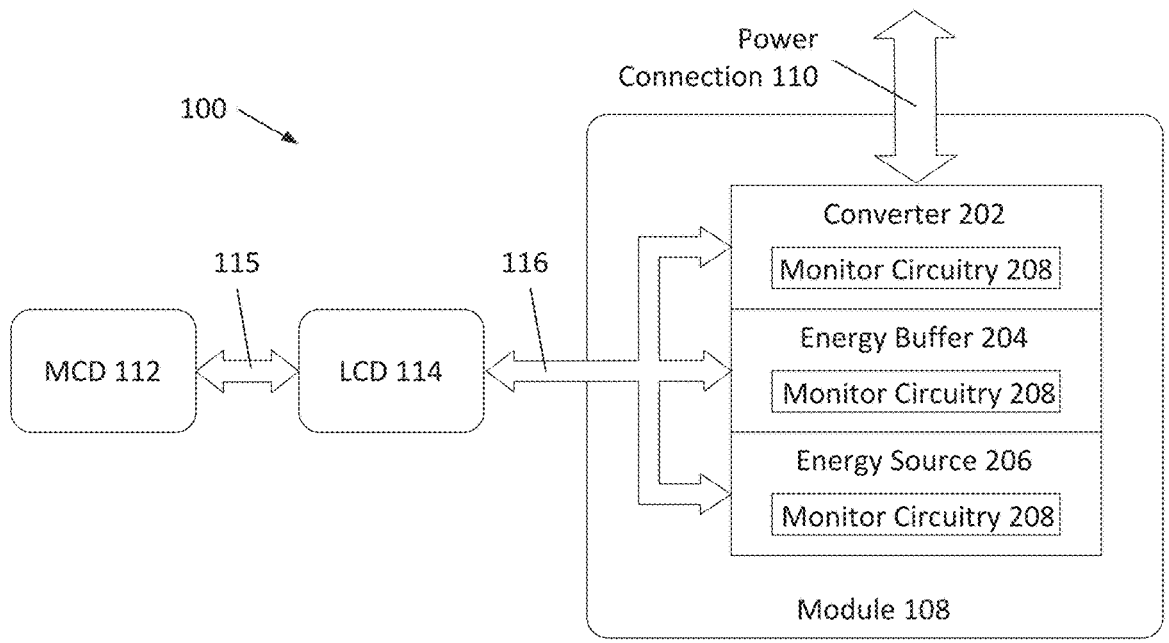

Module 108 can include one or more energy sources and a power electronics converter and, if desired, an energy buffer. FIGS. 2A-2B are block diagrams depicting additional example embodiments of system 100 with module 108 having a power converter 202, an energy buffer 204, and an energy source 206. Converter 202 can be a voltage converter or a current converter. The embodiments are described herein with reference to voltage converters, although the embodiments are not limited to such. Converter 202 can be configured to convert a direct current (DC) signal from energy source 204 into an alternating current (AC) signal and output it over power connection 110 (e.g., an inverter). Converter 202 can also receive an AC or DC signal over connection 110 and apply it to energy source 204 with either polarity in a continuous or pulsed form. Converter 202 can be or include an arrangement of switches (e.g., power transistors) such as a half bridge of full bridge (H-bridge). In some embodiments converter 202 includes only switches and the converter (and the module as a whole) does not include a transformer.

Converter 202 can be also (or alternatively) be configured to perform AC to DC conversion (e.g., a rectifier) such as to charge a DC energy source from an AC source, DC to DC conversion, and/or AC to AC conversion (e.g., in combination with an AC-DC converter). In some embodiments, such as to perform AC-AC conversion, converter 202 can include a transformer, either alone or in combination with one or more power semiconductors (e.g., switches, diodes, thyristors, and the like). In other embodiments, such as those where weight and cost is a significant factor, converter 202 can be configured to perform the conversions with only power switches, power diodes, or other semiconductor devices and without a transformer.

Energy source 206 is preferably a robust energy storage device capable of outputting direct current and having an energy density suitable for energy storage applications for electrically powered devices. The fuel cell can be a single fuel cell, multiple fuel cells connected in series or parallel, or a fuel cell module. Two or more energy sources can be included in each module, and the two or more sources can include two batteries of the same or different type, two capacitors of the same or different type, two fuel cells of the same or different type, one or more batteries combined with one or more capacitors and/or fuel cells, and one or more capacitors combined with one or more fuel cells.

Figure 4A:
FIGS. 4A-4F are schematic views depicting example embodiments of energy sources.
Figure 4B:
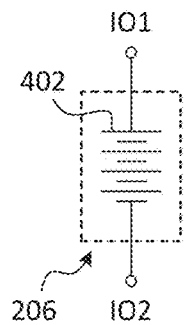
Figure 4C:
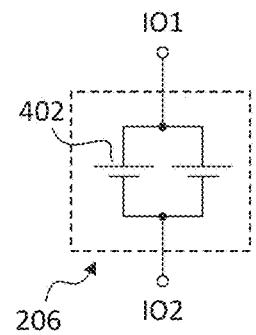
Figure 4D:
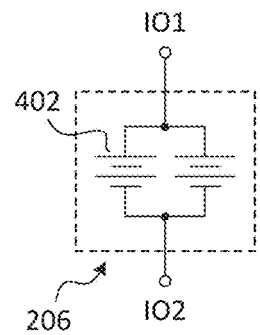

Energy source 206 can be an electrochemical battery, such as a single battery cell or multiple battery cells connected together in a battery module or array, or any combination thereof. FIGS. 4A-4D are schematic diagrams depicting example embodiments of energy source 206 configured as a single battery cell 402 (FIG. 4A), a battery module with a series connection of four cells 402 (FIG. 4B), a battery module with a parallel connection of single cells 402 (FIG. 4C), and a battery module with a parallel connection with legs having two cells 402 each (FIG. 4D). Examples of batteries types include solid state batteries, liquid electrotype based batteries, liquid phase batteries as well as flow batteries such as lithium (Li) metal batteries, Li ion batteries, Li air batteries, sodium ion batteries, potassium ion batteries, magnesium ion batteries, alkaline batteries, nickel metal hydride batteries, nickel sulfate batteries, lead acid batteries, zinc-air batteries, and others. Some examples of Li ion battery types include Li cobalt oxide (LCO), Li manganese oxide (LMO), Li nickel manganese cobalt oxide (NMC), Li iron phosphate (LFP), Lithium nickel cobalt aluminum oxide (NCA), and Li titanate (LTO).

Energy source 206 can also be a high energy density (HED) capacitor, such as an ultracapacitor or supercapacitor. An HED capacitor can be configured as a double layer capacitor (electrostatic charge storage), pseudocapacitor (electrochemical charge storage), hybrid capacitor (electrostatic and electrochemical), or otherwise, as opposed to a solid dielectric type of a typical electrolytic capacitor. The HED capacitor can have an energy density of 10 to 100 times (or higher) that of an electrolytic capacitor, in addition to a higher capacity. For example, HED capacitors can have a specific energy greater than 1.0 watt hours per kilogram (Wh/kg), and a capacitance greater than 10-100 farads (F). As with the batteries described with respect to FIGS. 4A-4D, energy source 206 can be configured as a single HED capacitor or multiple HED capacitors connected together in an array (e.g., series, parallel, or a combination thereof).

Energy source 206 can also be a fuel cell. Examples of fuel cells include proton-exchange membrane fuel cells (PEMFC), phosphoric acid fuel cells (PAFC), solid acid fuel cells, alkaline fuel cells, high temperature fuel cells, solid oxide fuel cells, molten electrolyte fuel cells, and others. As with the batteries described with respect to FIGS. 4A-4D, energy source 206 can be configured as a single fuel cell or multiple fuel cells connected together in an array (e.g., series, parallel, or a combination thereof). The aforementioned examples of batteries, capacitors, and fuel cells are not intended to form an exhaustive list, and those of ordinary skill in the art will recognize other variants that fall within the scope of the present subject matter.

Energy buffer 204 can dampen or filter fluctuations in current across the DC line or link (e.g., $+L_{DCL}$ and $-V_{DCL}$ as described below), to assist in maintaining stability in the DC link voltage. These fluctuations can be relatively low (e.g., kilohertz) or high (e.g., megahertz) frequency fluctuations or harmonics caused by the switching of converter 202, or other transients. These fluctuations can be absorbed by buffer 204 instead of being passed to source 206 or to ports IO3 and IO4 of converter 202.

Power connection 110 is a connection for transferring energy or power to, from and through module 108. Module 108 can output energy from energy source 206 to power connection 110, where it can be transferred to other modules of the system or to a load. Module 108 can also receive energy from other modules 108 or a charging source (DC charger, single phase charger, multi-phase charger). Signals can also be passed through module 108 bypassing energy source 206. The routing of energy or power into and out of module 108 is performed by converter 202 under the control of LCD 114 (or another entity of system 102).

In the embodiment of FIG. 2A, LCD 114 is implemented as a component separate from module 108 (e.g., not within a shared module housing) and is connected to and capable of communication with converter 202 via communication path 116. In the embodiment of FIG. 2B, LCD 114 is included as a component of module 108 and is connected to and capable of communication with converter 202 via internal communication path 118 (e.g., a shared bus or discrete connections). LCD 114 can also be capable of receiving signals from, and transmitting signals to, energy buffer 204 and/or energy source 206 over paths 116 or 118.

Module 108 can also include monitor circuitry 208 configured to monitor (e.g., collect, sense, measure, and/or determine) one or more aspects of module 108 and/or the components thereof, such as voltage, current, temperature or other operating parameters that constitute status information (or can be used to determine status information by, e.g., LCD 114). A main function of the status information is to describe the state of the one or more energy sources 206 of the module 108 to enable determinations as to how much to utilize the energy source in comparison to other sources in system 100, although status information describing the state of other components (e.g., voltage, temperature, and/or presence of a fault in buffer 204, temperature and/or presence of a fault in converter 202, presence of a fault elsewhere in module 108, etc.) can be used in the utilization determination as well. Monitor circuitry 208 can include one or more sensors, shunts, dividers, fault detectors, Coulomb counters, controllers or other hardware and/or software configured to monitor such aspects. Monitor circuitry 208 can be separate from the various components 202, 204, and 206, or can be integrated with each component 202, 204, and 206 (as shown in FIGS. 2A-2B), or any combination thereof. In some embodiments, monitor circuitry 208 can be part of or shared with a Battery Management System (BMS) for a battery energy source 204. Discrete circuitry is not needed to monitor each type of status information, as more than one type of status information can be monitored with a single circuit or device, or otherwise algorithmically determined without the need for additional circuits.

LCD 114 can receive status information (or raw data) about the module components over communication paths 116, 118. LCD 114 can also transmit information to module components over paths 116, 118. Paths 116 and 118 can include diagnostics, measurement, protection, and control signal lines. The transmitted information can be control signals for one or more module components. The control signals can be switch signals for converter 202 and/or one or more signals that request the status information from module components. For example, LCD 114 can cause the status information to be transmitted over paths 116, 118 by requesting the status information directly, or by applying a stimulus (e.g., voltage) to cause the status information to be generated, in some cases in combination with switch signals that place converter 202 in a particular state.

The physical configuration or layout of module 108 can take various forms. In some embodiments, module 108 can include a common housing in which all module components, e.g., converter 202, buffer 204, and source 206, are housed, along with other optional components such as an integrated LCD 114. In other embodiments, the various components can be separated in discrete housings that are secured together. FIG. 2C is a block diagram depicting an example embodiment of a module 108 having a first housing 220 that holds an energy source 206 of the module and accompanying electronics such as monitor circuitry, a second housing 222 that holds module electronics such as converter 202, energy buffer 204, and other accompany electronics such as monitor circuitry, and a third housing 224 that holds LCD 114 for the module 108. Electrical connections between the various module components can proceed through the housings 220, 222, 224 and can be exposed on any of the housing exteriors for connection with other devices such as other modules 108 or MCD 112.

Modules 108 of system 100 can be physically arranged with respect to each other in various configurations that depend on the needs of the application and the number of loads. For example, in a stationary application where system 100 provides power for a microgrid, modules 108 can be placed in one or more racks or other frameworks. Such configurations may be suitable for larger mobile applications as well, such as maritime vessels. Alternatively, modules 108 can be secured together and located within a common housing, referred to as a pack. A rack or a pack may have its own dedicated cooling system shared across all modules. Pack configurations are useful for smaller mobile applications such as electric cars. System 100 can be implemented with one or more racks (e.g., for parallel supply to a microgrid) or one or more packs (e.g., serving different motors of the vehicle), or combination thereof. FIG. 2D is a block diagram depicting an example embodiment of system 100 configured as a pack with nine modules 108 electrically and physically coupled together within a common housing 230.

Examples of these and further configurations are described in Int'l. Appl. No. PCT/US20/25366, filed Mar. 27, 2020 and titled Module-Based Energy Systems Capable of Cascaded and Interconnected Configurations, and Methods Related Thereto, which is incorporated by reference herein in its entirety for all purposes.

Figure 3A:
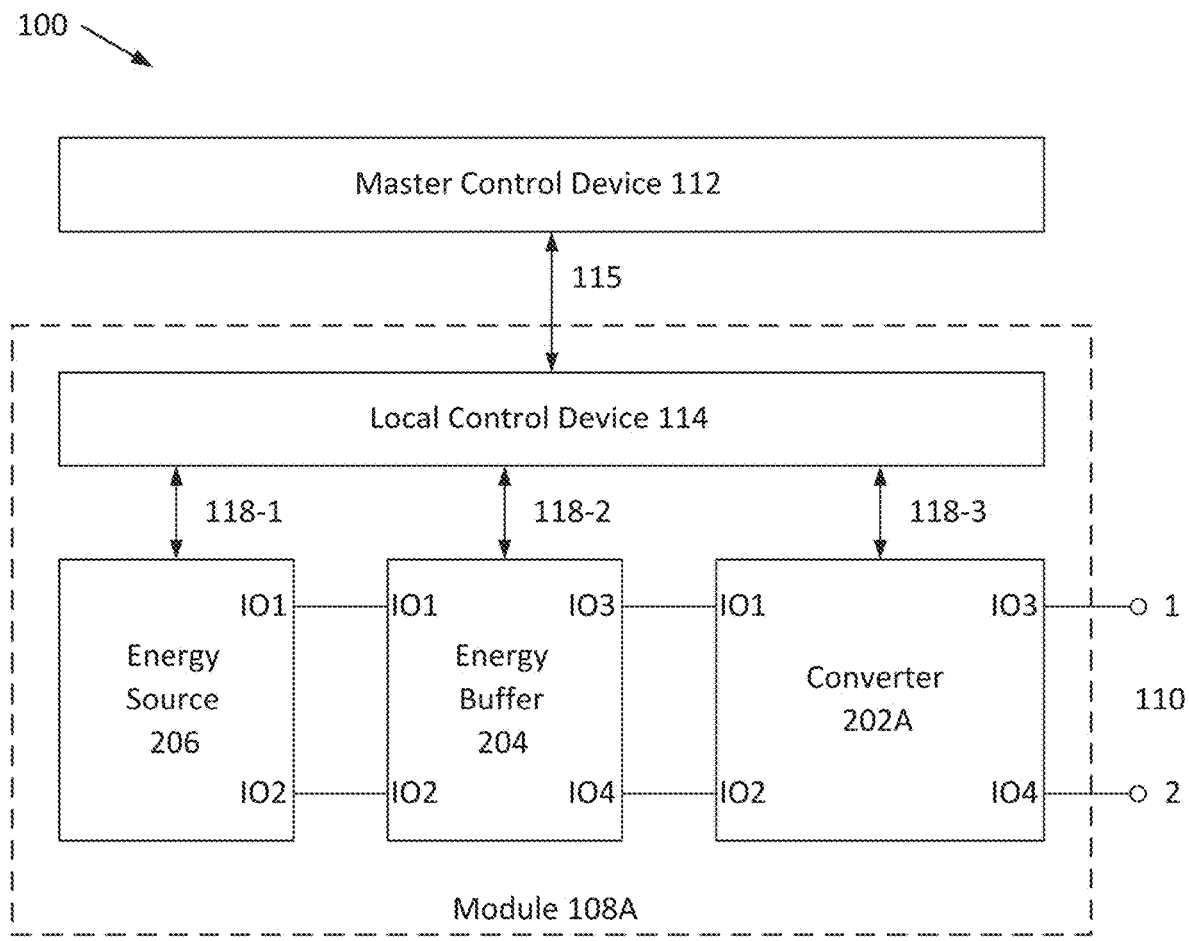
FIGS. 3A-3C are block diagrams depicting example embodiments of modules having various electrical configurations.
Figure 3B:
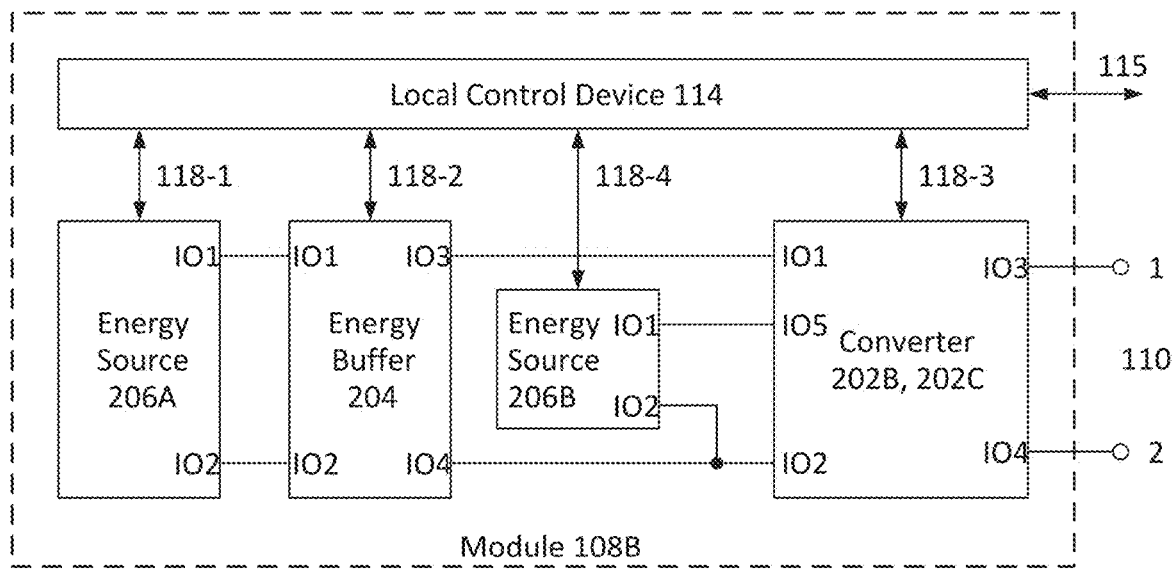
Figure 3C:
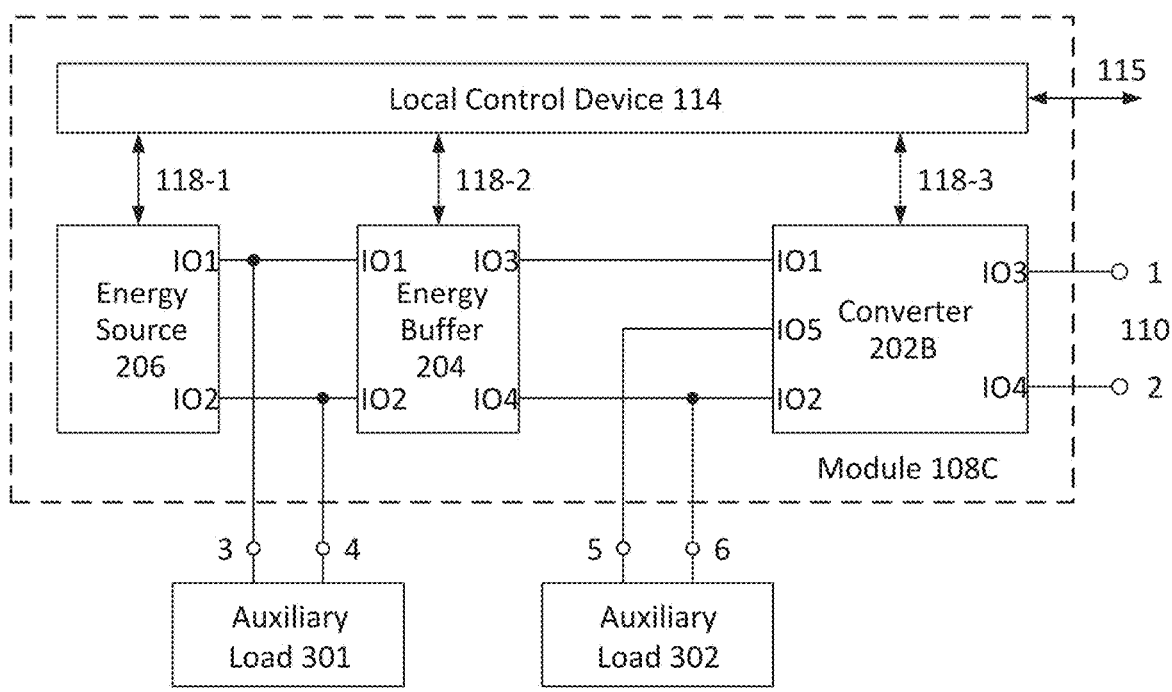

FIGS. 3A-3C are block diagrams depicting example embodiments of modules 108 having various electrical configurations. These embodiments are described as having one LCD 114 per module 108, with the LCD 114 housed within the associated module, but can be configured otherwise as described herein. FIG. 3A depicts a first example configuration of a module 108A within system 100. Module 108A includes energy source 206, energy buffer 204, and converter 202A. Each component has power connection ports (e.g., terminals, connectors) into which power can be input and/or from which power can be output, referred to herein as IO ports. Such ports can also be referred to as input ports or output ports depending on the context.

Figure 5A:
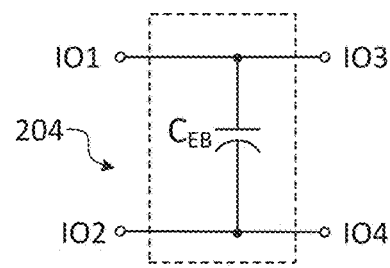
FIGS. 5A-5C are schematic views depicting example embodiments of energy buffers.
Figure 5B:
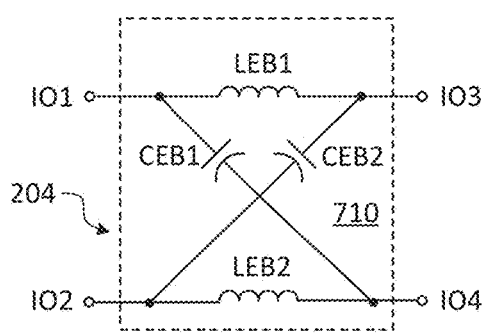
Figure 5C:
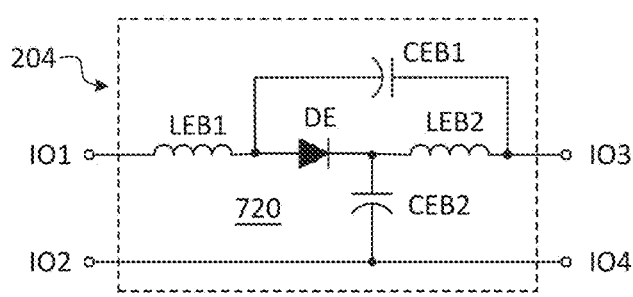

Energy source 206 can be configured as any of the energy source types described herein (e.g., a battery as described with respect to FIGS. 4A-4D, an HED capacitor, a fuel cell, or otherwise). Ports IO1 and IO2 of energy source 206 can be connected to ports IO1 and IO2, respectively, of energy buffer 204. Energy buffer 204 can be configured to buffer or filter high and low frequency energy pulsations arriving at buffer 204 through converter 202, which can otherwise degrade the performance of module 108. The topology and components for buffer 204 are selected to accommodate the maximum permissible amplitude of these high frequency voltage pulsations. Several (non-exhaustive) example embodiments of energy buffer 204 are depicted in the schematic diagrams of FIGS. 5A-5C. In FIG. 5A, buffer 204 is an electrolytic and/or film capacitor $C_{EB}$, in FIG. 5B buffer 204 is a Z-source network 710, formed by two inductors $L_{EB1}$ and $L_{EB2}$ and two electrolytic and/or film capacitors $C_{EB1}$ and $C_{EB2}$, and in FIG. 5C buffer 204 is a quasi Z-source network 720, formed by two inductors $L_{EB1}$ and $L_{EB2}$, two electrolytic and/or film capacitors $C_{EB1}$ and $C_{EB2}$ and a diode $D_{EB}$.

Figure 6A:
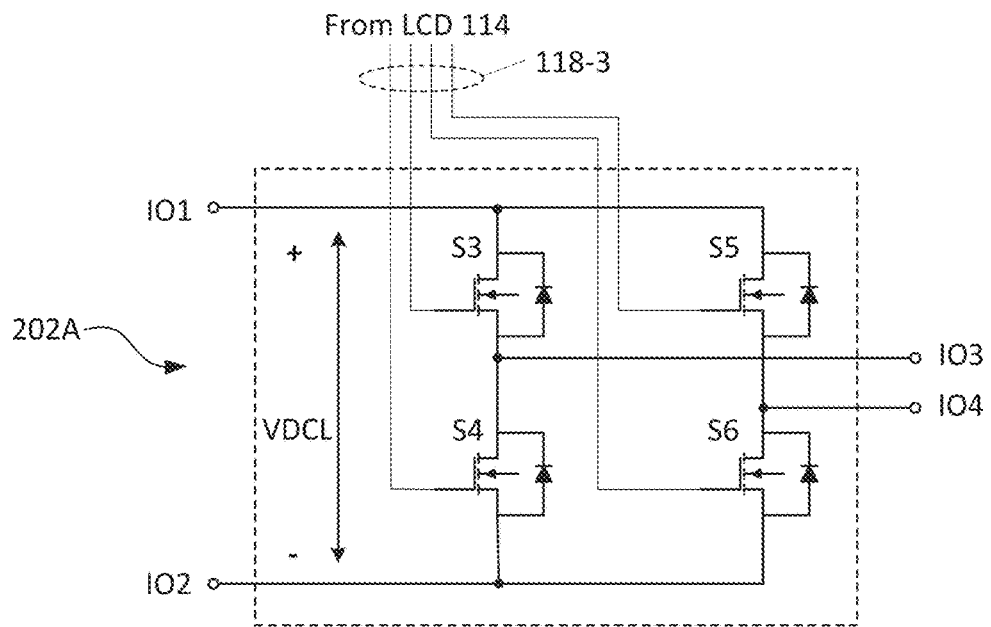
FIGS. 6A-6C are schematic views depicting example embodiments of converters.

Ports IO3 and IO4 of energy buffer 204 can be connected to ports IO1 and IO2, respectively, of converter 202A, which can be configured as any of the power converter types described herein. FIG. 6A is a schematic diagram depicting an example embodiment of converter 202A configured as a DC-AC converter that can receive a DC voltage at ports IO1 and IO2 and switch to generate pulses at ports IO3 and IO4. Converter 202A can include multiple switches, and here converter 202A includes four switches S3, S4, S5, S6 arranged in a full bridge configuration. Control system 102 or LCD 114 can independently control each switch via control input lines 118-3 to each gate.

The switches can be any suitable switch type, such as power semiconductors like the metal-oxide-semiconductor field-effect transistors (MOSFETs) shown here, insulated gate bipolar transistors (IGBTs), or gallium nitride (GaN) transistors. Semiconductor switches can operate at relatively high switching frequencies, thereby permitting converter 202 to be operated in pulse-width modulated (PWM) mode if desired, and to respond to control commands within a relatively short interval of time. This can provide a high tolerance of output voltage regulation and fast dynamic behavior in transient modes.

In this embodiment, a DC line voltage $V_{DCL}$ can be applied to converter 202 between ports IO1 and IO2. By connecting $V_{DCL}$ to ports IO3 and IO4 by different combinations of switches S3, S4, S5, S6, converter 202 can generate three different voltage outputs at ports IO3 and IO4: $+V_{DCL}$, 0, and $-V_{DCL}$. A switch signal provided to each switch controls whether the switch is on (closed) or off (open). To obtain $+V_{DCL}$ switches S3 and S6 are turned on while S4 and S5 are turned off, whereas $-V_{DCL}$ can be obtained by turning on switches S4 and S5 and turning off S3 and S6. The output voltage can be set to zero (including near zero) or a reference voltage by turning on S3 and S5 with S4 and S6 off, or by turning on S4 and S6 with S3 and S5 off. These voltages can be output from module 108 over power connection 110. Ports IO3 and 104 of converter 202 can be connected to (or form) module IO ports 1 and 2 of power connection 110, so as to generate the output voltage for use with output voltages from other modules 108.

Figure 8A:
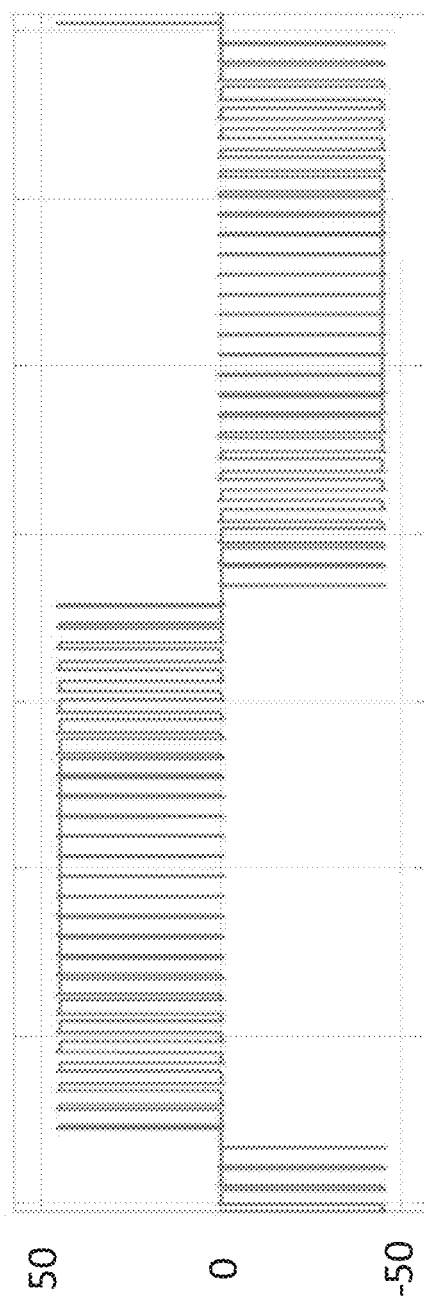
FIG. 8A is a plot depicting an example output voltage of a module.

The control or switch signals for the embodiments of converter 202 described herein can be generated in different ways depending on the control technique utilized by system 100 to generate the output voltage of converter 202. In some embodiments, the control technique is a PWM technique such as space vector pulse-width modulation (SVPWM) or sinusoidal pulse-width modulation (SPWM), or variations thereof. FIG. 8A is a graph of voltage versus time depicting an example of an output voltage waveform 802 of converter 202. For ease of description, the embodiments herein will be described in the context of a PWM control technique, although the embodiments are not limited to such. Other classes of techniques can be used. One alternative class is based on hysteresis, examples of which are described in Int'l Publ. Nos. WO 2018/231810A1, WO 2018/232403A1, and WO 2019/183553A1, which are incorporated by reference herein for all purposes.

Each module 108 can be configured with multiple energy sources 206 (e.g., two, three, four, or more). Each energy source 206 of module 108 can be controllable (switchable) to supply power to connection 110 (or receive power from a charge source) independent of the other sources 206 of the module. For example, all sources 206 can output power to connection 110 (or be charged) at the same time, or only one (or a subset) of sources 206 can supply power (or be charged) at any one time. In some embodiments, the sources 206 of the module can exchange energy between them, e.g., one source 206 can charge another source 206. Each of the sources 206 can be configured as any energy source described herein (e.g., battery, HED capacitor, fuel cell). Each of the sources 206 can be the same type (e.g., each can be a battery), or a different type (e.g., a first source can be a battery and a second source can be an HED capacitor, or a first source can be a battery having a first type (e.g., NMC) and a second source can be a battery having a second type (e.g., LFP).

FIG. 3B is a block diagram depicting an example embodiment of a module 108B in a dual energy source configuration with a primary energy source 206A and secondary energy source 206B. Ports IO1 and IO2 of primary source 202A can be connected to ports IO1 and IO2 of energy buffer 204. Module 108B includes a converter 202B having an additional IO port. Ports IO3 and IO4 of buffer 204 can be connected ports IO1 and IO2, respectively, of converter 202B. Ports IO1 and IO2 of secondary source 206B can be connected to ports IO5 and IO2, respectively, of converter 202B (also connected to port 104 of buffer 204).

In this example embodiment of module 108B, primary energy source 202A, along with the other modules 108 of system 100, supplies the average power needed by the load. Secondary source 202B can serve the function of assisting energy source 202 by providing additional power at load power peaks, or absorbing excess power, or otherwise.

Figure 4E:
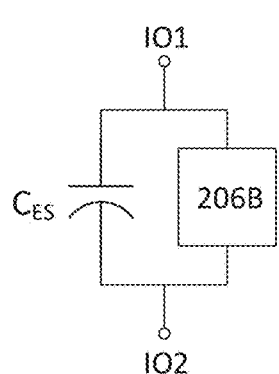
Figure 4F:
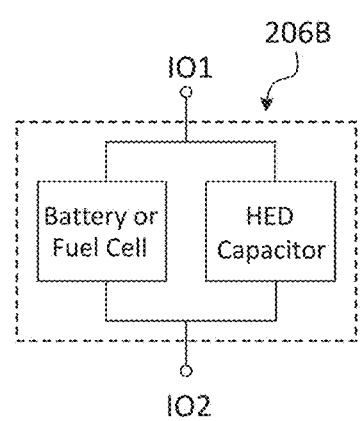

As mentioned both primary source 206A and secondary source 206B can be utilized simultaneously or at separate times depending on the switch state of converter 202B. If at the same time, an electrolytic and/or a film capacitor (CES) can be placed in parallel with source 206B as depicted in FIG. 4E to act as an energy buffer for the source 206B, or energy source 206B can be configured to utilize an HED capacitor in parallel with another energy source (e.g., a battery or fuel cell) as depicted in FIG. 4F.

Figure 6B:
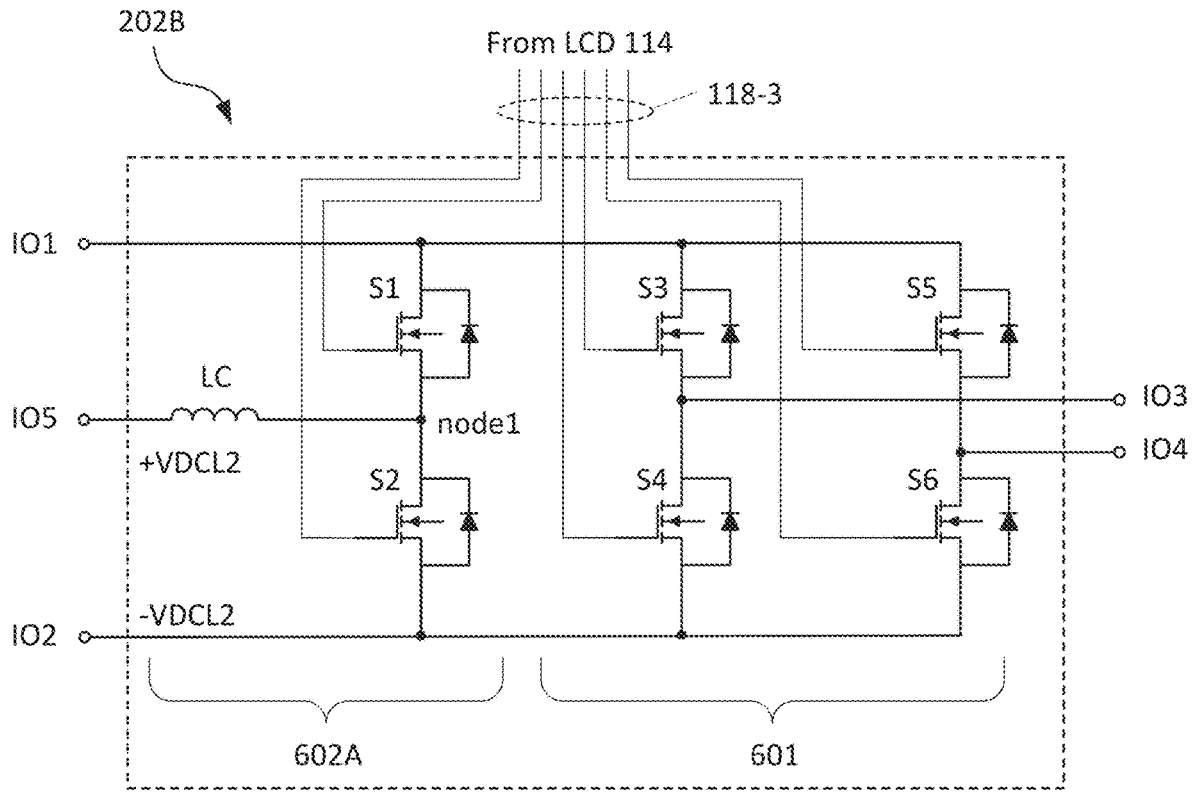
Figure 6C:
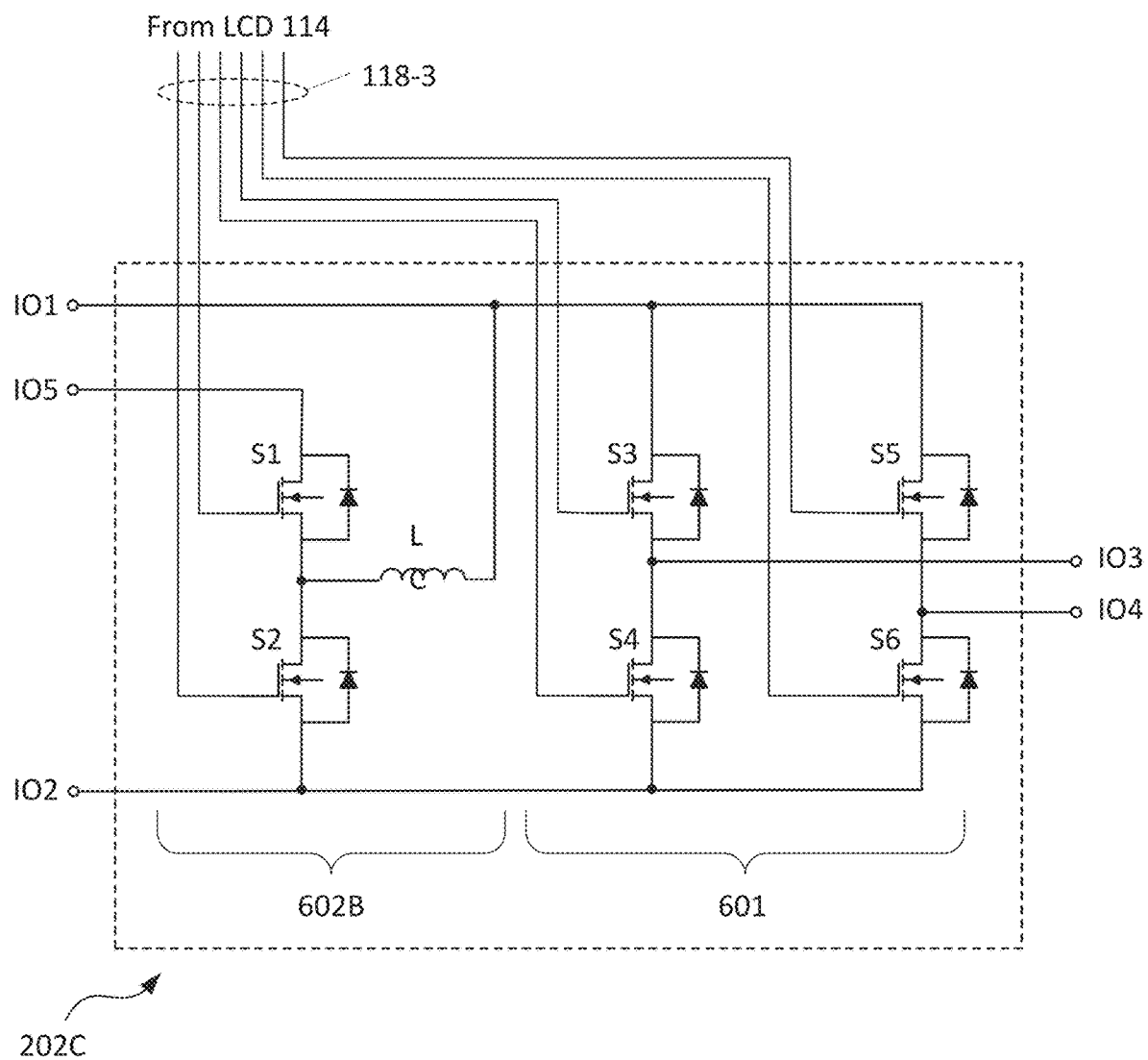

FIGS. 6B and 6C are schematic views depicting example embodiments of converters 202B and 202C, respectively. Converter 202B includes switch circuitry portions 601 and 602A. Portion 601 includes switches S3 through S6 configured as a full bridge in similar manner to converter 202A, and is configured to selectively couple IO1 and IO2 to either of IO3 and IO4, thereby changing the output voltages of module 108B. Portion 602A includes switches S1 and S2 configured as a half bridge and coupled between ports IO1 and IO2. A coupling inductor $L_C$ is connected between port IO5 and a node1 present between switches S1 and S2 such that switch portion 602A is a bidirectional converter that can regulate (boost or buck) voltage (or inversely current). Switch portion 602A can generate two different voltages at node1, which are $+V_{DCL2}$ and 0, referenced to port 102, which can be at virtual zero potential. The current drawn from or input to energy source 202B can be controlled by regulating the voltage on coupling inductor $L_C$, using, for example, a pulse-width modulation technique or a hysteresis control method for commutating switches S1 and S2. Other techniques can also be used.

Converter 202C differs from that of 202B as switch portion 602B includes switches S1 and S2 configured as a half bridge and coupled between ports IO5 and IO2. A coupling inductor $L_C$ is connected between port IO1 and a node1 present between switches S1 and S2 such that switch portion 602B is configured to regulate voltage.

Control system 102 or LCD 114 can independently control each switch of converters 202B and 202C via control input lines 118-3 to each gate. In these embodiments and that of FIG. 6A, LCD 114 (not MCD 112) generates the switching signals for the converter switches. Alternatively, MCD 112 can generate the switching signals, which can be communicated directly to the switches, or relayed by LCD 114.

In embodiments where a module 108 includes three or more energy sources 206, converters 202B and 202C can be scaled accordingly such that each additional energy source 206B is coupled to an additional IO port leading to an additional switch circuitry portion 602A or 602B, depending on the needs of the particular source. For example a dual source converter 202 can include both switch portions 202A and 202B.

Modules 108 with multiple energy sources 206 are capable of performing additional functions such as energy sharing between sources 206, energy capture from within the application (e.g., regenerative braking), charging of the primary source by the secondary source even while the overall system is in a state of discharge, and active filtering of the module output. Examples of these functions are described in more detail in Int'l. Appl. No. PCT/US20/25366, filed Mar. 27, 2020 and titled Module-Based Energy Systems Capable of Cascaded and Interconnected Configurations, and Methods Related Thereto, and Int'l. Publ. No. WO 2019/183553, filed Mar. 22, 2019, and titled Systems and Methods for Power Management and Control, both of which are incorporated by reference herein in their entireties for all purposes.

Each module 108 can be configured to supply one or more auxiliary loads with its one or more energy sources 206. Auxiliary loads are loads that require lower voltages than the primary load 101. Examples of auxiliary loads can be, for example, an on-board electrical network of an electric vehicle, or an HVAC system of an electric vehicle. The load of system 100 can be, for example, one of the phases of the electric vehicle motor or electrical grid. This embodiment can allow a complete decoupling between the electrical characteristics (terminal voltage and current) of the energy source and those of the loads.

FIG. 3C is a block diagram depicting an example embodiment of a module 108C configured to supply power to a first auxiliary load 301 and a second auxiliary load 302, where module 108C includes an energy source 206, energy buffer 204, and converter 202B coupled together in a manner similar to that of FIG. 3B. First auxiliary load 301 requires a voltage equivalent to that supplied from source 206. Load 301 is coupled to IO ports 3 and 4 of module 108C, which are in turn coupled to ports IO1 and IO2 of source 206.

Source 206 can output power to both power connection 110 and load 301. Second auxiliary load 302 requires a constant voltage lower than that of source 206. Load 302 is coupled to IO ports 5 and 6 of module 108C, which are coupled to ports IO5 and IO2, respectively, of converter 202B. Converter 202B can include switch portion 602 having coupling inductor $L_C$ coupled to port 105 (FIG. 6B). Energy supplied by source 206 can be supplied to load 302 through switch portion 602 of converter 202B. It is assumed that load 302 has an input capacitor (a capacitor can be added to module 108C if not), so switches S1 and S2 can be commutated to regulate the voltage on and current through coupling inductor $L_C$ and thus produce a stable constant voltage for load 302. This regulation can step down the voltage of source 206 to the lower magnitude voltage is required by load 302.

Module 108C can thus be configured to supply one or more first auxiliary loads in the manner described with respect to load 301, with the one or more first loads coupled to IO ports 3 and 4. Module 108C can also be configured to supply one or more second auxiliary loads in the manner described with respect to load 302. If multiple second auxiliary loads 302 are present, then for each additional load 302 module 108C can be scaled with additional dedicated module output ports (like 5 and 6), an additional dedicated switch portion 602, and an additional converter IO port coupled to the additional portion 602.

Energy source 206 can thus supply power for any number of auxiliary loads (e.g., 301 and 302), as well as the corresponding portion of system output power needed by primary load 101. Power flow from source 206 to the various loads can be adjusted as desired.

Module 108 can be configured as needed with two or more energy sources 206 (FIG. 3B) and to supply first and/or second auxiliary loads (FIG. 3C) through the addition of a switch portion 602 and converter port IO5 for each additional source 206B or second auxiliary load 302. Additional module IO ports (e.g., 3, 4, 5, 6) can be added as needed. Module 108 can also be configured as an interconnection module to exchange energy (e.g., for balancing) between two or more arrays, two or more packs, or two or more systems 100 as described further herein. This interconnection functionality can likewise be combined with multiple source and/or multiple auxiliary load supply capabilities.

Control system 102 can perform various functions with respect to the components of modules 108A, 108B, and 108C. These functions can include management of the utilization (amount of use) of each energy source 206, protection of energy buffer 204 from over-current, over-voltage and high temperature conditions, and control and protection of converter 202.

For example, to manage (e.g., adjust by increasing, decreasing, or maintaining) utilization of each energy source 206, LCD 114 can receive one or more monitored voltages, temperatures, and currents from each energy source 206 (or monitor circuitry). The monitored voltages can be at least one of, preferably all, voltages of each elementary component independent of the other components (e.g., each individual battery cell, HED capacitor, and/or fuel cell) of the source 206, or the voltages of groups of elementary components as a whole (e.g., voltage of the battery array, HED capacitor array, and/or fuel cell array). Similarly the monitored temperatures and currents can be at least one of, preferably all, temperatures and currents of each elementary component independent of the other components of the source 206, or the temperatures and currents of groups of elementary components as a whole, or any combination thereof. The monitored signals can be status information, with which LCD 114 can perform one or more of the following: calculation or determination of a real capacity, actual State of Charge (SOC) and/or State of Health (SOH) of the elementary components or groups of elementary components; set or output a warning or alarm indication based on monitored and/or calculated status information; and/or transmission of the status information to MCD 112. LCD 114 can receive control information (e.g., a modulation index, synchronization signal) from MCD 112 and use this control information to generate switch signals for converter 202 that manage the utilization of the source 206.

To protect energy buffer 204, LCD 114 can receive one or more monitored voltages, temperatures, and currents from energy buffer 204 (or monitor circuitry). The monitored voltages can be at least one of, preferably all, voltages of each elementary component of buffer 204 (e.g., of $C_{EB}$, $C_{EB1}$, $C_{EB2}$, $L_{EB1}$, $L_{EB2}$, $D_{EB}$) independent of the other components, or the voltages of groups of elementary components or buffer 204 as a whole (e.g., between IO1 and IO2 or between IO3 and IO4). Similarly the monitored temperatures and currents can be at least one of, preferably all, temperatures and currents of each elementary component of buffer 204 independent of the other components, or the temperatures and currents of groups of elementary components or of buffer 204 as a whole, or any combination thereof. The monitored signals can be status information, with which LCD 114 can perform one or more of the following: set or output a warning or alarm indication; communicate the status information to MCD 112; or control converter 202 to adjust (increase or decrease) the utilization of source 206 and module 108 as a whole for buffer protection.

To control and protect converter 202, LCD 114 can receive the control information from MCD 112 (e.g., a modulated reference signal, or a reference signal and a modulation index), which can be used with a PWM technique in LCD 114 to generate the control signals for each switch (e.g., S1 through S6). LCD 114 can receive a current feedback signal from a current sensor of converter 202, which can be used for overcurrent protection together with one or more fault status signals from driver circuits (not shown) of the converter switches, which can carry information about fault statuses (e.g., short circuit or open circuit failure modes) of all switches of converter 202. Based on this data, LCD 114 can make a decision on which combination of switching signals to be applied to manage utilization of module 108, and potentially bypass or disconnect converter 202 (and the entire module 108) from system 100.

If controlling a module 108C that supplies a second auxiliary load 302, LCD 114 can receive one or more monitored voltages (e.g., the voltage between IO ports 5 and 6) and one or more monitored currents (e.g., the current in coupling inductor $L_C$, which is a current of load 302) in module 108C. Based on these signals, LCD 114 can adjust the switching cycles (e.g., by adjustment of modulation index or reference waveform) of S1 and S2 to control (and stabilize) the voltage for load 302.

Examples of Cascaded Energy System Topologies

Two or more modules 108 can be coupled together in a cascaded array that outputs a voltage signal formed by a superposition of the discrete voltages generated by each module 108 within the array. FIG. 7A is a block diagram depicting an example embodiment of a topology for system 100 where N modules 108-1, 108-2 . . . 108-N are coupled together in series to form a serial array 700. In this and all embodiments described herein, N can be any integer greater than one. Array 700 includes a first system IO port SIO1 and a second system IO port SIO2 across which is generated an array output voltage. Array 700 can be used as a DC or single phase AC energy source for DC or AC single-phase loads, which can be connected to SIO1 and SIO2 of array 700. FIG. 8A is a plot of voltage versus time depicting an example output signal 801 produced by a single module 108 having a 48 volt energy source. FIG. 8B is a plot of voltage versus time depicting an example single phase AC output signal 802 generated by array 700 having six 48V modules 108 coupled in series.

System 100 can be arranged in a broad variety of different topologies to meet varying needs of the applications. System 100 can provide multi-phase power (e.g., two-phase, three-phase, four-phase, five-phase, six-phase, etc.) to a load by use of multiple arrays 700, where each array can generate an AC output signal having a different phase angle.

FIG. 7B is a block diagram depicting system 100 with two arrays 700-PA and 700-PB coupled together. Each array 700 is one-dimensional, formed by a series connection of N modules 108. The two arrays 700-PA and 700-PB can each generate a single-phase AC signal, where the two AC signals have different phase angles PA and PB (e.g., 180 degrees apart). IO port 1 of module 108-1 of each array 700-PA and 700-PB can form or be connected to system IO ports SIO1 and SIO2, respectively, which in turn can serve as a first output of each array that can provide two phase power to a load (not shown). Or alternatively ports SIO1 and SIO2 can be connected to provide single phase power from two parallel arrays. IO port 2 of module 108-N of each array 700-PA and 700-PB can serve as a second output for each array 700-PA and 700-PB on the opposite end of the array from system IO ports SIO1 and SIO2, and can be coupled together at a common node and optionally used for an additional system IO port SIO3 if desired, which can serve as a neutral. This common node can be referred to as a rail, and IO port 2 of modules 108-N of each array 700 can be referred to as being on the rail side of the arrays.

FIG. 7C is a block diagram depicting system 100 with three arrays 700-PA, 700-PB, and 700-PC coupled together. Each array 700 is one-dimensional, formed by a series connection of N modules 108. The three arrays 700-1 and 700-2 can each generate a single-phase AC signal, where the three AC signals have different phase angles PA, PB, PC (e.g., 120 degrees apart). IO port 1 of module 108-1 of each array 700-PA, 700-PB, and 700-PC can form or be connected to system IO ports SIO1, SIO2, and SIO3, respectively, which in turn can provide three phase power to a load (not shown). IO port 2 of module 108-N of each array 700-PA, 700-PB, and 700-PC can be coupled together at a common node and optionally used for an additional system IO port SIO4 if desired, which can serve as a neutral.

The concepts described with respect to the two-phase and three-phase embodiments of FIGS. 7B and 7C can be extended to systems 100 generating still more phases of power. For example, a non-exhaustive list of additional examples includes: system 100 having four arrays 700, each of which is configured to generate a single phase AC signal having a different phase angle (e.g., 90 degrees apart): system 100 having five arrays 700, each of which is configured to generate a single phase AC signal having a different phase angle (e.g., 72 degrees apart); and system 100 having six arrays 700, each array configured to generate a single phase AC signal having a different phase angle (e.g., 60 degrees apart).

System 100 can be configured such that arrays 700 are interconnected at electrical nodes between modules 108 within each array. FIG. 7D is a block diagram depicting system 100 with three arrays 700-PA, 700-PB, and 700-PC coupled together in a combined series and delta arrangement. Each array 700 includes a first series connection of M modules 108, where M is two or greater, coupled with a second series connection of N modules 108, where N is two or greater. The delta configuration is formed by the interconnections between arrays, which can be placed in any desired location. In this embodiment, IO port 2 of module 108-(M+N) of array 700-PC is coupled with IO port 2 of module 108-M and IO port 1 of module 108-(M+1) of array 700-PA, IO port 2 of module 108-(M+N) of array 700-PB is coupled with IO port 2 of module 108-M and IO port 1 of module 108-(M+1) of array 700-PC, and IO port 2 of module 108-(M+N) of array 700-PA is coupled with IO port 2 of module 108-M and IO port 1 of module 108-(M+1) of array 700-PB.

Figure 7E:
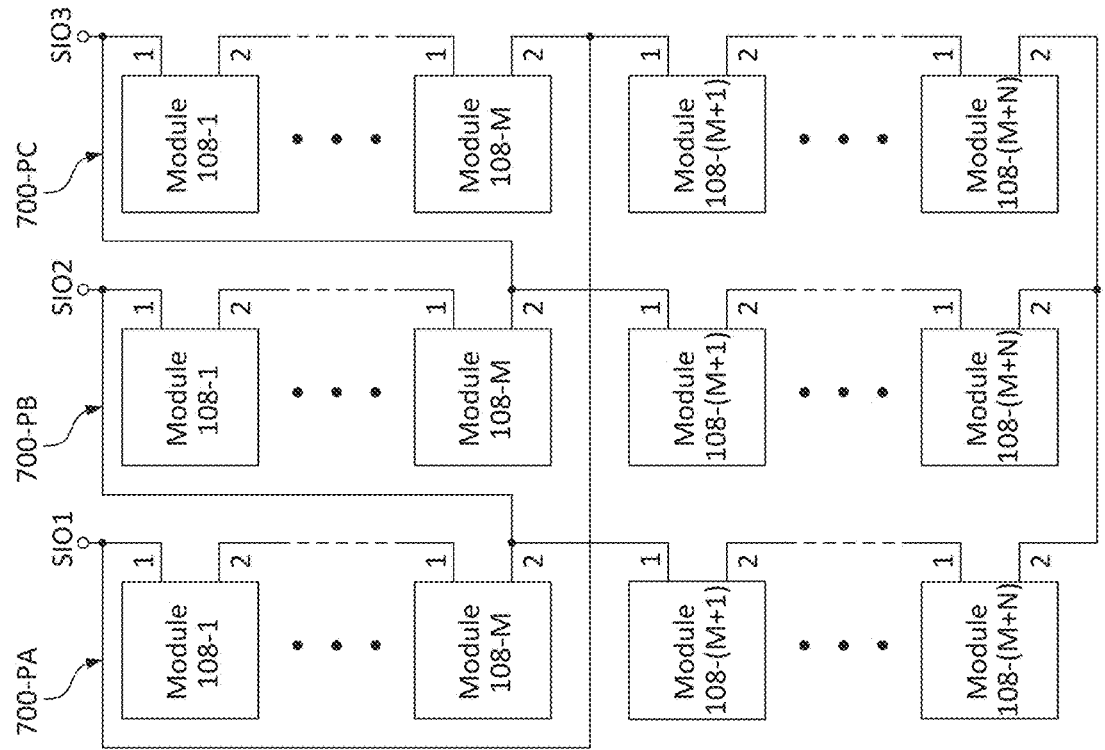
Figure 7D:
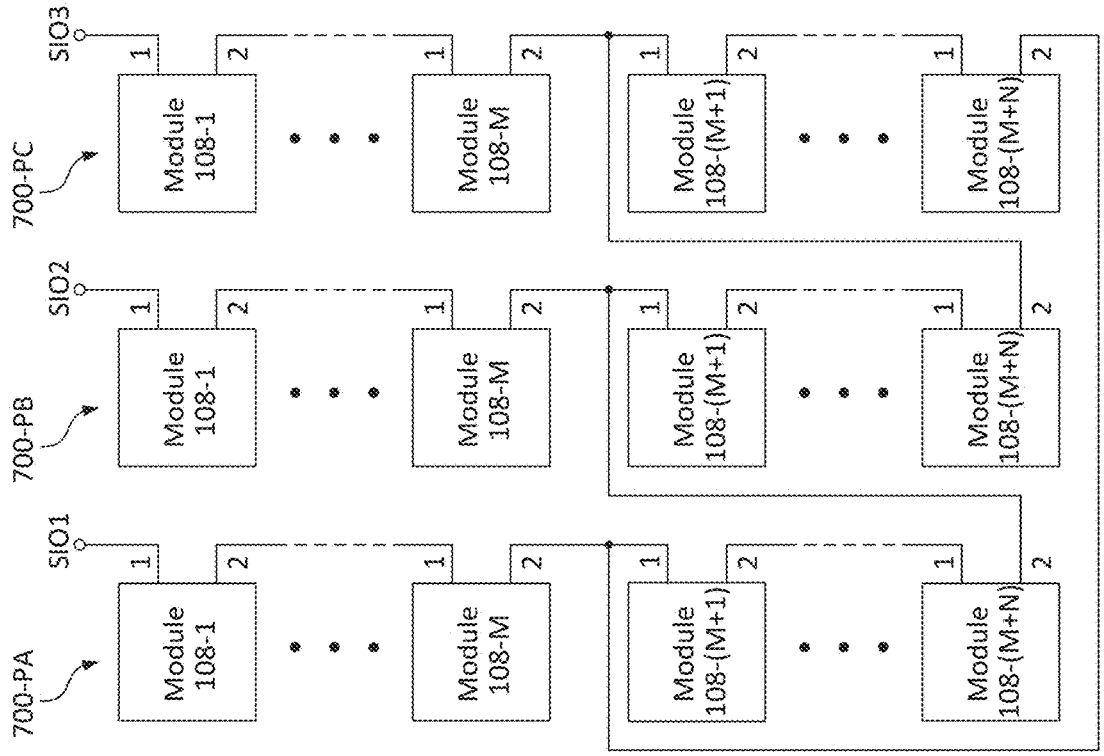
Figure 8B:
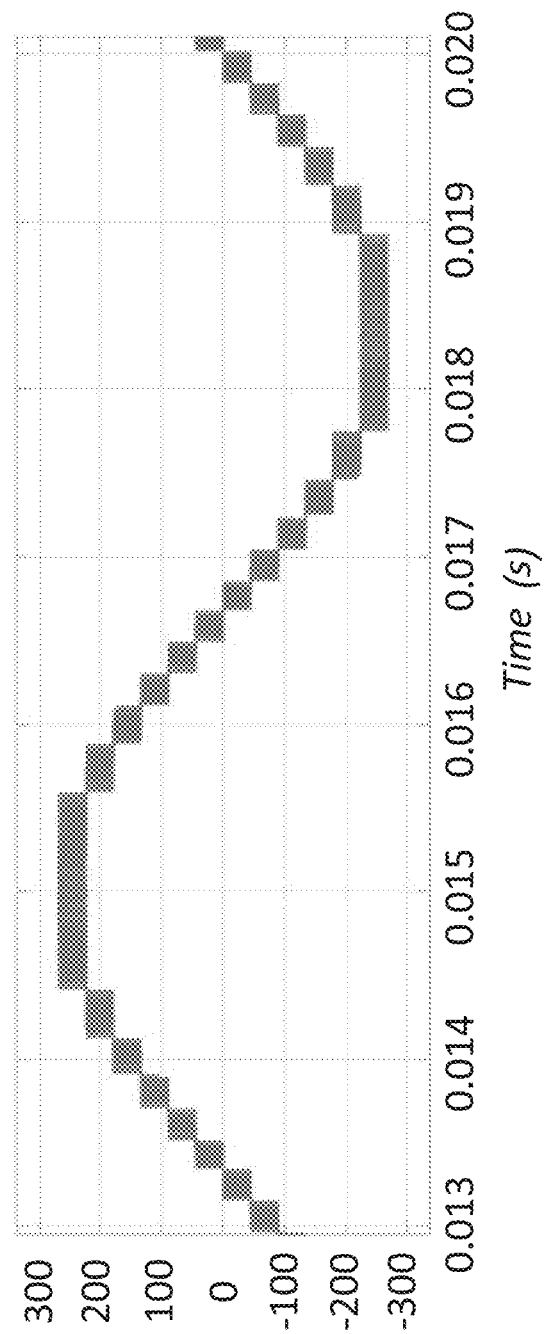
FIG. 8B is a plot depicting an example multilevel output voltage of an array of modules.

FIG. 7E is a block diagram depicting system 100 with three arrays 700-PA, 700-PB, and 700-PC coupled together in a combined series and delta arrangement. This embodiment is similar to that of FIG. 7D except with different cross connections. In this embodiment, IO port 2 of module 108-M of array 700-PC is coupled with IO port 1 of module 108-1 of array 700-PA, IO port 2 of module 108-M of array 700-PB is coupled with IO port 1 of module 108-1 of array 700-PC, and IO port 2 of module 108-M of array 700-PA is coupled with IO port 1 of module 108-1 of array 700-PB. The arrangements of FIGS. 7D and 7E can be implemented with as little as two modules in each array 700. Combined delta and series configurations enable an effective exchange of energy between all modules 108 of the system (interphase balancing) and phases of power grid or load, and also allows reducing the total number of modules 108 in an array 700 to obtain the desired output voltages.

In the embodiments described herein, although it is advantageous for the number of modules 108 to be the same in each array 700 within system 100, such is not required and different arrays 700 can have differing numbers of modules 108. Further, each array 700 can have modules 108 that are all of the same configuration (e.g., all modules are 108A, all modules are 108B, all modules are 108C, or others) or different configurations (e.g., one or more modules are 108A, one or more are 108B, and one or more are 108C, or otherwise). As such, the scope of topologies of system 100 covered herein is broad.

Example Embodiments of Control Methodologies

As mentioned, control of system 100 can be performed according to various methodologies, such as hysteresis or PWM. Several examples of PWM include space vector modulation and sine pulse width modulation, where the switching signals for converter 202 are generated with a phase shifted carrier technique that continuously rotates utilization of each module 108 to equally distribute power among them.

Figure 8C:
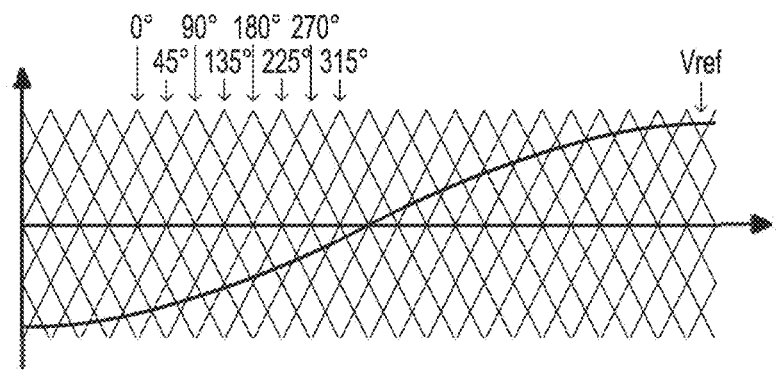
FIG. 8C is a plot depicting an example reference signal and carrier signals usable in a pulse width modulation control technique.
Figure 8D:
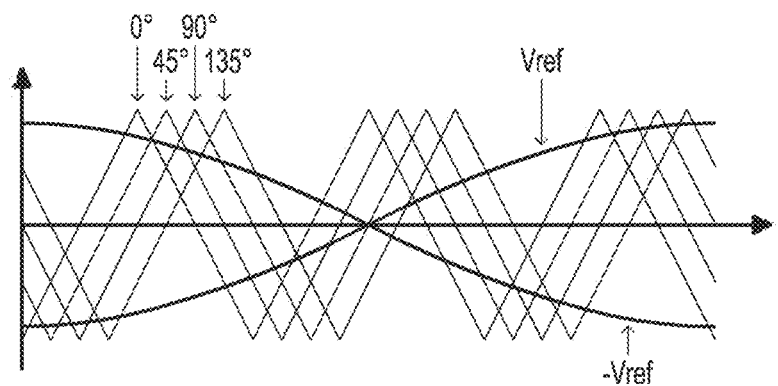
FIG. 8D is a plot depicting example reference signals and carrier signals usable in a pulse width modulation control technique.
Figure 8E:
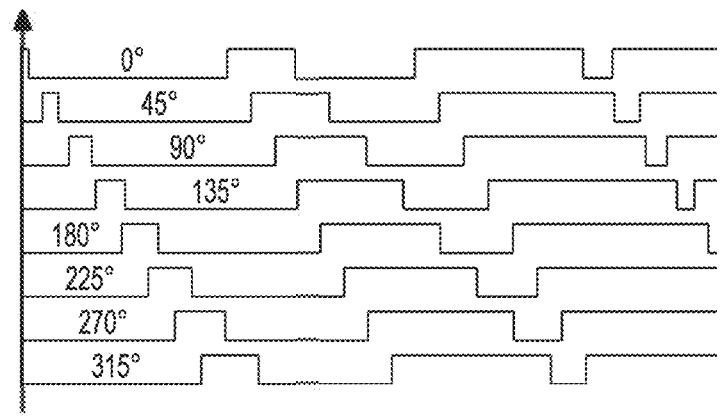
FIG. 8E is a plot depicting example switch signals generated according to a pulse width modulation control technique.
Figure 8F:
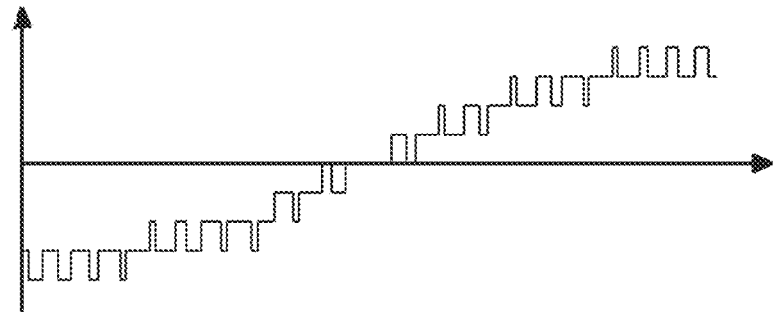
FIG. 8F as a plot depicting an example multilevel output voltage generated by superposition of output voltages from an array of modules under a pulse width modulation control technique.

FIGS. 8C-8F are plots depicting an example embodiment of a phase-shifted PWM control methodology that can generate a multilevel output PWM waveform using incrementally shifted two-level waveforms. An X-level PWM waveform can be created by the summation of $(X-1)/2$ two-level PWM waveforms. These two-level waveforms can be generated by comparing a reference waveform Vref to carriers incrementally shifted by $360°/(X-1)$. The carriers are triangular, but the embodiments are not limited to such. A nine-level example is shown in FIG. 8C (using four modules 108). The carriers are incrementally shifted by $360°/(9-1)=45°$ and compared to Vref. The resulting two-level PWM waveforms are shown in FIG. 8E. These two-level waveforms may be used as the switching signals for semiconductor switches (e.g., S1 though S6) of converters 202. As an example with reference to FIG. 8E, for a one-dimensional array 700 including four modules 108 each with a converter 202, the 0° signal is for control of S3 and the 180° signal for S6 of the first module 108-1, the 45° signal is for S3 and the 225° signal for S6 of the second module 108-2, the 90 signal is for S3 and the 270 signal is for S6 of the third module 108-3, and the 135 signal is for S3 and the 315 signal is for S6 of the fourth module 108-4. The signal for S3 is complementary to S4 and the signal for S5 is complementary to S6 with sufficient dead-time to avoid shoot through of each half-bridge. FIG. 8F depicts an example single phase AC waveform produced by superposition (summation) of output voltages from the four modules 108.

An alternative is to utilize both a positive and a negative reference signal with the first (N−1)/2 carriers. A nine-level example is shown in FIG. 8D. In this example, the 0° to 135° switching signals (FIG. 8E) are generated by comparing +Vref to the 0° to 135° carriers of FIG. 8D and the 180° to 315° switching signals are generated by comparing -Vref to the 0° to 135° carriers of FIG. 8D. However, the logic of the comparison in the latter case is reversed. Other techniques such as a state machine decoder may also be used to generate gate signals for the switches of converter 202.

In multi-phase system embodiments, the same carriers can be used for each phase, or the set of carriers can be shifted as a whole for each phase. For example, in a three phase system with a single reference voltage (Vref), each array 700 can use the same number of carriers with the same relative offsets as shown in FIGS. 8C and 8D, but the carriers of the second phase are shift by 120 degrees as compared to the carriers of the first phase, and the carriers of the third phase are shifted by 240 degrees as compared to the carriers of the first phase. If a different reference voltage is available for each phase, then the phase information can be carried in the reference voltage and the same carriers can be used for each phase. In many cases the carrier frequencies will be fixed, but in some example embodiments, the carrier frequencies can be adjusted, which can help to reduce losses in EV motors under high current conditions.

The appropriate switching signals can be provided to each module by control system 102. For example, MCD 112 can provide Vref and the appropriate carrier signals to each LCD 114 depending upon the module or modules 108 that LCD 114 controls, and the LCD 114 can then generate the switching signals. Or all LCDs 114 in an array can be provided with all carrier signals and the LCD can select the appropriate carrier signals.

The relative utilizations of each module 108 can adjusted based on status information to perform balancing or of one or more parameters as described herein. Balancing of parameters can involve adjusting utilization to minimize parameter divergence over time as compared to a system where individual module utilization adjustment is not performed. The utilization can be the relative amount of time a module 108 is discharging when system 100 is in a discharge state, or the relative amount of time a module 108 is charging when system 100 is in a charge state.

As described herein, modules 108 can be balanced with respect to other modules in an array 700, which can be referred to as intra-array or intraphase balancing, and different arrays 700 can be balanced with respect to each other, which can be referred to as interarray or interphase balancing. Arrays 700 of different subsystems can also be balanced with respect to each other. Control system 102 can simultaneously perform any combination of intraphase balancing, interphase balancing, utilization of multiple energy sources within a module, active filtering, and auxiliary load supply.

Figure 9A:
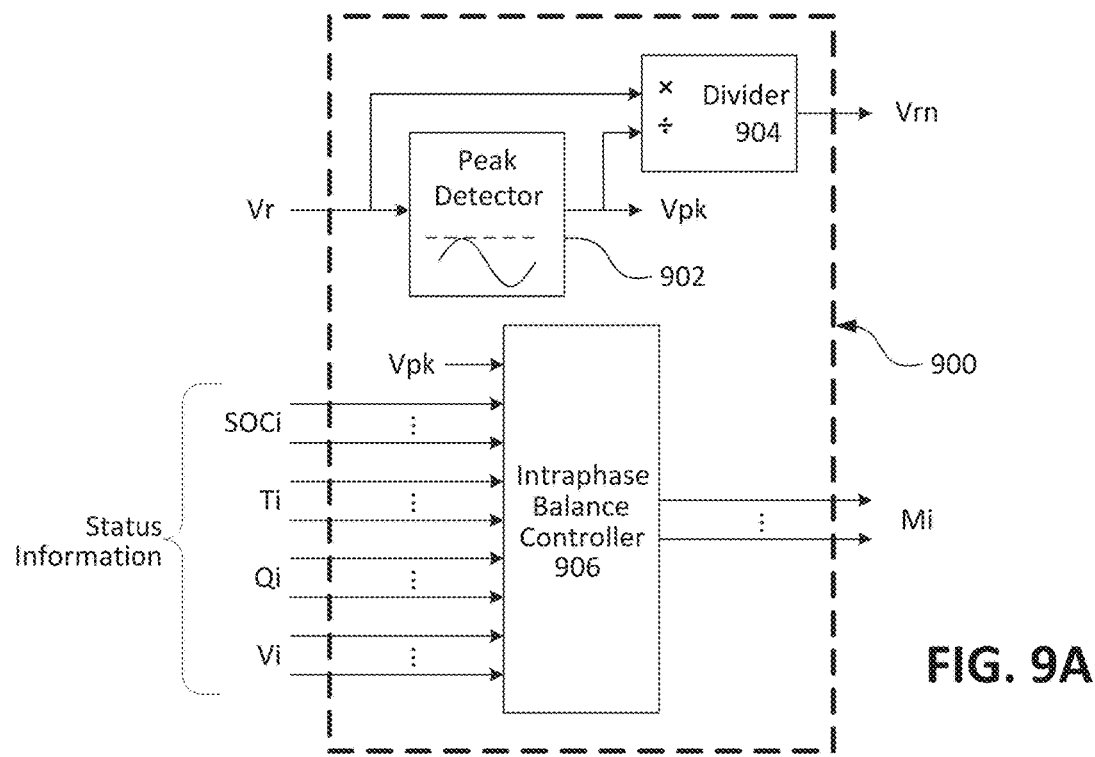
FIGS. 9A-9B are block diagrams depicting example embodiments of controllers for a modular energy system.

FIG. 9A is a block diagram depicting an example embodiment of an array controller 900 of control system 102 for a single-phase AC or DC array. Array controller 900 can include a peak detector 902, a divider 904, and an intraphase (or intra-array) balance controller 906. Array controller 900 can receive a reference voltage waveform (Vr) and status information about each of the N modules 108 in the array (e.g., state of charge (SOCi), temperature (Ti), capacity (Qi), and voltage (Vi)) as inputs, and generate a normalized reference voltage waveform (Vrn) and modulation indexes (Mi) as outputs. Peak detector 902 detects the peak (Vpk) of Vr, which can be specific to the phase that controller 900 is operating with and/or balancing. Divider 904 generates Vrn by dividing Vr by its detected Vpk. Intraphase balance controller 906 uses Vpk along with the status information (e.g., SOCi, Ti, Qi, Vi, etc.) to generate modulation indexes Mi for each module 108 within the array 700 being controlled.

The modulation indexes and Vrn can be used to generate the switching signals for each converter 202. The modulation index can be a number between zero and one (inclusive of zero and one). For a particular module 108, the normalized reference Vrn can be modulated or scaled by Mi, and this modulated reference signal (Vrnm) can be used as Vref (or −Vref) according to the PWM technique described with respect to FIGS. 8C-8F, or according to other techniques. In this manner, the modulation index can be used to control the PWM switching signals provided to the converter switching circuitry (e.g., S3-S6 or S1-S6), and thus regulate the operation of each module 108. For example, a module 108 being controlled to maintain normal or full operation may receive an Mi of one, while a module 108 being controlled to less than normal or full operation may receive an Mi less than one, and a module 108 controlled to cease power output may receive an Mi of zero. This operation can be performed in various ways by control system 102, such as by MCD 112 outputting Vrn and Mi to the appropriate LCDs 114 for modulation and switch signal generation, by MCD 112 performing modulation and outputting the modulated Vrnm to the appropriate LCDs 114 for switch signal generation, or by MCD 112 performing modulation and switch signal generation and outputting the switch signals to the LCDs or the converters 202 of each module 108 directly. Vrn can be sent continually with Mi sent at regular intervals, such as once for every period of the Vrn, or one per minute, etc.

Controller 906 can generate an Mi for each module 108 using any type or combination of types of status information (e.g., SOC, temperature (T), Q, SOH, voltage, current) described herein. For example, when using SOC and T, a module 108 can have a relatively high Mi if SOC is relatively high and temperature is relatively low as compared to other modules 108 in array 700. If either SOC is relatively low or T is relatively high, then that module 108 can have a relatively low Mi, resulting in less utilization than other modules 108 in array 700. Controller 906 can determine Mi such that the sum of module voltages does not exceed Vpk. For example, Vpk can be the sum of the products of the voltage of each module's source 206 and Mi for that module (e.g., $Vpk = M_1V_1 + M_2V_2 + M_3V_3 \ldots + M_NV_N$, etc). A different combination of modulation indexes, and thus respective voltage contributions by the modules, may be used but the total generated voltage should remain the same.

Controller 900 can control operation, to the extent it does not prevent achieving the power output requirements of the system at any one time (e.g., such as during maximum acceleration of an EV), such that SOC of the energy source (s) in each module 108 remains balanced or converges to a balanced condition if they are unbalanced, and/or such that temperature of the energy source(s) or other component (e.g., energy buffer) in each module remains balanced or converges to a balanced condition if they are unbalanced. Power flow in and out of the modules can be regulated such that a capacity difference between sources does not cause an SOC deviation. Balancing of SOC and temperature can indirectly cause some balancing of SOH. Voltage and current can be directly balanced if desired, but in many embodiments the main goal of the system is to balance SOC and temperature, and balancing of SOC can lead to balance of voltage and current in a highly symmetric systems where modules are of similar capacity and impedance.

Since balancing all parameters may not be possible at the same time (e.g., balancing of one parameter may further unbalance another parameter), a combination of balancing any two or more parameters (SOC, T, Q, SOH, V, I) may be applied with priority given to either one depending on the requirements of the application. Priority in balancing can be given to SOC over other parameters (T, Q, SOH, V, I), with exceptions made if one of the other parameters (T, Q, SOH, V, I) reaches a severe unbalanced condition outside a threshold.

Figure 9B:
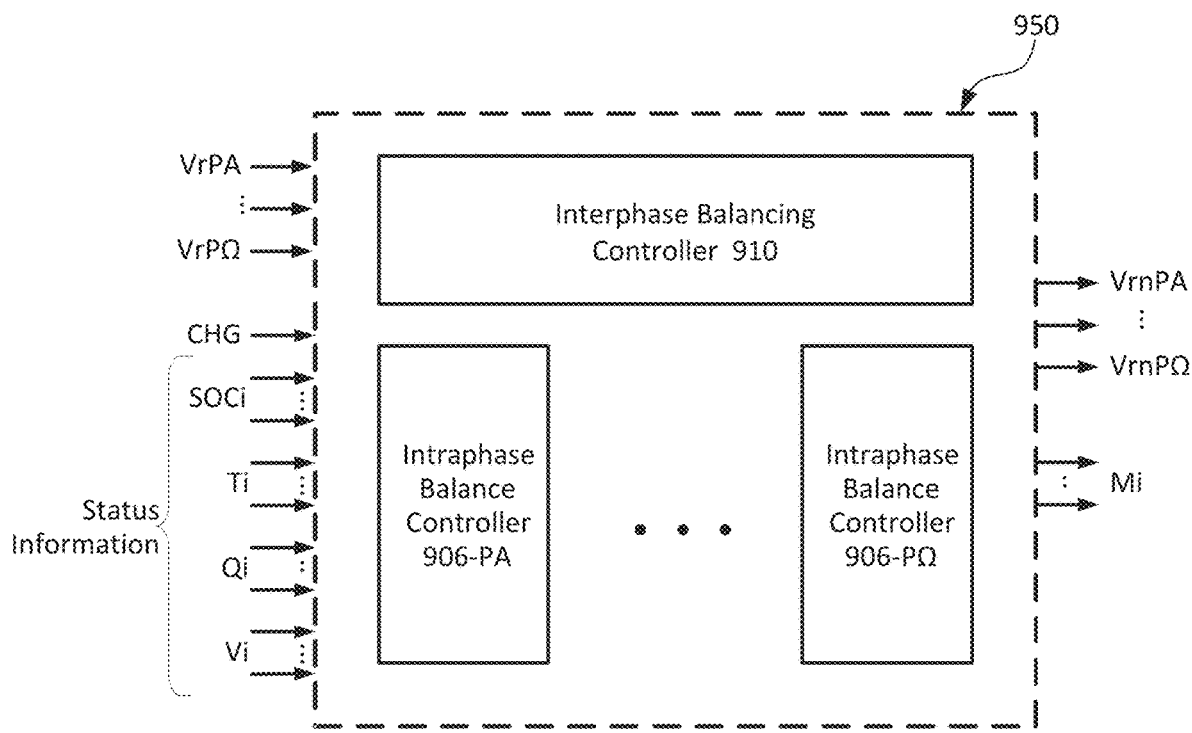

Balancing between arrays 700 of different phases (or arrays of the same phase, e.g., if parallel arrays are used) can be performed concurrently with intraphase balancing. FIG. 9B depicts an example embodiment of an Ω-phase (or Ω-array) controller 950 configured for operation in an Ω-phase system 100, having at least Ω arrays 700, where Ω is any integer greater than one. Controller 950 can include one interphase (or interarray) controller 910 and 22 intraphase balance controllers 906-PA ... 906-PΩ for phases PA through PΩ, as well as peak detector 902 and divider 904 (FIG. 9A) for generating normalized references VrnPA through VrnPΩ from each phase-specific reference VrPA through VrPΩ. Intraphase controllers 906 can generate Mi for each module 108 of each array 700 as described with respect to FIG. 9A. Interphase balance controller 910 is configured or programmed to balance aspects of modules 108 across the entire multi-dimensional system, for example, between arrays of different phases. This may be achieved through injecting common mode to the phases (e.g., neutral point shifting) or through the use of interconnection modules (described herein) or through both. Common mode injection involves introducing a phase and amplitude shift to the reference signals VrPA through VrPΩ to generate normalized waveforms VrnPA through VrnPΩ to compensate for unbalance in one or more arrays, and is described further in Int'l. Appl. No. PCT/US20/25366 incorporated herein.

Controllers 900 and 950 (as well as balance controllers 906 and 910) can be implemented in hardware, software or a combination thereof within control system 102. Controllers 900 and 950 can be implemented within MCD 112, distributed partially or fully among LCDs 114, or may be implemented as discrete controllers independent of MCD 112 and LCDs 114.

Example Embodiments of Interconnection (IC) Modules

Modules 108 can be connected between the modules of different arrays 700 for the purposes of exchanging energy between the arrays, acting as a source for an auxiliary load, or both. Such modules are referred to herein as interconnection (IC) modules 108IC. IC module 108IC can be implemented in any of the already described module configurations (108A, 108B, 108C) and others to be described herein. IC modules 108IC can include any number of one or more energy sources, an optional energy buffer, switch circuitry for supplying energy to one or more arrays and/or for supplying power to one or more auxiliary loads, control circuitry (e.g., a local control device), and monitor circuitry for collecting status information about the IC module itself or its various loads (e.g., SOC of an energy source, temperature of an energy source or energy buffer, capacity of an energy source, SOH of an energy source, voltage and/or current measurements pertaining to the IC module, voltage and/or current measurements pertaining to the auxiliary load(s), etc.).

FIG. 10A is a block diagram depicting an example embodiment of a system 100 capable of producing Ω-phase power with 22 arrays 700-PA through 700-PΩ, where Ω can be any integer greater than one. IC module 108IC is located on the rail side of arrays 700 such that arrays 700-PA through 700-PΩ are located electrically between module 108IC and outputs SIO1 and SIOΩ to the load. Module 108IC has Ω IO ports for connection to IO port 2 of each module 108-N of arrays 700-PA through 700-PΩ. In the configuration depicted here, module 108IC can perform interphase balancing by selectively connecting the one or more energy sources of module 108IC to one or more of the arrays 700-PA through 700-PΩ (or to no output, or equally to all outputs, if interphase balancing is not required). System 100 can be controlled by control system 102 (not shown, see FIG. 1A).

FIG. 10B is a schematic diagram depicting an example embodiment of module 108IC. In this embodiment module 108IC includes an energy source 206 connected with energy buffer 204 that in turn is connected with switch circuitry 603. Switch circuitry 603 can include switch circuitry units 604-PA through 604-PΩ for independently connecting energy source 206 to each of arrays 700-PA through 700-PΩ, respectively. Various switch configurations can be used for each unit 604, which in this embodiment is configured as a half-bridge with two semiconductor switches S7 and S8. Each half bridge is controlled by control lines 118-3 from LCD 114. This configuration is similar to module 108A described with respect to FIG. 3A. As described with respect to converter 202, switch circuitry 603 can be configured in any arrangement and with any switch types (e.g., MOSFET, IGBT, Silicon, GaN, etc.) suitable for the requirements of the application.

Switch circuitry units 604 are coupled between positive and negative terminals of energy source 206 and have an output that is connected to an IO port of module 108IC. Units 604-PA through 604-PΩ can be controlled by control system 102 to selectively couple voltage $+V_{IC}$ or $-V_{IC}$ to the respective module I/O ports 1 through Ω. Control system 102 can control switch circuitry 603 according to any desired control technique, including the PWM and hysteresis techniques mentioned herein. Here, control circuitry 102 is implemented as LCD 114 and MCD 112 (not shown). LCD 114 can receive monitoring data or status information from monitor circuitry of module 108IC. This monitoring data and/or other status information derived from this monitoring data can be output to MCD 112 for use in system control as described herein. LCD 114 can also receive timing information (not shown) for purposes of synchronization of modules 108 of the system 100 and one or more carrier signals (not shown), such as the sawtooth signals used in PWM (FIGS. 8C-8D).

For interphase balancing, proportionally more energy from source 206 can be supplied to any one or more of arrays 700-PA through 700-PΩ that is relatively low on charge as compared to other arrays 700. Supply of this supplemental energy to a particular array 700 allows the energy output of those cascaded modules 108-1 thru 108-N in that array 700 to be reduced relative to the unsupplied phase array(s).

For example, in some example embodiments applying PWM, LCD 114 can be configured to receive the normalized voltage reference signal (Vrn) (from MCD 112) for each of the one or more arrays 700 that module 108IC is coupled to, e.g., VrnPA through VrnPΩ. LCD 114 can also receive modulation indexes MiPA through MiPΩ for the switch units 604-PA through 604-PΩ for each array 700, respectively, from MCD 112. LCD 114 can modulate (e.g., multiply) each respective Vrn with the modulation index for the switch section coupled directly to that array (e.g., VrnA multiplied by MiA) and then utilize a carrier signal to generate the control signal(s) for each switch unit 604. In other embodiments, MCD 112 can perform the modulation and output modulated voltage reference waveforms for each unit 604 directly to LCD 114 of module 108IC. In still other embodiments, all processing and modulation can occur by a single control entity that can output the control signals directly to each unit 604.

This switching can be modulated such that power from energy source 206 is supplied to the array(s) 700 at appropriate intervals and durations. Such methodology can be implemented in various ways.

Based on the collected status information for system 100, such as the present capacity (Q) and SOC of each energy source in each array, MCD 112 can determine an aggregate charge for each array 700 (e.g., aggregate charge for an array can be determined as the sum of capacity times SOC for each module of that array). MCD 112 can determine whether a balanced or unbalanced condition exists (e.g., through the use of relative difference thresholds and other metrics described herein) and generate modulation indexes MiPA through MiPΩ accordingly for each switch unit 604-PA through 604-PΩ.

During balanced operation, Mi for each switch unit 604 can be set at a value that causes the same or similar amount of net energy over time to be supplied by energy source 206 and/or energy buffer 204 to each array 700. For example, Mi for each switch unit 604 could be the same or similar, and can be set at a level or value that causes the module 108IC to perform a net or time average discharge of energy to the one or more arrays 700-PA through 700-PΩ during balanced operation, so as to drain module 108IC at the same rate as other modules 108 in system 100. In some embodiments, Mi for each unit 604 can be set at a level or value that does not cause a net or time average discharge of energy during balanced operation (causes a net energy discharge of zero). This can be useful if module 108IC has a lower aggregate charge than other modules in the system.

When an unbalanced condition occurs between arrays 700, then the modulation indexes of system 100 can be adjusted to cause convergence towards a balanced condition or to minimize further divergence. For example, control system 102 can cause module 108IC to discharge more to the array 700 with low charge than the others, and can also cause modules 108-1 through 108-N of that low array 700 to discharge relatively less (e.g., on a time average basis). The relative net energy contributed by module 108IC increases as compared to the modules 108-1 through 108-N of the array 700 being assisted, and also as compared to the amount of net energy module 108IC contributes to the other arrays. This can be accomplished by increasing Mi for the switch unit 604 supplying that low array 700, and by decreasing the modulation indexes of modules 108-1 through 108-N of the low array 700 in a manner that maintains Vout for that low array at the appropriate or required levels, and maintaining the modulation indexes for other switch units 604 supplying the other higher arrays relatively unchanged (or decreasing them).

The configuration of module 108IC in FIGS. 10A-10B can be used alone to provide interphase or interarray balancing for a single system, or can be used in combination with one or more other modules 108IC each having an energy source and one or more switch portions 604 coupled to one or more arrays. For example, a module 108IC with 22 switch portions 604 coupled with Ω different arrays 700 can be combined with a second module 108IC having one switch portion 604 coupled with one array 700 such that the two modules combine to service a system 100 having Ω+1 arrays 700. Any number of modules 108IC can be combined in this fashion, each coupled with one or more arrays 700 of system 100.

Figure 10C:
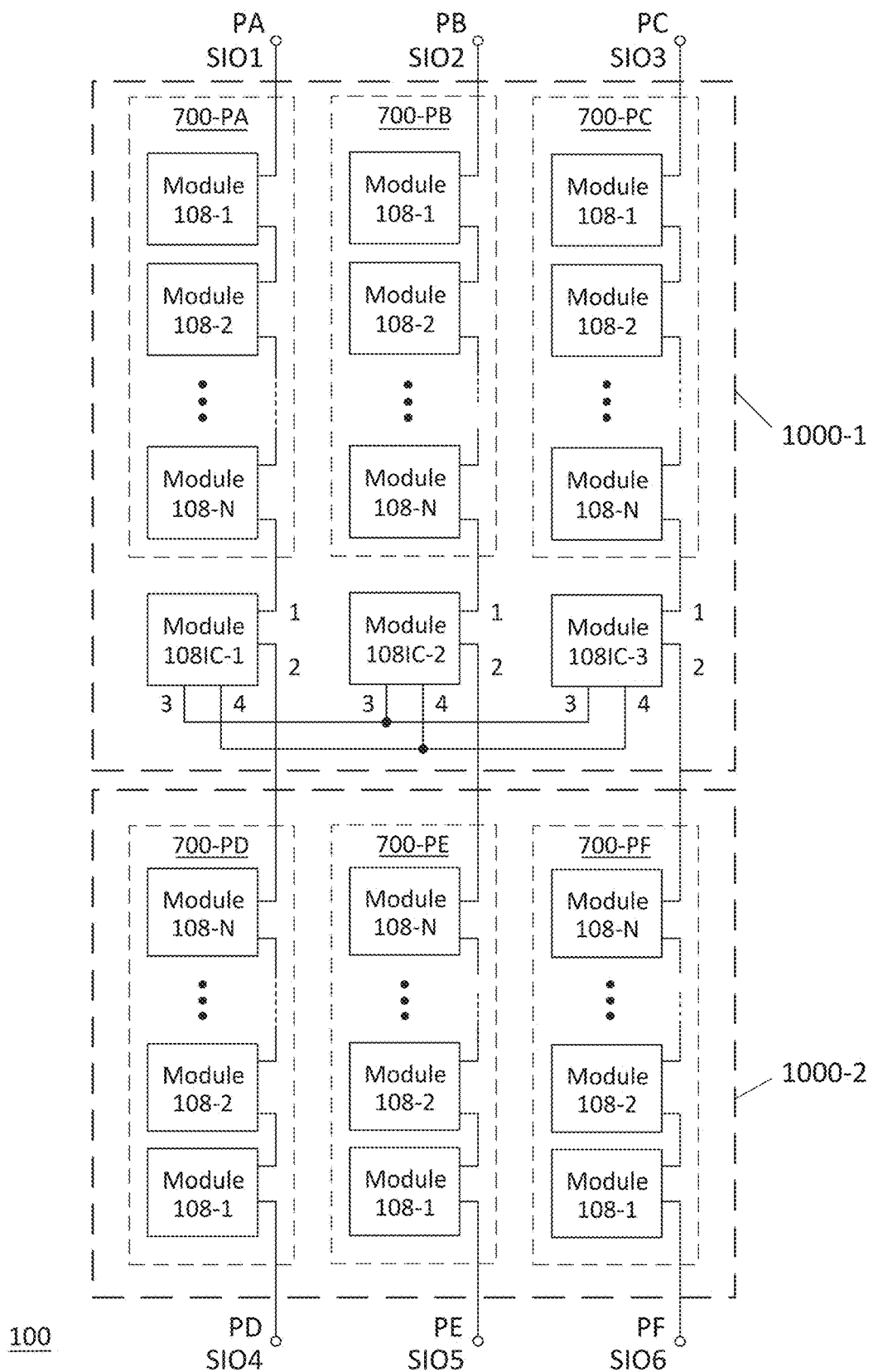
FIG. 10C is a block diagram depicting an example embodiment of a modular energy system having two subsystems connected together by interconnection modules.

Furthermore, IC modules can be configured to exchange energy between two or more subsystems of system 100. FIG. 10C is a block diagram depicting an example embodiment of system 100 with a first subsystem 1000-1 and a second subsystem 1000-2 interconnected by IC modules. Specifically, subsystem 1000-1 is configured to supply three-phase power, PA, PB, and PC, to a first load (not shown) by way of system I/O ports SIO1, SIO2, and SIO3, while subsystem 1000-2 is configured to supply three-phase power PD, PE, and PF to a second load (not shown) by way of system I/O ports SIO4, SIO5, and SIO06, respectively. For example, subsystems 1000-1 and 1000-2 can be configured as different packs supplying power for different motors of an EV or as different racks supplying power for different microgrids.

In this embodiment each module 108IC is coupled with a first array of subsystem 1000-1 (via IO port 1) and a first array of subsystem 1000-2 (via IO port 2), and each module 108IC can be electrically connected with each other module 108IC by way of I/O ports 3 and 4, which are coupled with the energy source 206 of each module 108IC as described with respect to module 108C of FIG. 3C. This connection places sources 206 of modules 108IC-1, 108IC-2, and 108IC-3 in parallel, and thus the energy stored and supplied by modules 108IC is pooled together by this parallel arrangement. Other arrangements such as serious connections can also be used. Modules 108IC are housed within a common enclosure of subsystem 1000-1, however the interconnection modules can be external to the common enclosure and physically located as independent entities between the common enclosures of both subsystems 1000.

Each module 108IC has a switch unit 604-1 coupled with IO port 1 and a switch unit 604-2 coupled with I/O port 2, as described with respect to FIG. 10B. Thus, for balancing between subsystems 1000 (e.g., interpack or inter-rack balancing), a particular module 108IC can supply relatively more energy to either or both of the two arrays to which it is connected (e.g., module 108IC-1 can supply to array 700-PA and/or array 700-PD). The control circuitry can monitor relative parameters (e.g., SOC and temperature) of the arrays of the different subsystems and adjust the energy output of the IC modules to compensate for imbalances between arrays or phases of different subsystems in the same manner described herein as compensating for imbalances between two arrays of the same rack or pack. Because all three modules 108IC are in parallel, energy can be efficiently exchanged between any and all arrays of system 100. In this embodiment, each module 108IC supplies two arrays 700, but other configurations can be used including a single IC module for all arrays of system 100 and a configuration with one dedicated IC module for each array 700 (e.g., six IC modules for six arrays, where each IC module has one switch unit 604). In all cases with multiple IC modules, the energy sources can be coupled together in parallel so as to share energy as described herein.

In systems with IC modules between phases, interphase balancing can also be performed by neutral point shifting (or common mode injection) as described above. Such a combination allows for more robust and flexible balancing under a wider range of operating conditions. System 100 can determine the appropriate circumstances under which to perform interphase balancing with neutral point shifting alone, interphase energy injection alone, or a combination of both simultaneously.

Figure 10D:
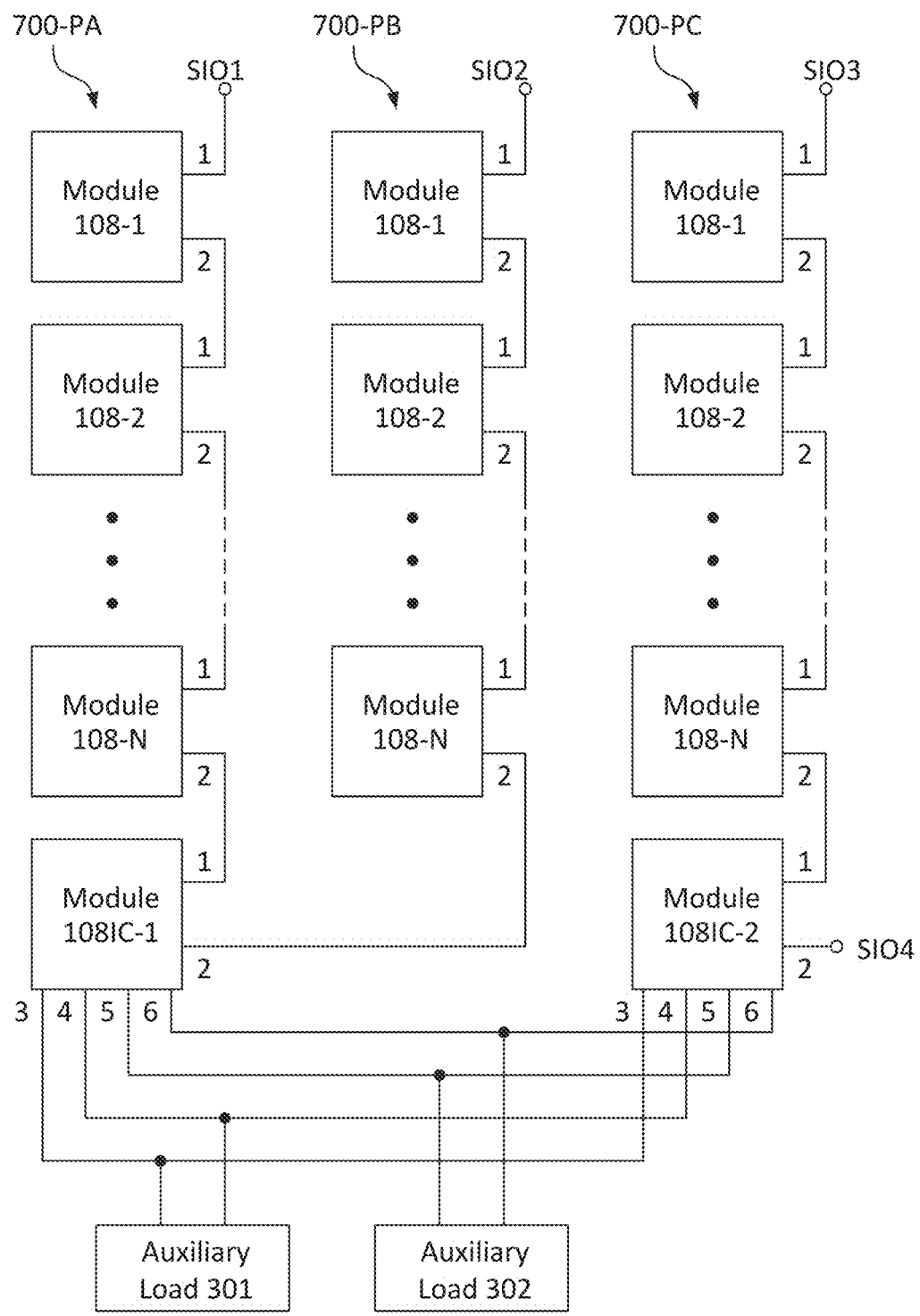
FIG. 10D is a block diagram depicting an example embodiment of a three-phase modular energy system having interconnection modules supplying auxiliary loads.
Figure 10E:
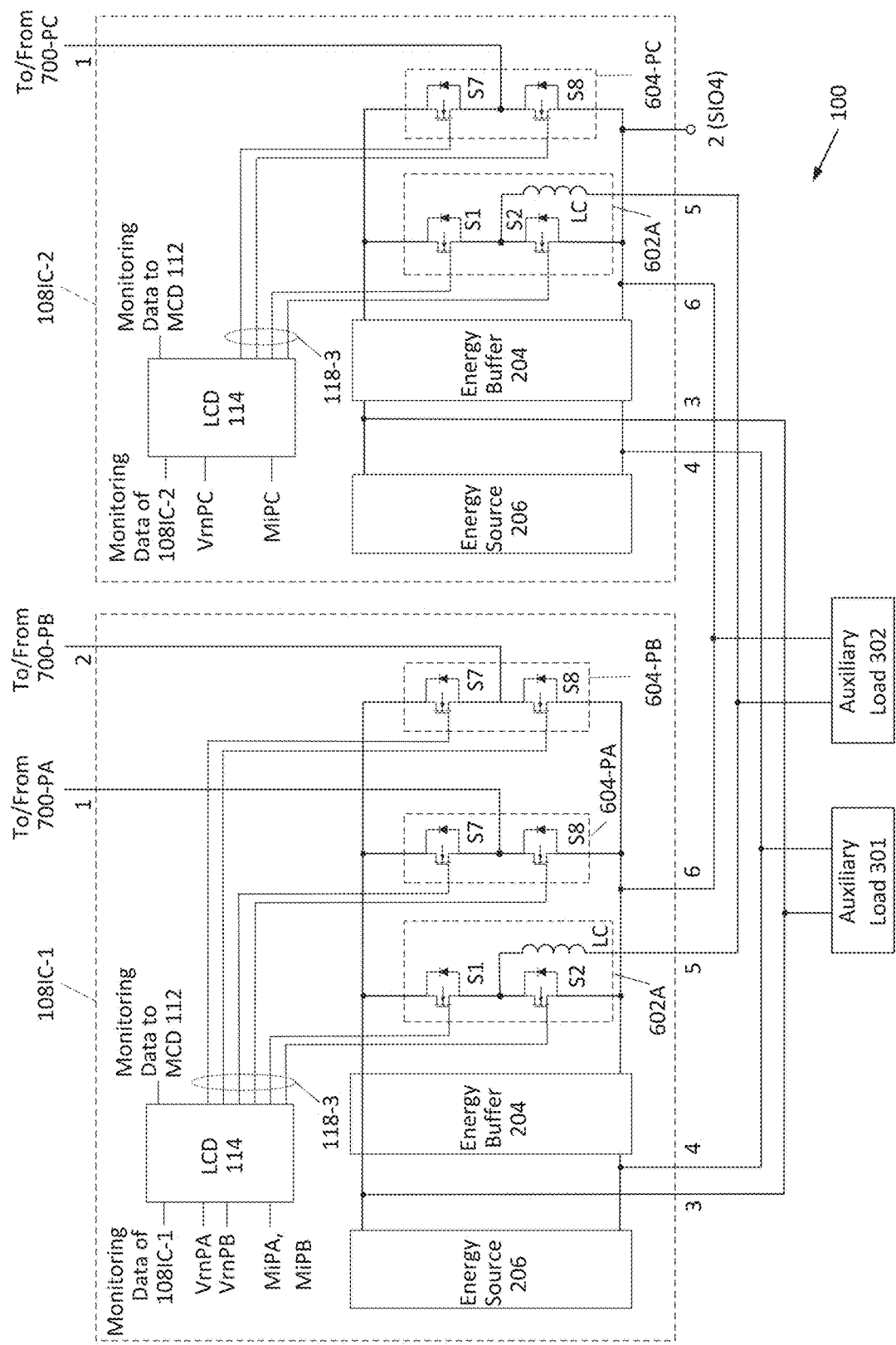
FIG. 10E is a schematic view depicting an example embodiment of the interconnection modules in the multiphase embodiment of FIG. 10D.

IC modules can also be configured to supply power to one or more auxiliary loads 301 (at the same voltage as source 206) and/or one or more auxiliary loads 302 (at voltages stepped down from source 302). FIG. 10D is a block diagram depicting an example embodiment of a three-phase system 100A with two modules 108IC connected to perform interphase balancing and to supply auxiliary loads 301 and 302. FIG. 10E is a schematic diagram depicting this example embodiment of system 100 with emphasis on modules 108IC-1 and 108IC-2. Here, control circuitry 102 is again implemented as LCD 114 and MCD 112 (not shown). The LCDs 114 can receive monitoring data from modules 108IC (e.g., SOC of ES1, temperature of ES1, Q of ES1, voltage of auxiliary loads 301 and 302, etc.) and can output this and/or other monitoring data to MCD 112 for use in system control as described herein. Each module 108IC can include a switch portion 602A (or 602B described with respect to FIG. 6C) for each load 302 being supplied by that module, and each switch portion 602 can be controlled to maintain the requisite voltage level for load 302 by LCD 114 either independently or based on control input from MCD 112. In this embodiment, each module 108IC includes a switch portion 602A connected together to supply the one load 302, although such is not required.

The energy source 206 of each IC module can be at the same voltage and capacity as the sources 206 of the other modules 108-1 through 108-N of the system, although such is not required. For example, a relatively higher capacity can be desirable in an embodiment where one module 108IC applies energy to multiple arrays 700 (FIG. 10A) to allow the IC module to discharge at the same rate as the modules of the phase arrays themselves. If the module 108IC is also supplying an auxiliary load, then an even greater capacity may be desired so as to permit the IC module to both supply the auxiliary load and discharge at relatively the same rate as the other modules.

Example Embodiments of Frameworks

The subject matter pertains to a housing framework (e.g., cabinets or racks of matching sizes) that permits ready customization to add to or detract from the number of modules 108 present in a multi-level converter system 100 providing multi-phase power to a load. Example embodiments pertaining to the frameworks are described with reference to FIGS. 11A-18. These embodiments can be implemented with all aspects of system 100 described with respect to FIGS. 1A-10E unless stated otherwise or logically implausible. As such, the many variations already described will not be repeated with respect to the following embodiments.

Figure 11A:
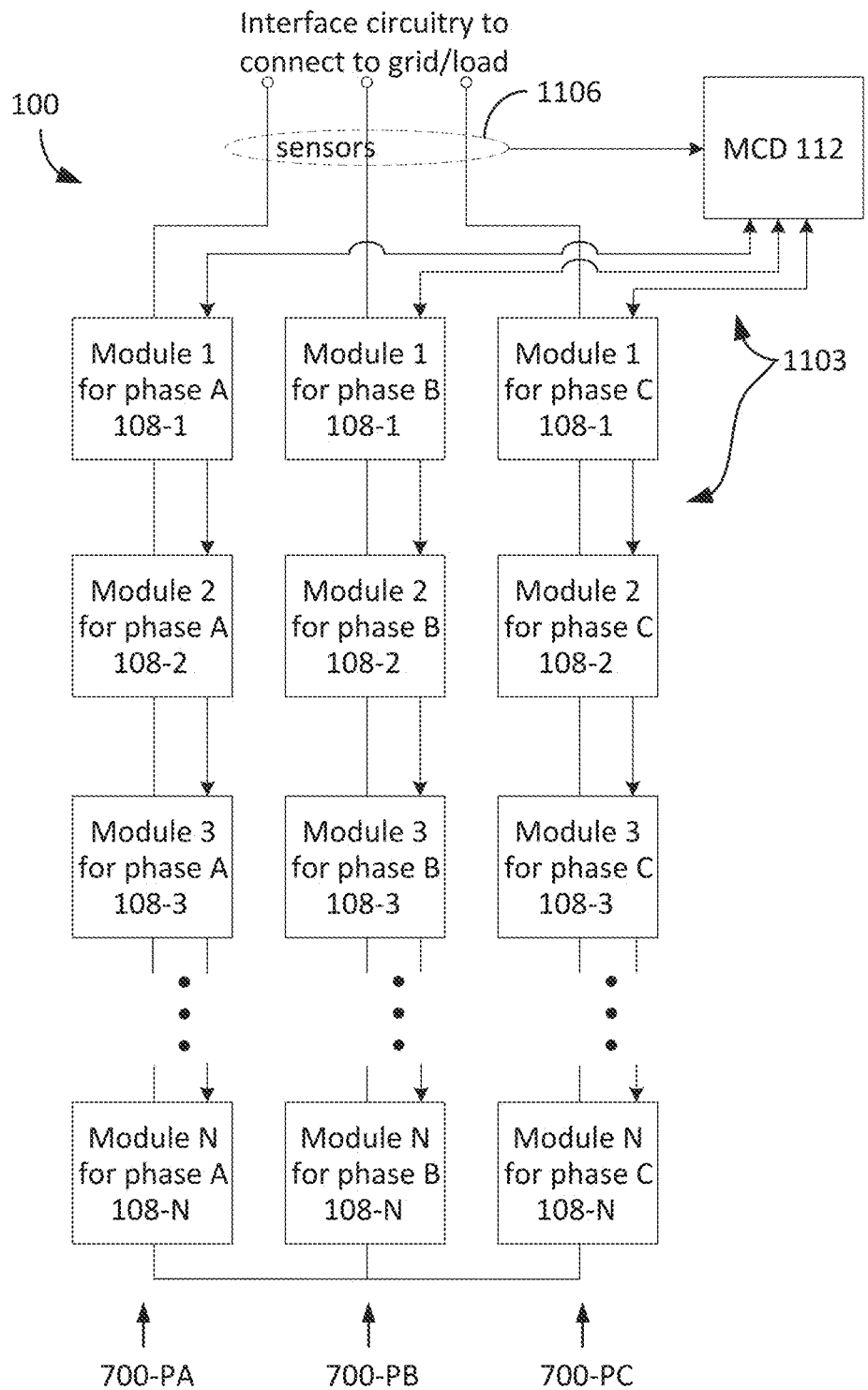
FIGS. 11A-11B are block diagrams depicting communication and power paths in example embodiments of multi-phase module-based energy system frameworks.
Figure 11B:
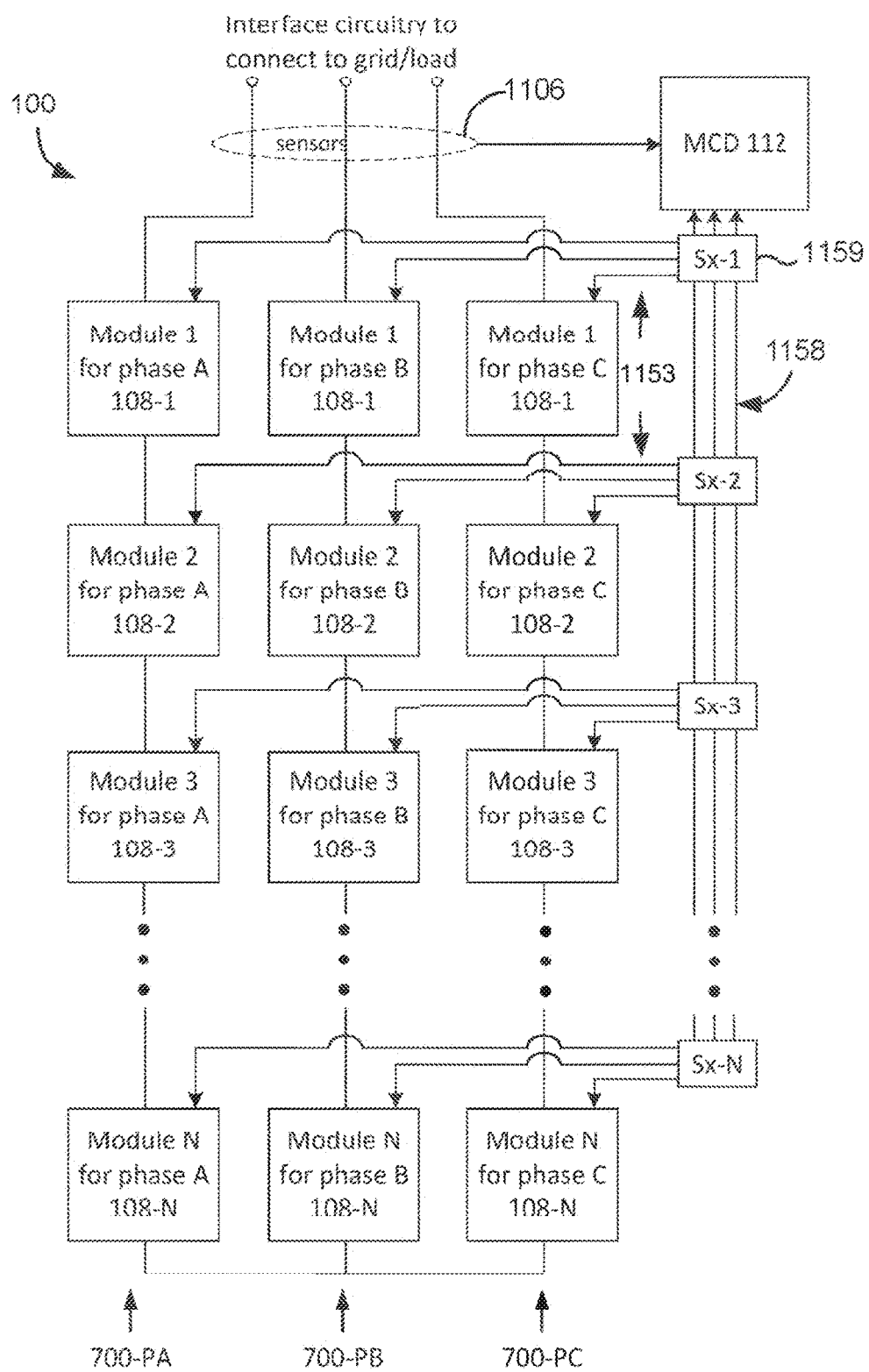

Example embodiments of multi-level three-phase systems 100 are shown in FIGS. 11A and 11B. Each system 100 has three one-dimensional arrays 700-PA, 700-PB, and 700-PC of modules 108, where each of the modules 108 in a particular array 700 can be connected in series and the voltages summed to provide a total voltage for the phase. Rows of the modules, e.g., the first row in FIG. 11A, including three modules 108-1 of arrays 700-PA, 700-PB, 700-PC, and the corresponding row in FIG. 11B, and each similar row represent levels of the systems 100 where each level supplies power for the different phases. Columns of the modules, e.g., the first column in FIG. 11A, including 'N' modules 108-1 through 108-N of array 700-PA, and the corresponding column in FIG. 11B, contain modules 108 connected for a first phase (PA). Similarly, the second columns including 'N' modules 108-1 through 108-N of array 700-PB contain 'N' modules connected for a second phase. Likewise, the third columns including 'N' modules 108-1 through 108-N of array 700-PC contain 'N' modules connected for a third phase.

In FIGS. 11A and 11B, communication paths for the bidirectional communication of information between modules 108 and control system 102, which in this embodiment is MCD 112, are indicated by arrows 1103. As described earlier, modules 108 of each phase (PA, PB, PC) receive a voltage reference signal (Vref) specific to that phase, as well as 'N' modulation indexes (M), with one M specific to each module. Status and sensor data collected at each module or from auxiliary sensors 1106 are communicated back to MCD 112 over these paths.

FIG. 11A depicts a system 100 where the communication paths 1103 extend from MCD 112 to the first module 108-1 of each phase (e.g., to LCD 114, not shown), and from there the information path 1103 is continued to the remaining modules 108-2 through 108-N of each phase in a daisy chain or serial fashion between modules 108. In FIG. 1B, information for all three phases is passed along one or more buses 1158 to switching circuitry 1159 for each level (Sx-1 through Sx-N), where it is then selectively routed to the modules 108 of each level. Switching circuitry 1159 can be housed with modules 108 in the cabinet or rack for that level. In another alternative (not shown), independent and discrete bidirectional paths are present between each module (e.g., LCD 114) and MCD 112. A combination of approaches is also possible, e.g., such that Vref is communicated in the fashion of FIG. 11A (or 11B), and the remaining data is communicated in the other fashion of FIG. 11B (or 11A). Communication paths or links can each be wired or wireless communication paths or links that communicate data or information bidirectionally, in parallel or series fashion. Data can be communicated in a standard or custom format.

FIG. 12A is a block diagram depicting an example embodiment of a housing framework 1200 corresponding to the figurative arrangement of FIGS. 11A and 11B. FIGS. 12B and 12C show front and perspective views, respectively, of an example electronics cabinet 1201, sometimes also called a "rack," suitable for use in the framework. Other designs for cabinet or racks may also be suitable, having a characteristic of arranging electronic components in a straight line, for example, a vertical line. FIG. 12D depicts an example implementation of multiple cabinets 1201 arranged in a framework 1200.

As can be seen in FIG. 12A, modules 108-1 through 108-N for each array 700 (e.g., modules 108-1 through 108-N for array 700-PA, modules 108-1 through 108-N for array 700-PB, and modules 108-1 through 108-N for array 700-PC) are aligned in separate ranks along a first straight line 1202 to facilitate direct connections between modules within each array 700. For example, modules 108 may be aligned in separate rows parallel to horizontal line 1202.

Connections between modules 108 may be serial or parallel. In the illustrated example, modules 108-1 through 108-N of array 700-PA are in an upper row, modules 108-1 through 108-N of array 700-PB are in a middle row, and modules 108-1 through 108-N of array 700-PC are in a lower row.

Modules 108 for each level of the multi-level converter system 100 are aligned in separate ranks along a second straight line 1204, orthogonal to the first straight line 1202. For example, modules 108 may be aligned in separate columns parallel to the vertical line 1204. The lines 1202, 1204 may be imaginary lines. Alignment of modules 108 with the lines need not be geometrically perfect, but should be close enough to facilitate efficient electrical connections between modules 108. Advantageously, modules 108 for each level may be located in a common cabinet or rack section 1201. For example, in the illustrated example, a first cabinet 1201-1 houses modules 108-1 of a first level, a second cabinet 1201-2 houses modules 108-2 of a second level, a third cabinet 1201-3 houses modules 108-3 of a third level, and an Nth cabinet 1201-N houses modules 108-N of an Nth level. If additional module levels need to be added to provide more power or redundancy (or alternatively if a level of modules need to be removed) then this framework 1200 can be easily added to (and subtracted from) to meet those needs by adding or removing cabinets 1201. The maximum number of cabinets 1201 is limited only by the practical limits of space for framework 1200, and the operating parameters of the particular application.

An example embodiment of a single cabinet or rack section 1201 is shown at FIGS. 12B and 12C. FIG. 12D shows a framework 1200 of 13 cabinets or rack sections to the right, where the first three of the 13 are shown with front panels in place, and the remaining are shown without front panels. Each cabinet or rack section 1201 can have a housing with panels on any number of the sides, top and/or bottom. In this embodiment the housing is present on all sides, top, and bottom (not shown). Preferably panels or covers are present over high voltage conductors for safety.

Figure 13A:
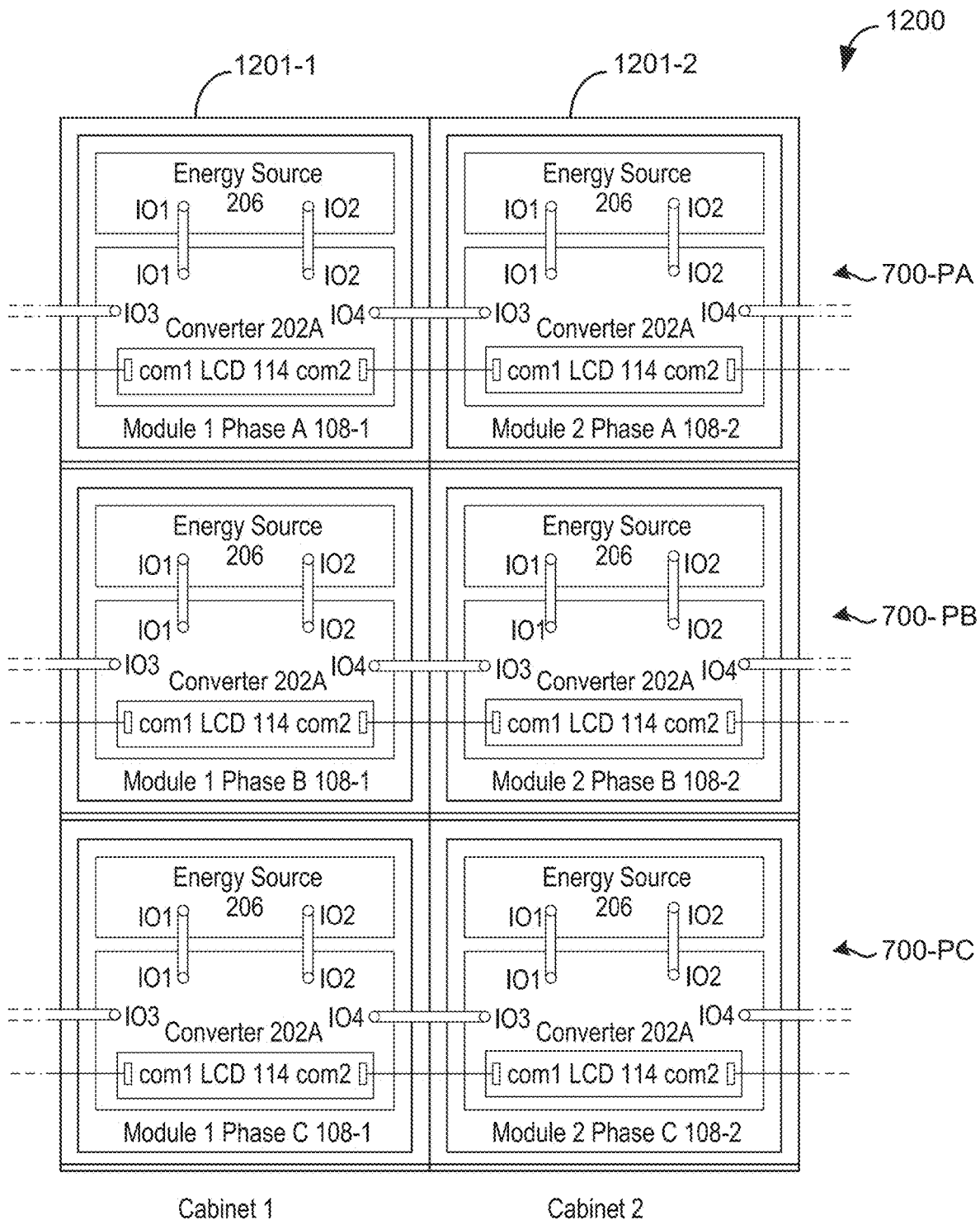
FIGS. 13A-13B are block diagrams depicting example embodiments of a phase and module-based arrangement of modules and connections in a multi-phase module-based energy system framework.
Figure 13B:
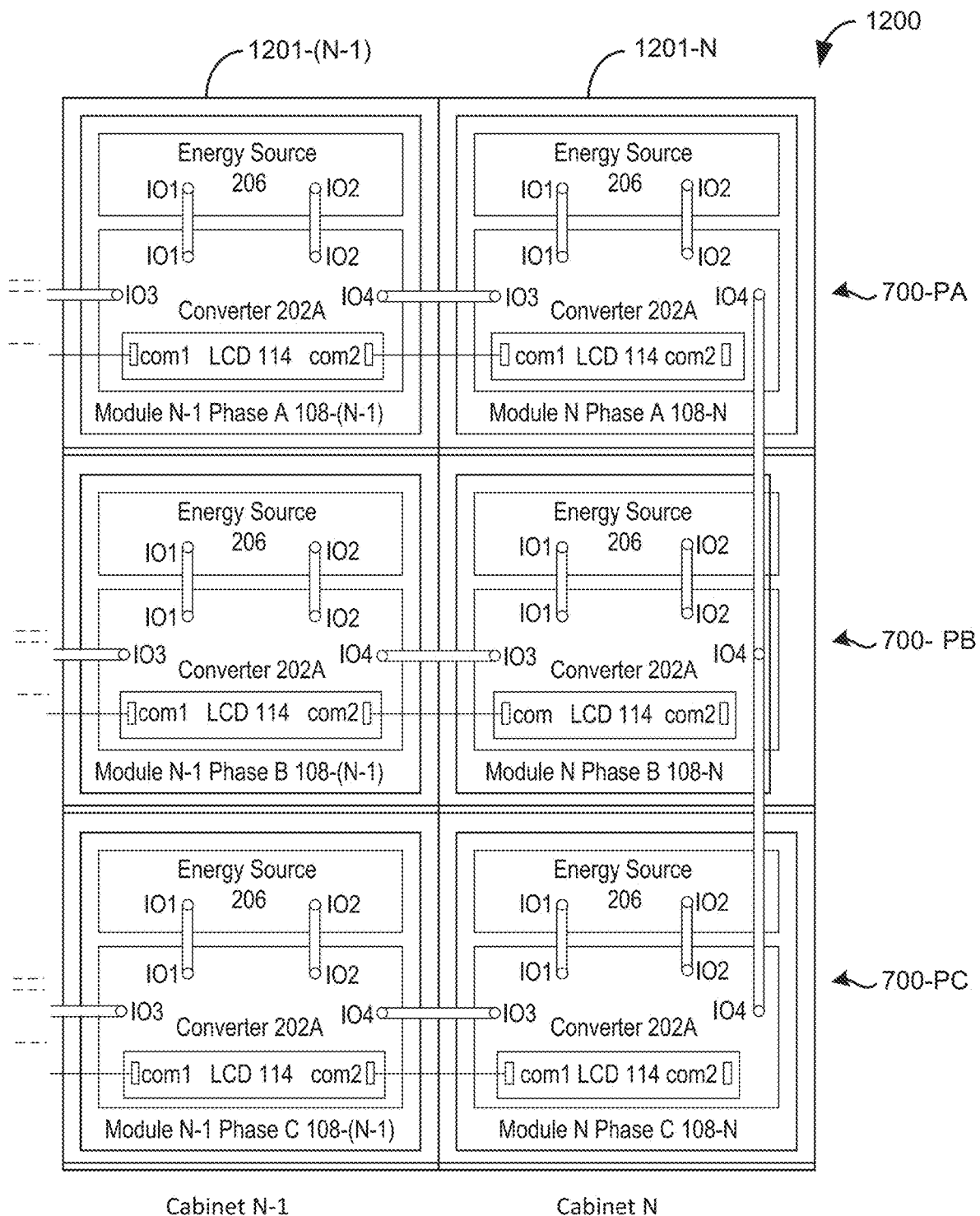

FIG. 13A is a schematic diagram depicting an example embodiment of framework 1200 with two adjacent levels of an N-level system, one level located in its own cabinet 1201-1 and another level is located in an immediately adjacent cabinet 1201-2. This pattern is repeated throughout framework 1200, except that the terminal cabinets of each linear array of cabinets may have different or additional connections as described herein below. FIG. 13B is a schematic diagram depicting an example embodiment with the last two adjacent levels of an N-level system, where a next-to-last (N−1) level is located in the left cabinet 1201-(N−1) and a last (Nth) level is located in the right cabinet 1201-N. The components in the cabinets here are the same as in FIG. 13A with different couplings between the converters 202A in the terminal (e.g., last) cabinet 1201-N.

In this example, each module 108 includes a single energy source 206 coupled with a converter 202A, as well as a local control device (LCD) 114 integrated with converter 202A. The embodiment can be modified to accommodate different converters (e.g., 202B, 202C) and additional energy sources (e.g., 206A and 206B). Each cabinet 1201 may be configured with a preexisting receptacle (e.g., a shelf, slot, or recess) to receive each module 108.

Alternatively, cabinet 1201 may be provided with receptacles to independently receive each component 202A, 206, 114 of module 108 (e.g., a receptacle for energy source 206 of the first module, a receptacle for converter 202 of the first module, a receptacle for energy source 206 of the second module, and so forth). In these embodiments, the term "module" encompasses multiple discrete components electrically connected together to perform the function of one module, but without a single housing dedicated to that module.

Each energy source 206 may be configured as multiple types and with multiple configurations described herein, e.g., with respect to FIGS. 4A-4F. Within each module 108, LCD 114 communicates with converter 202A circuitry, an energy buffer 204 (not shown) and monitor circuitry 208 (not shown) associated with the various components.

Within each phase, converter 202 of one module 302 in a first cabinet 1201 is connected to at least one other horizontally-aligned converter 202 in an adjacent cabinet 1201. Power connections within a cabinet 1201 or between cabinets 1201 (e.g., between each energy source 206 and its converter 202, or between converters 202) are preferably implemented with robust connectors that minimize self-inductance, such as an insulated bus bar (e.g., a laminated rigid bar with rectangular or other non-circular cross-section). These bars can be fastened in place as shown in FIGS. 13A and 13B. The horizontally aligned arrangement between coupled components permits short and direct connections for the bars, which further minimizes inductance, noise, and losses. In FIG. 13A, the power connections are made across the front surface of the cabinets, but in other embodiments the connections can be made directly between adjacent sides (e.g., between bottom of energy source 206 and top of converter 202 of a module 108, or from right side of converter 202 of module 108-1 to left side of converter 202 of module 108-2). FIG. 13B shows cabinets 1201-(N−1) and 1201-N with the converter outputs (104) in the terminal cabinet 1201-N connected together as also depicted in FIGS. 11A, 11B, and 12A.

Data connections (e.g., between MCD 112 and LCDs 114, or between LCDs 114) are preferably high speed bidirectional connections such as fiber optic, although other wired or wireless connections are possible. In the example of FIG. 13A, each LCD 114 within the phase or array is daisy chained (as described in FIG. 1A) with a wired connection shown at the communication (com) ports. In embodiments where LCDs 114 are daisy chained, the master control signals can be initially supplied to any module 108 in the array 700, so long they are subsequently supplied to each module in the array 700. In one example implementation the signals from MCD 112 are input to LCD 114 of module 108-1, and then propagated to the remaining modules in that array 200 (2-N). In the configuration of FIG. 11B, where a discrete connection exists between each LCD 114 and MCD 112, only one bidirectional com port is necessary. All signals (sensor information, M, Vref, etc.) can be exchanged over one port and bus, or multiple ports and buses can be used.

The sides of each cabinet 1201 may have ports, openings, or other passages or connections to permit easy interconnection between cabinets. Alternatively, all or part of sidewalls between adjoining or adjacent cabinets 1201 may be omitted to facilitate connection between cabinets. As used herein, "adjacent" means "adjoining, or nearly adjoining without an intervening barrier."

In an alternative embodiment, the framework may include a backplane for carrying communication signals between LCDs 114 of each array 700 and between MCD 112 and each LCD 114 of all arrays 700. For example, each converter 202 (or LCD 114) may be configured to plug into or otherwise mate with a connector in the back of its cabinet receptacle, and that connector be configured to couple with one or more buses of the backplane for carrying the signals through the framework.

Figure 14C:
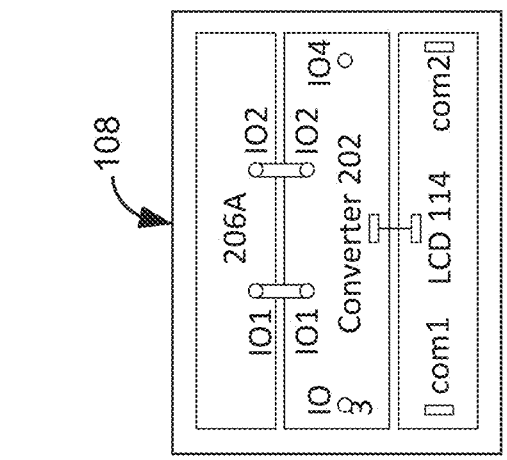
Figure 14A:
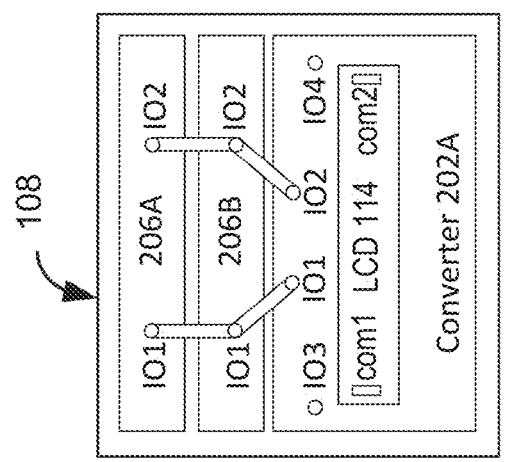
Figure 14A:
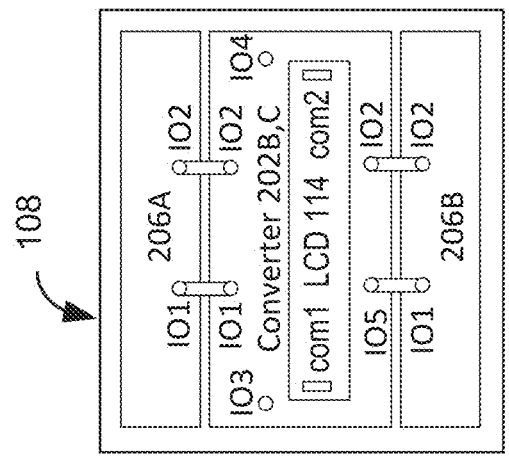

FIGS. 14A-14C are schematic diagrams depicting additional example embodiments of modules 108. FIG. 14A shows module 108 with two energy sources 206A and 206B connected independently to converter 202B,C (FIGS. 6B-6C). Energy sources 206A,B are positioned on opposite sides of converter 202B,C to minimize induction between them. Converter 202B,C has two IO2 ports which can be internally connected to the same potential (e.g., see FIGS. 6B,6C). FIG. 14B shows a module 108 with two energy sources 206A and 206B connected to converter 202A in parallel. In both FIGS. 14A and 14B, LCD 114 is integrated with the converter 202. LCD 114 can be integrated in a secured, or hard-wired fashion, or can be a module of converter 202 that is removable and replaceable from a receptacle in the converter 202. FIG. 14C shows a module 108 wherein LCD 114 is a separate component from converter 202. In all examples, module 108 can be implemented: 1) as a single unit with energy source(s) 206, converter 202, and LCD 114 securely integrated therewith, such that the cabinet has one receptacle for the module 108 as a whole; 2) as a single unit with one or more receptacles for energy source(s) 206, converter 202, and LCD 114 in the module 108, where the cabinet 1201 has one receptacle for the module 108 as a whole; 3) any combination of 1 and 2, or 4) in a manner where cabinet 1201 has a receptacle for each component of the module (energy source(s) 206, converter 202, and LCD 114, etc.), and there is no "module" separate from the components themselves.

Figure 15A:
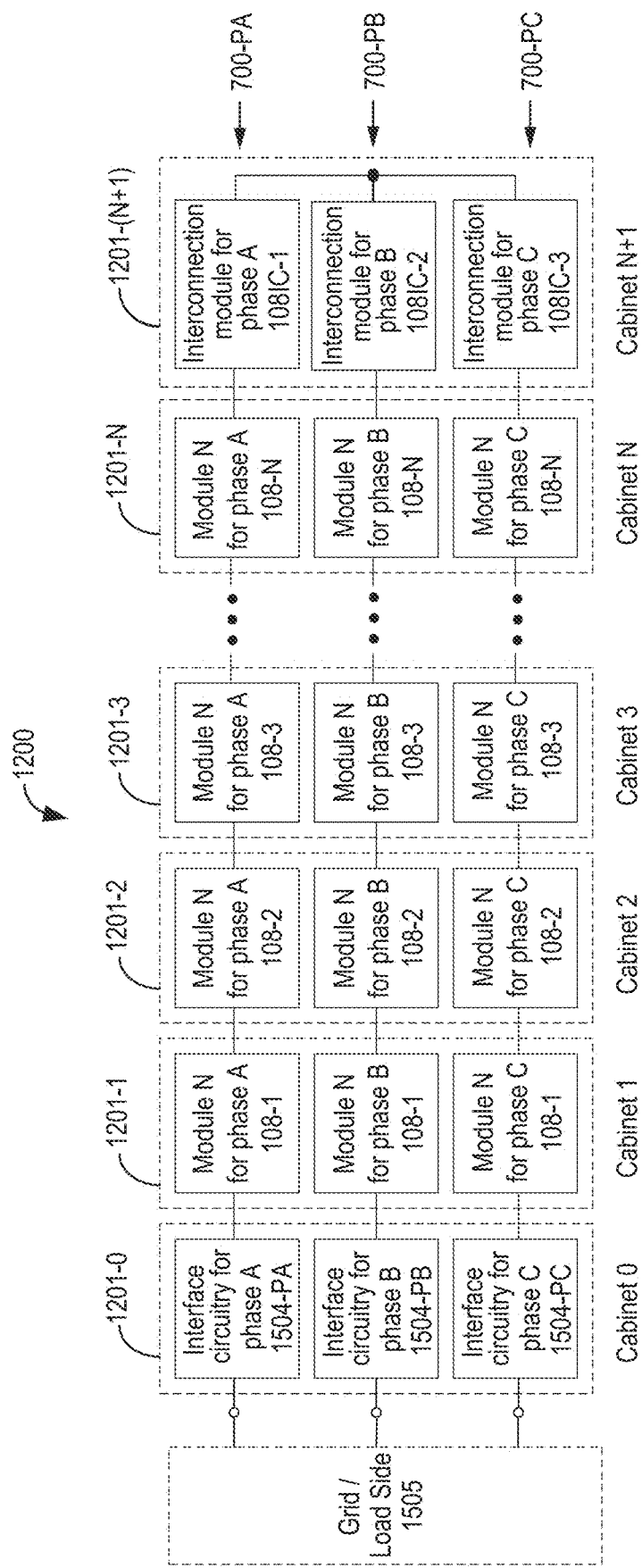
FIGS. 15A, 15B, 15C are schematic diagrams depicting example embodiments of a multi-level converter system with an additional cabinet (cabinet 0) between the first cabinet and the grid and/or load that contains interface circuitry and various configurations of the last (N+1th) cabinet.

FIG. 15A is a block diagram depicting an example embodiment of a framework 1200 for a multi-level converter system 100 with an additional cabinet 1201-0 (cabinet 0) between the first cabinet 1201-1 and the grid and/or load 1505. Cabinet 1201-0 contains interface circuitry 1504 interposed between modules 108 and the grid and/or load side 1505. Interface circuitry 1504 may be any circuitry required by the application, such as one or more filters, fuses, switches, or others. Phase A interface circuitry 1504-PA may be connected to the phase A modules 108-1 through 108-N in their respective cabinets 1201-1 through 1201-N. Phase B interface circuitry 1504-PB may be connected to the phase B modules 108-1 through 108-N in their respective cabinets 1201-1 through 1201-N. Likewise, phase C interface circuitry 1504-PC may be connected to modules 108-1 through 108-N in their respective cabinets 1201-1 through 1201-N. As described in connection with FIGS. 11A and 11B, each cabinet 1201 holds modules 108 for an independent level of the system 100 in all three phases.

On the opposite side of framework 1200, a last (terminal) cabinet 1201-(N+1) includes three interconnection modules 108IC-1, 108IC-2, 108IC-3 that can balance energy between the different phases, coupled to the terminal modules 108-N for each phase, respectively. Each framework 1200 can include a cabinet 1201-0 dedicated to interface circuitry, and/or a cabinet 1201-(N+1) containing interconnection modules 108IC, one for each phase, depending on the needs of the application.

Figure 15B:
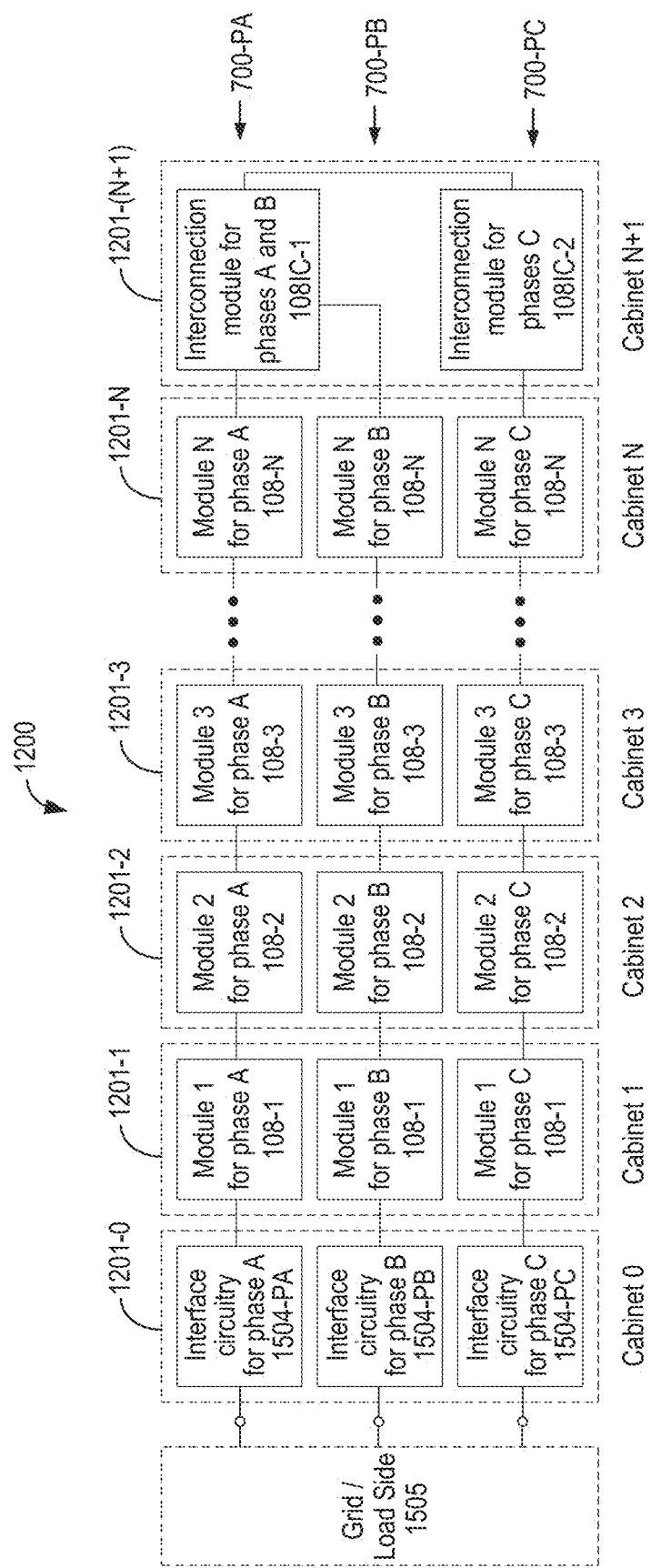

FIG. 15B is a block diagram depicting another example embodiment of a framework 1200 likewise including the additional cabinet 1201-0 between the first cabinet 1201-1 and the grid and/or load 1505 containing interface circuitry 1504. Framework 1200 has a cabinet 1201-(N+1) holding a first interconnection module 108IC-1 coupled to modules 108-N of array 700-PA and array 700-PB. Cabinet 1201-(N+1) also holds module 108IC-2 coupled to modules 108-N of array 700-PC. Modules 108IC-1 and 108IC-2 are coupled together in a manner similar to that described with respect to FIGS. 10D and 10E and are configured to balance energy between phases PA, PB, and PC (or multiple arrays 700) as described herein.

Figure 15C:
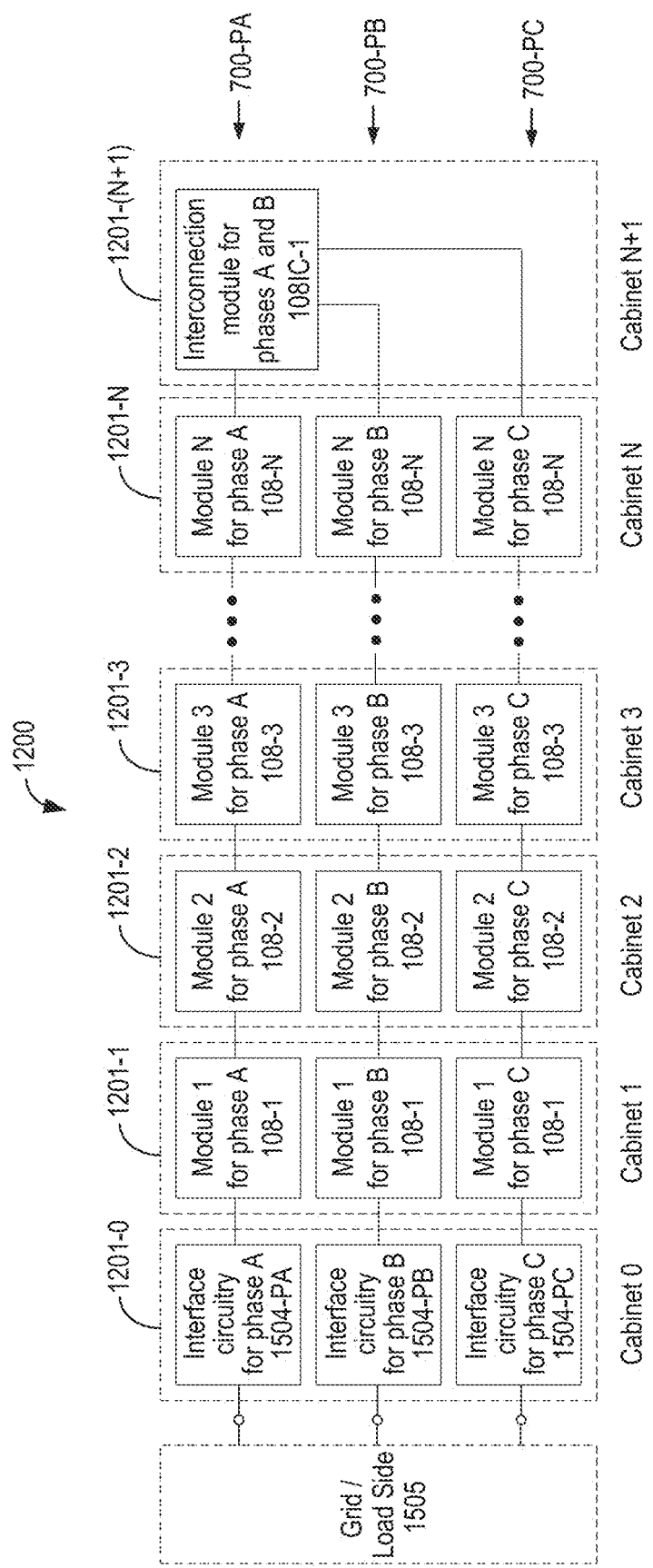

FIG. 15C is a block diagram depicting another example embodiment of a framework 1200 likewise including the additional cabinets 1201-0 and 1201-(N+1). Cabinet 1201-(N+1) holds an interconnection module 108IC coupled to modules 108-N of arrays 700-PA, PB, and PC. Module 108IC is similar to that described with respect to FIGS. 10A and 10B (but with three phases) and is configured to balance energy between phases PA, PB, and PC (or multiple arrays 700) as described herein. Depending on the number of sources 106 within module 108IC, the module 108IC may have a size similar to that of other modules 108-1 through 108-N that the internal volume of cabinet 108-(N+1) is not filled (as shown here), or may have a larger size (e.g., with three or more energy sources 206) that takes up greater space within cabinet 1201-(N+1). The specific interconnections between modules are not shown in detail, but these embodiments of FIGS. 15A-15C can be configured similarly to those of FIGS. 13A-14C in that and other respects.

Figure 15D:
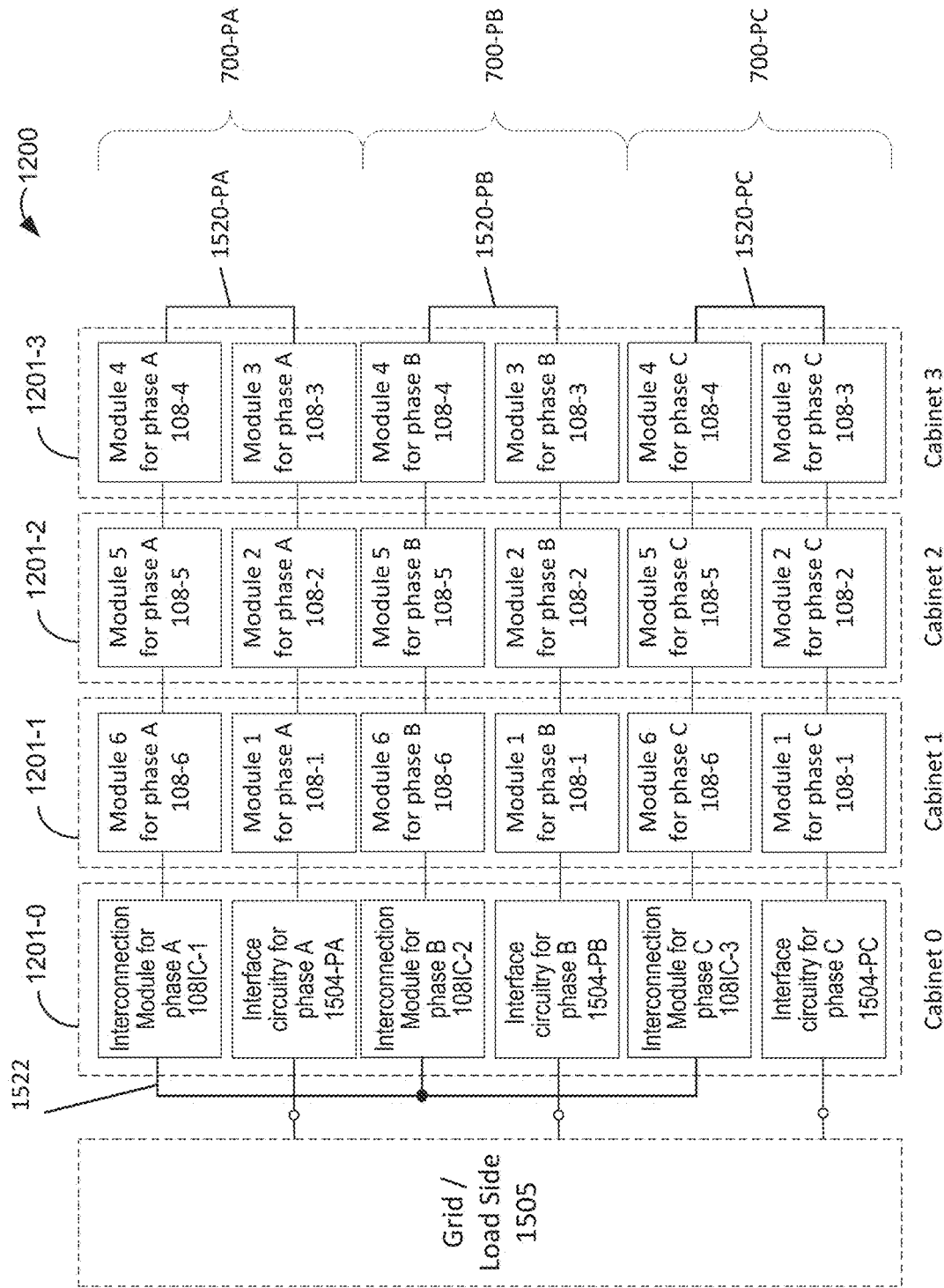
FIG. 15D is a schematic diagram depicting an example embodiment of a multi-level converter system with cabinets holding all modules from one or two levels of the system.

FIG. 15D is a block diagram depicting another example embodiment of a framework 1200 having three arrays 700-PA, 700-PB, and 700-PC with a similar electrical layout as the embodiment of FIG. 15A but with six modules 108-1 through 108-6 plus an IC module 108IC for each array. Framework 1200 can be configured to have a relatively greater height and a relatively shorter length like here, where the modules 108 of each array 700 occupy two (or multiple) rows as opposed to one. Here, cabinet 1201-0 includes the interface circuitry 1504 as well as the IC module 108IC for each array (e.g., the first and the last modules of the array), where the IC modules are interconnected by connection 1522 (e.g., common coupling of ports 3, and common coupling of ports 4, etc., as described with respect to FIG. 10E). Cabinet 1201-1 includes the first module 108-1 and the sixth module 108-6 of each array, and cabinet 1201-2 includes the second module 108-2 and the fifth module 108-5 of each array. Cabinet 1201-3 includes the third module 108-3 and the fourth module 108-4 of each array, connected together by connections 1520-PA, PB, and PC for arrays 700-PA, PB, and PC, respectively.

The modules 108 of each cabinet can be described as being arranged in an alternating fashion. Thus, in this embodiment each cabinet includes every module from a particular level of each array (e.g., every module 108-1) along with every module from another level of the array (e.g., every module 108-6). Here, each cabinet 1201 includes modules from two levels of each array. Other configurations can be implemented such that each cabinet includes every module from three, four, or more levels of the array, depending on the height of the modules and the available space. The presence of interface circuitry may occupy spaces that would otherwise be held by a module, such that, while most cabinets 1201 in framework 1200 will hold every module 108 from two or more levels, each cabinet 1200 in the framework 1200 is not required to do so, like with cabinet 1201-0 in this embodiment.

Figure 16A:
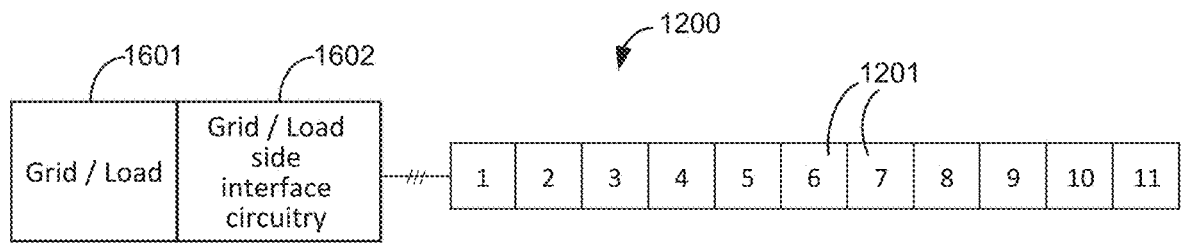
FIGS. 16A-16G are plan view diagrams depicting example embodiments of various cabinet arrangements in a multi-phase module-based energy system framework.
Figure 16B:
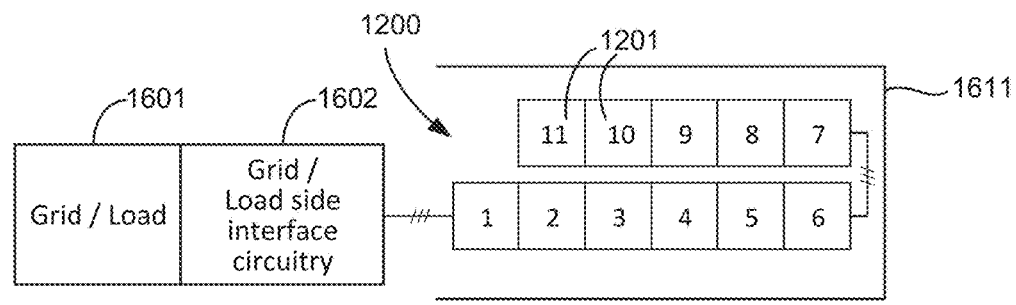
Figure 16C:
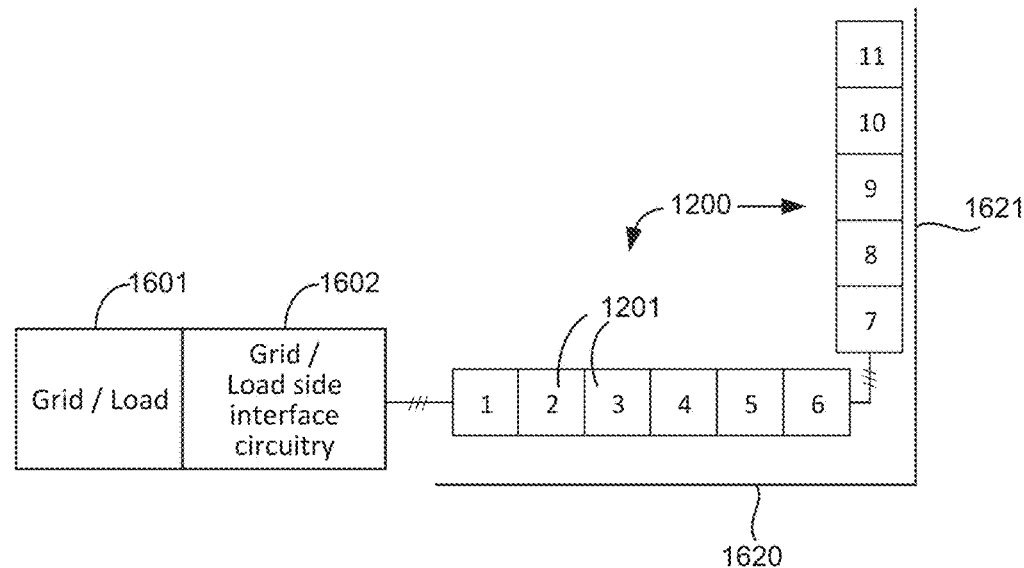
Figure 16D:
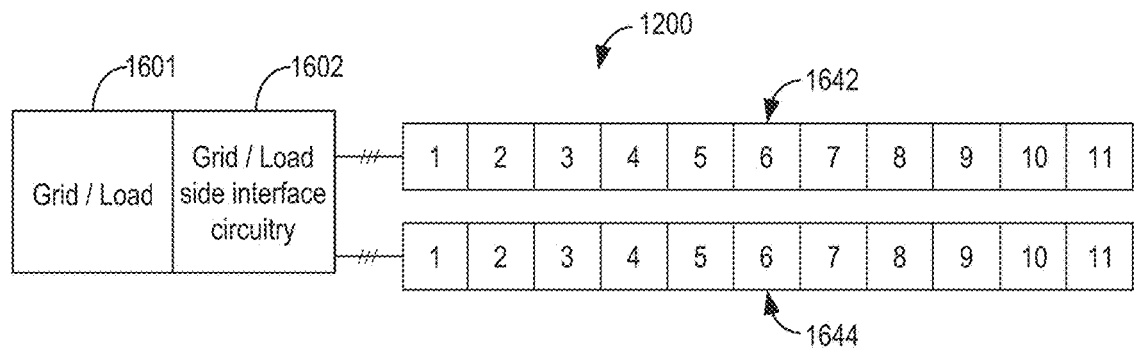
Figure 16E:
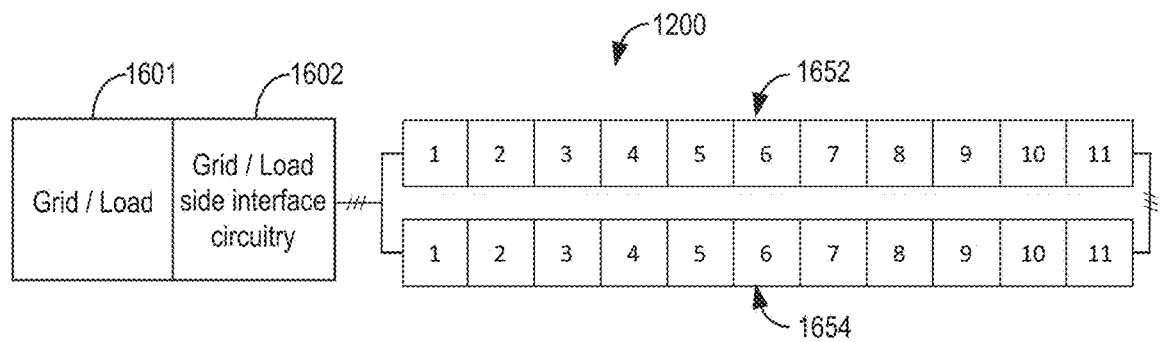
Figure 16F:
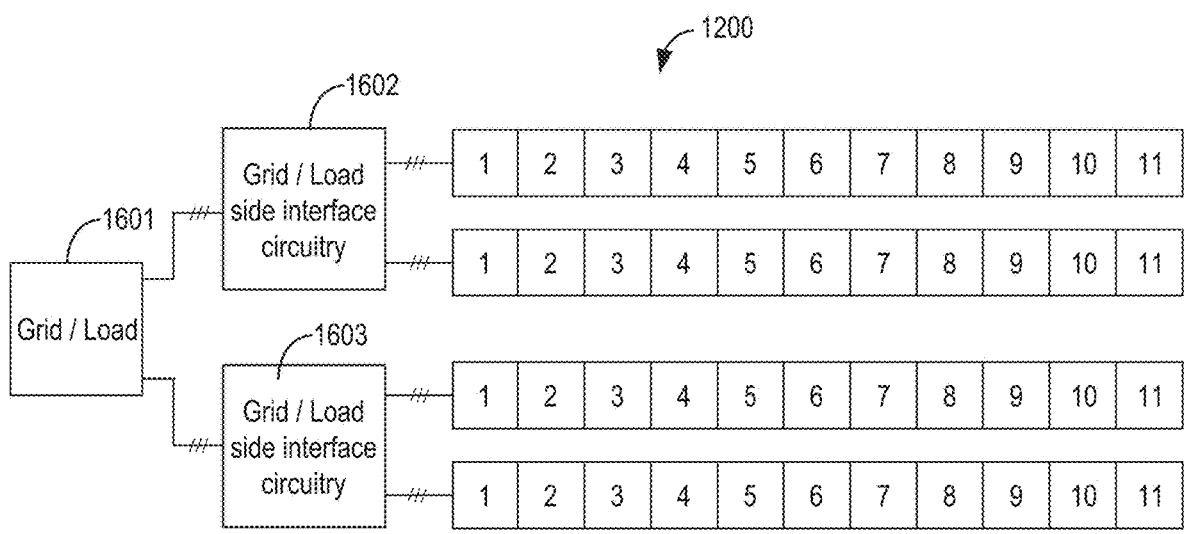
Figure 16G:
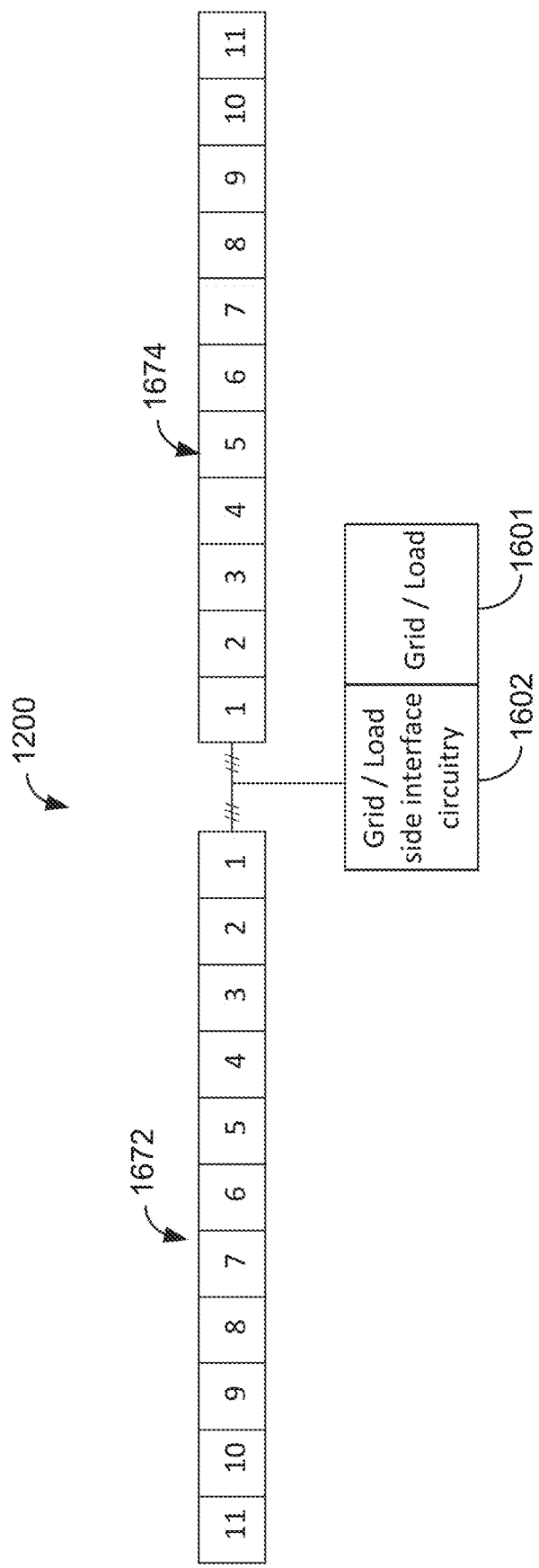

The frameworks 1200 described herein are configurable to the physical space or surroundings in which each is placed. FIGS. 16A-16G are block diagrams depicting example embodiments of frameworks 1200 for systems 100 with cabinets coupled to a grid and/or load 1601 through grid/load side interface circuitry 1602 (e.g., one or more fuses, switches, transformers, or others). FIGS. 16A-16C show examples with eleven cabinets 1201, FIGS. 16D, 16E, and 16G show examples with 22 cabinets, and FIG. 16F shows an example having forty-four cabinets. In FIG. 16A, the cabinets 1201 are arranged in a single row. In FIG. 16B, the cabinets 1201 are arranged in two rows to fit within a smaller physical space 1611 (e.g., a bunker or confined room). In FIG. 6C, the cabinets 1201 are arranged with a bend so as to permit placement along two walls 1620 and 1621 in a confined space. Framework 1200 can be arranged in any combination of one or more rows and/or one or more bends to permit customization to the limits of the physical space.

Multiple frameworks can be present to permit a broad range of topological configurations. For example, FIG. 16D shows an example framework 1200 with two eleven-cabinet systems 1642, 1644 (e.g., cabinet 1 can include interface circuitry (e.g., an inductive filter) and cabinets 2-11 contain 10 levels of the multi-level converter) connected independently to the grid/load side interface circuitry 1602. FIG. 16E shows another example framework 1200 with two eleven-cabinet systems 1652, 1654 connected in parallel, with the parallel arrangement in turn connected to the grid/load side interface circuitry 1602. FIG. 16F shows an example framework 1200 where two instances of the independent framework 1200-1 and 1200-2 of FIG. 16D are connected to the grid/load 1601 through separate interface circuitries 1602, 1603. Similar arrangement can be practiced with the parallel configuration of FIG. 16E. FIG. 16G shows a framework 1200 including two eleven-cabinet systems 1672, 1674 coupled to a common node that is then connected to the grid/load interface circuitry 1602.

Figure 17A:
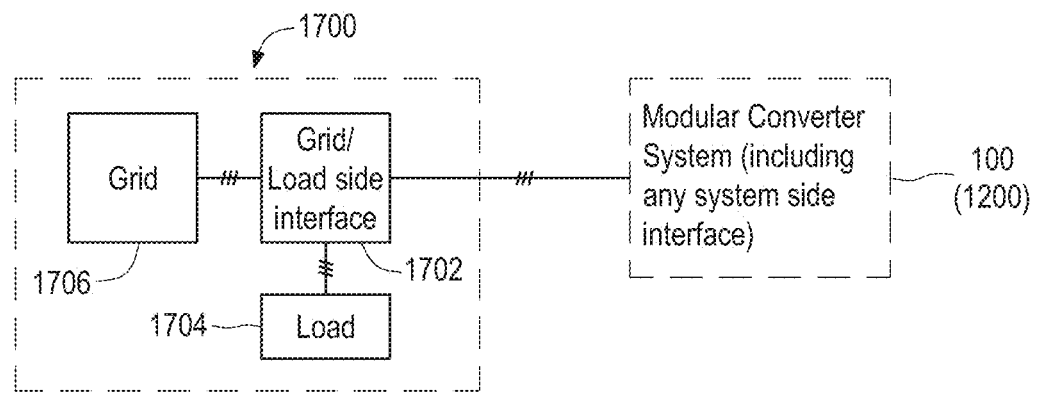
FIGS. 17A-17C are schematic diagrams depicting example embodiments for the grid, load, and respective interface circuitries.
Figure 17B:
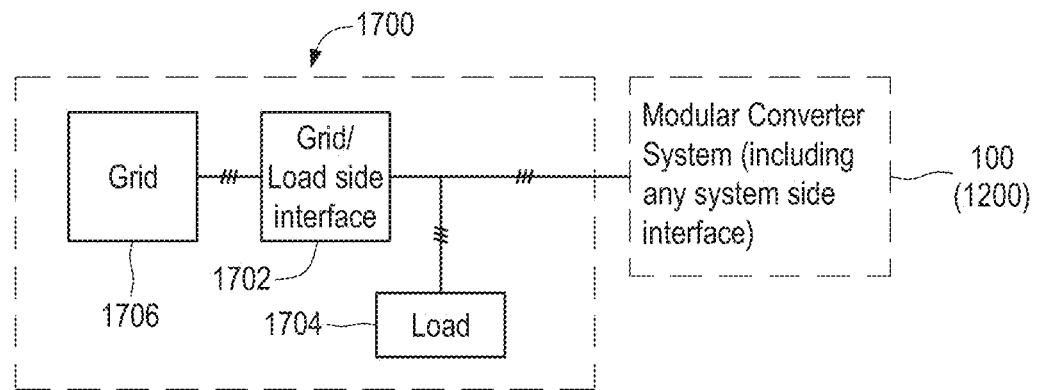
Figure 17C:
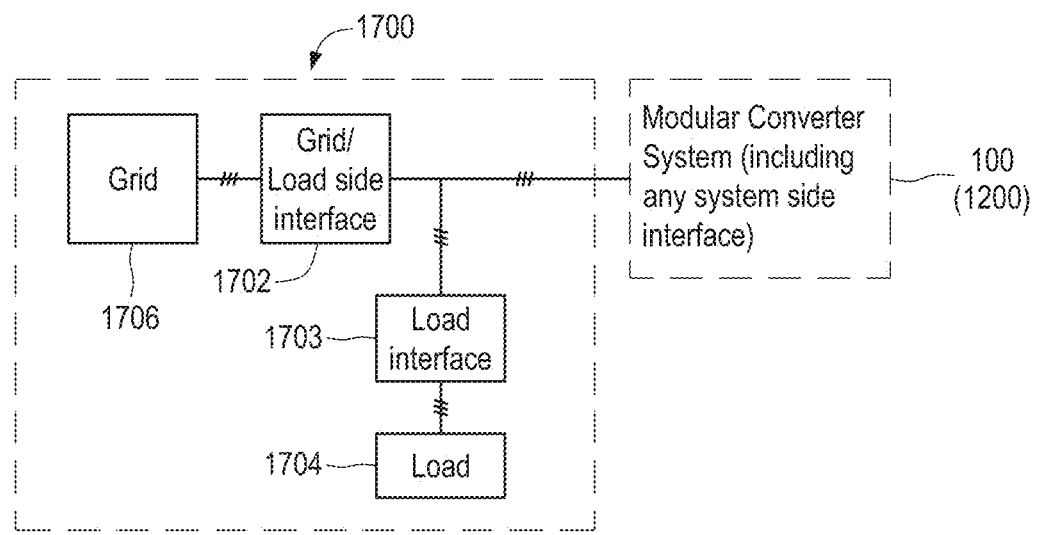

FIGS. 17A-17C are block diagrams depicting various configurations 1700 for the grid/load side, including grid 1706, load 1704, and respective interface circuitries 1702, 1703, that can include isolation circuitry, transformer circuitry, safety circuitry, and others, for any modular energy system 100 as described herein, including its system-side interface, optionally configured and installed according to a frameworks 1200 as described herein. FIG. 17A shows a configuration 1700 including a combination grid/load interface 1702 interposed between a power grid 1706 and a load 1704 and system 100. FIG. 17B shows a configuration 1700 including a direct connection between a load 1704 and system 100, and a grid interface 1702 interposed between a power grid 1706 and system 100. FIG. 17C shows a configuration 1700 including grid interface 1702 and separate load interface 1704, respectively interposed between power grid 1706 and load 1704 and system 100.

Figure 18:
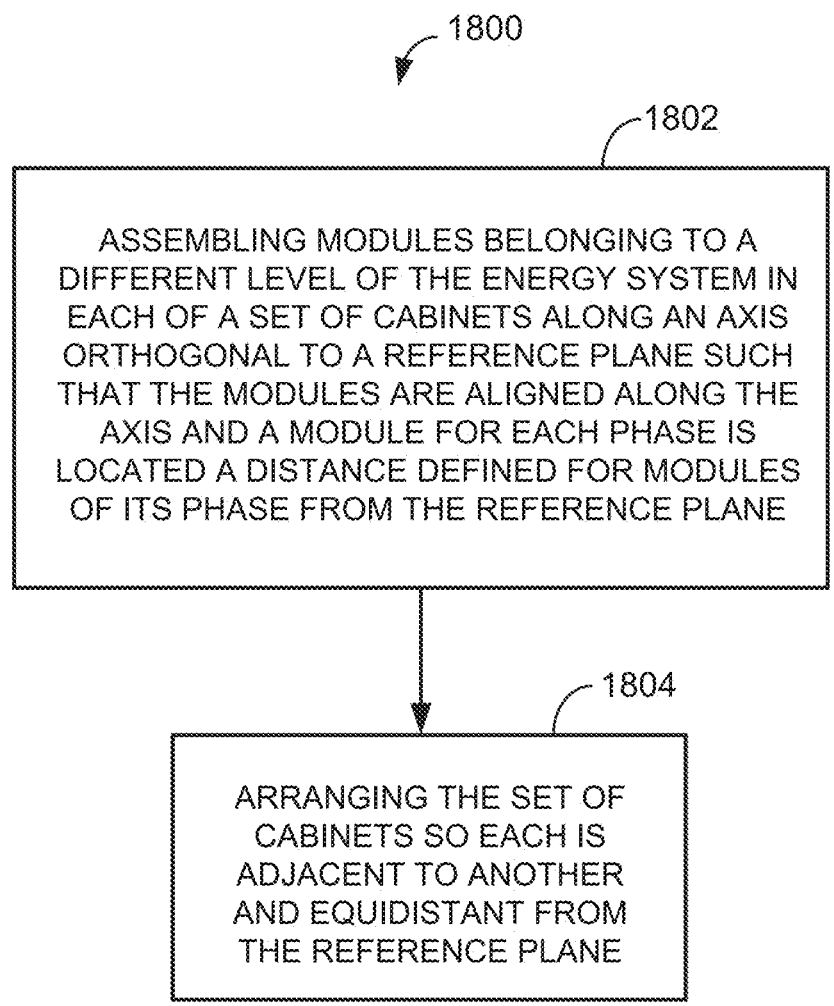
FIG. 18 is a flow chart depicting an example embodiment of a method for configuring a framework for multi-phase multi-level modular energy system.

FIG. 18 is a flow diagram depicting an example embodiment of a method 1800 for assembling an energy system 100 with modules 108 arranged in levels, where a different module 108 of each level services a different phase or array of the system. Method 1800 may include, at 1802, assembling modules belonging to a different level of the energy system in each of a set of cabinets along an axis orthogonal to a reference plane such that the modules are aligned along the axis and a module for each phase is located a distance defined for modules of its phase or array from the reference plane. The method 1800 may further include, at 1804, arranging the set of cabinets so each is adjacent to another and equidistant from the reference plane.

While the frameworks can be configured with interconnections between phases or arrays, such as through interconnection modules 108IC and delta and series configurations of FIGS. 7D-7E, these interconnected configurations can still be used with the embodiments described herein as the modules with interconnections are still within the phase of the row, although shared with one or more other phases or arrays. The framework provides an advantage for delta and series configurations as the interarray connections are between modules in close proximity based on the embodiments described herein.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated or taught otherwise.

In many embodiments, a framework for a multi-phase energy system including modules arranged in levels is provided, the framework including: an arrangement of cabinets, where each cabinet holds the modules belonging to a different level of the energy system along an axis orthogonal to a reference plane, such that the modules are aligned along the axis and a module for each phase is located a distance defined for modules of its phase from the reference plane; and where the cabinets are arranged adjacent to one another and equidistant from the reference plane.

In some embodiments, the arrangement minimizes distance for connections between modules belonging to different levels for the same phase across multiple cabinets.

In some embodiments, each of the modules includes identical sub-modules. The framework where the sub-modules can be housed separately from one another.

In some embodiments, the axis is a vertical axis and the reference plane is horizontal.

In some embodiments, each of the modules includes an energy source, a converter coupled to the energy source, and a local control device communicatively coupled for controlling the converter. The framework where the converter can include a plurality of switches configured to select an output voltage of the module under control of the local control device. The framework where the local control device and converter can be implemented together on a single printed circuit board. The framework where the local control device and converter can be housed within a common housing that does not house the energy source. The framework where the local control device, energy source, and converter can be housed within a common housing that does not house another module. The framework where the energy source can include a capacitor or a fuel cell. The framework where the energy source can include a battery. The framework where energy source can further include a first capacitor in parallel with the battery. The framework where the local control device can include a processor and memory, where the memory can include instructions that, when executed by the processor, cause the local control device to manage power transfer between the energy source and a cumulative load of the modules. The framework can further include a master control device for modules of the energy system communicatively coupled with the local control device. The framework can further include a coupling between the master control device and each local control device of the system. The framework where the master control device can include a processor and a memory communicatively coupled with the processor, where the memory can include instructions that when executed by the processor cause the master control device to coordinate control activity of the energy system with the local control device of each of the modules. The framework where the instruction can further include instructions for determining a contribution for each of the modules to output of the energy system.

In some embodiments, the energy system is configured for operation as a stationary energy system. The framework where the stationary energy system can be one of: a residential storage system; an industrial storage system; a commercial storage system; a governmental storage system; a system that converts solar power, wind, geothermal energy, fossil fuels, or nuclear reactions into electricity for storage; a data center storage system; a grid; a micro-grid; or a charging station.

In some embodiments, the energy system is configured for supplying 3-phase power.

In some embodiments, the modules comprise N levels each connected in series.

In some embodiments, the arrangement of cabinets includes the cabinets arranged in a single line having an output coupled to one or more of a load or a power grid.

In some embodiments, the arrangement of cabinets includes the cabinets arranged in lines coupled together to an output for coupling to one or more of a load or a power grid. The framework can further include interface circuitry interposed between the output and the one or more of a load or a power grid. The framework can further include an interface circuitry interposed between each of the lines and the output for the one or more of a load or a power grid. The framework where the interface circuitry can be coupled to both of the load and the power grid. The framework where the interface circuitry can be coupled to the grid only, and load is coupled to the output for the load only. The framework where the interface circuitry can include a first module interposed between the output and the grid only, and a second module interposed between the output and the load only.

In some embodiments, the framework further including terminal cabinet at a terminus of the arrangement of cabinets, the terminal cabinet containing one or more interconnection modules for combining output from each level of the energy system into a multi-phase single output. The framework where the terminal cabinet can include an interconnection module for each phase. The framework where the terminal cabinet can include an interconnection module receiving input for two or more phases.

In many embodiments, a framework for an energy system including a plurality of modules arranged in a plurality of arrays having a plurality of levels, the plurality of arrays configured to generate a plurality of AC power signals, and each AC power signal having a different phase angle is provided, where the framework includes: an arrangement of a plurality of cabinets, where each cabinet holds the modules belonging to a different level of the energy system along a first axis; and where the cabinets are arranged adjacent to one another along a second axis perpendicular to the first axis.

In some embodiments, the arrangement minimizes distance for connections between modules belonging to different levels for the same phase across multiple cabinets.

In some embodiments, each of the modules includes identical sub-modules. The framework where the sub-modules can be housed separately from one another.

In some embodiments, the first axis is a vertical axis and the second axis is a horizontal axis.

In some embodiments, each of the modules includes an energy source, a converter coupled to the energy source, and a local control device communicatively coupled to the converter and configured to control the converter. The framework where the converter can include a plurality of switches configured to select an output voltage of the module under control of the local control device. The framework where the local control device, energy source, and converter can be housed within a common housing that does not house another module. The framework where the energy source can include a capacitor or a fuel cell. The framework where the energy source can include a battery. The framework where the energy source can further include a first capacitor in parallel with the battery. The framework where the local control device can include a processor and memory, where the memory can include instructions that, when executed by the processor, cause the local control device to manage power transfer between the energy source and a cumulative load of the modules. The framework can further include a master control device for modules of the energy system communicatively coupled with the local control device. The framework can further include a coupling between the master control device and each local control device of the system. The framework where the master control device can include a processor and a memory communicatively coupled with the processor, where the memory can include instructions that when executed by the processor cause the master control device to coordinate control activity of the energy system with the local control device of each of the modules. The framework where the instruction can further include instructions for determining a contribution for each of the modules to output of the energy system.

In some embodiments, the energy system is configured for operation as a stationary energy system. The framework where the stationary energy system can be one of: a residential storage system; an industrial storage system; a commercial storage system; a governmental storage system; a system that converts solar power, wind, geothermal energy, fossil fuels, or nuclear reactions into electricity for storage; a data center storage system; a grid; a micro-grid; or a charging station.

In some embodiments, the energy system is configured for supplying 3-phase power.

In some embodiments, the arrays include N levels each connected in series.

In some embodiments, the arrangement of cabinets includes the cabinets arranged in a single line having an output coupled to one or more of a load or a power grid.

In some embodiments, the arrangement of cabinets includes the cabinets arranged in lines coupled together to an output for coupling to one or more of a load or a power grid. The framework can further include interface circuitry interposed between the output and the one or more of a load or a power grid. The framework can further include an interface circuitry interposed between each of the lines and the output for the one or more of a load or a power grid. The framework where the interface circuitry can be coupled to both of the load and the power grid. The framework where the interface circuitry can be coupled to the grid only, and load is coupled to the output for the load only. The framework where the interface circuitry can include a first module interposed between the output and the grid only, and a second module interposed between the output and the load only.

In some embodiments, the framework can further include terminal cabinet at a terminus of the arrangement of cabinets, the terminal cabinet including one or more interconnection modules for combining output from each level of the energy system into a multi-phase single output. The framework where the terminal cabinet can include an interconnection module for each phase. The framework where the terminal cabinet can include an interconnection module receiving input for two or more phases.

In some embodiments, the plurality of arrays comprise: a first array including a first plurality of modules configured to generate a first AC power signal having a first phase angle, where each of the first plurality of modules corresponds to a different level of the energy system; a second array including a second plurality of a first array including a second plurality of modules configured to generate a second AC power signal having a second phase angle where each of the second plurality of modules corresponds to a different level of the energy system; and a third array including a third plurality of modules configured to generate a third AC power signal having a third phase angle, where each of the third plurality of modules corresponds to a different level of the energy system. The framework where a first cabinet of the plurality of cabinets can hold a first module of the first plurality of modules, a second module of the second plurality of modules, and a third module of the third plurality of modules, where the first, second, and third modules are of the same level of the energy system. The framework where the plurality of cabinets can be configured such that a first row of the plurality of cabinets holds modules only from the first array, a second row of the plurality of cabinets holds modules only from the second array, and a third row of the plurality of cabinets holds modules only from the third array. The framework where the plurality of cabinets can be configured such that no two cabinets hold modules from the same level of the energy system. The framework where the first cabinet of the plurality of cabinets can hold a fourth module of the first plurality of modules, a fifth module of the second plurality of modules, and a sixth module of the third plurality of modules, where the fourth, fifth, and sixth modules are of the same level of the energy system, which is different from the level of the first, second, and third modules. The framework where the first plurality of modules can be located on a first row and a second row of the plurality of cabinets, the second plurality of modules are located on a third row and a fourth row of the plurality of cabinets, and the third plurality of modules are located on a fifth row and a sixth row of the plurality of cabinets. The framework where the modules can be arranged in each cabinet such that the modules alternate between levels.

In many embodiments, a method for assembling an energy system including modules arranged in levels, where a different module of each level services a different phase of the system is provided, the method including: assembling modules belonging to a different level of the energy system in each of a set of cabinets along an axis orthogonal to a reference plane such that the modules are aligned along the axis and a module for each phase is located a distance defined for modules of its phase from the reference plane; and arranging the set of cabinets so each is adjacent to another and equidistant from the reference plane.

A person of ordinary skill in the art would understand that the a "module" as that term is used herein, refers to a device or a sub-system within a larger system, and that system does not have to be configured to permit each individual module to be physically removable and replaceable with respect to the other modules. For example, a system may be packaged in a common housing that does not permit removal and replacement any one module, without disassembly of the system as a whole. However, any and all embodiments herein can be configured such that each module is removable and replaceable with respect to the other modules in a convenient fashion, such as without disassembly of the system.

The T term "master control device" is used herein in a broad sense and does not require implementation of any specific protocol such as a master and slave relationship with any other device, such as the local control device.

The term "output" is used herein in a broad sense, and does not preclude functioning in a bidirectional manner as both an output and an input. Similarly, the term "input" is used herein in a broad sense, and does not preclude functioning in a bidirectional manner as both an input and an output.

The terms "terminal" and "port" are used herein in a broad sense, can be either unidirectional or bidirectional, can be an input or an output, and do not require a specific physical or mechanical structure, such as a female or male configuration.

The term "framework" refers to a group of cabinets, racks, and/or equivalent structures for holding electronic components fixed to a reference plane of a larger structure (e.g., to a floor of a building or vessel), organized into an assembly or arrangement wherein modules are interconnected across different cabinets, racks, or equivalent structures of the framework.

Different reference number notations are used herein. These notations are used to facilitate the description of the present subject matter and do not limit the scope of that subject matter. Generally, a genus of elements is referred to with a number, e.g., "123", and a subgenus thereof is referred to with a letter appended to the number, e.g., 123A or 123B. References to the genus without the letter appendix (e.g., 123) refers to the genus as a whole, inclusive of all subgenuses. Some figures show multiple instances of the same element. Those elements may be appended with a number or a letter in a "–X" format, e.g., 123-1, 123-2, or 123-PA. This –X format does not imply that the elements must be configured identically in each instance, but is rather used to facilitate differentiation when referencing the elements in the figures. Reference to the genus 123 without the –X appendix broadly refers to all instances of the element within the genus.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In many of the aforementioned embodiments, the module-based energy system is configured for operation as a stationary energy system. In many of these embodiments, the stationary energy system is one of: a residential system, an industrial system, a commercial system, a data center storage system, a grid, a micro-grid, or a charging station.

Processing circuitry can include one or more processors, microprocessors, controllers, and/or microcontrollers, each of which can be a discrete or stand-alone chip or distributed amongst (and a portion of) a number of different chips. Any type of processing circuitry can be implemented, such as, but not limited to, personal computing architectures (e.g., such as used in desktop PC's, laptops, tablets, etc.), programmable gate array architectures, proprietary architectures, custom architectures, and others. Processing circuitry can include a digital signal processor, which can be implemented in hardware and/or software. Processing circuitry can execute software instructions stored on memory that cause processing circuitry to take a host of different actions and control other components.

Processing circuitry can also perform other software and/or hardware routines. For example, processing circuitry can interface with communication circuitry and perform analog-to-digital conversions, encoding and decoding, other digital signal processing, multimedia functions, conversion of data into a format (e.g., in-phase and quadrature) suitable for provision to communication circuitry, and/or can cause communication circuitry to transmit the data (wired or wirelessly).

Any and all signals described herein can be communicated wirelessly except where noted or logically implausible. Communication circuitry can be included for wireless communication. The communication circuitry can be implemented as one or more chips and/or components (e.g., transmitter, receiver, transceiver, and/or other communication circuitry) that perform wireless communications over links under the appropriate protocol (e.g., Wi-Fi, Bluetooth, Bluetooth Low Energy, Near Field Communication (NFC), Radio Frequency Identification (RFID), proprietary protocols, and others). One or more other antennas can be included with communication circuitry as needed to operate with the various protocols and circuits. In some embodiments, communication circuitry can share antenna for transmission over links. Processing circuitry can also interface with communication circuitry to perform the reverse functions necessary to receive a wireless transmission and convert it into digital data, voice, and/or video. RF communication circuitry can include a transmitter and a receiver (e.g., integrated as a transceiver) and associated encoder logic.

Processing circuitry can also be adapted to execute the operating system and any software applications, and perform those other functions not related to the processing of communications transmitted and received.

Computer program instructions for carrying out operations in accordance with the described subject matter may be written in any combination of one or more programming languages, including an object oriented programming language such as Java, JavaScript, Smalltalk, C++, C#, Transact-SQL, XML, PHP or the like and conventional procedural programming languages, such as the "C" programming language or similar programming languages.

Memory, storage, and/or computer readable media can be shared by one or more of the various functional units present, or can be distributed amongst two or more of them (e.g., as separate memories present within different chips). Memory can also reside in a separate chip of its own.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory. The terms "non-transitory" and "tangible" as used herein, are intended to describe memory, storage, and/or computer readable media excluding propagating electromagnetic signals, but are not intended to limit the type of memory, storage, and/or computer readable media in terms of the persistency of storage or otherwise. For example, "non-transitory" and/or "tangible" memory, storage, and/or computer readable media encompasses volatile and non-volatile media such as random access media (e.g., RAM, SRAM, DRAM, FRAM, etc.), read-only media (e.g., ROM, PROM, EPROM, EEPROM, flash, etc.) and combinations thereof (e.g., hybrid RAM and ROM, NVRAM, etc.) and variants thereof.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

The invention claimed is:

1. A framework for a multi-phase energy system, comprising:
   a plurality of modules arranges in a plurality of cabinets, wherein each module of the plurality of modules comprises an energy source configured to output a DC voltage having a value A, wherein A is a non-zero real number, a converter coupled with the energy source, and a local control device configured to control the converter to output a module voltage of +A volts, zero volts, or −A volts,
   wherein the plurality of modules are connected as a plurality of arrays, each array of the plurality of arrays comprising multiple modules of the plurality of modules, and each array of the plurality of arrays being configured to output an AC signal having a different phase angle, wherein the plurality of modules are stacked along an axis orthogonal to a reference plane such that modules of at least one same level are aligned along the axis, and
   wherein, for at least two adjacent levels of the plurality of arrays, modules are stacked in arrays such that modules within a same array are aligned substantially parallel in a horizontal direction relative to the reference plane,
   wherein the plurality of cabinets comprises a first subset of cabinets arranged in a first row and a second subset of cabinets arranged in a second row, the second subset of cabinets different from the first subset of cabinets.

2. The framework of claim 1, further comprising:
   a master control device communicatively coupled with local control devices of the plurality of modules, the master control device configured to provide control information to the local control devices of the plurality of modules;

wherein the local control device of each module from the plurality of modules is configured to control module voltage output by the module based on the control information from the master control device.

3. The framework of claim 1, wherein at least the first subset of cabinets or at least the second subset of cabinets comprises a terminal cabinet at a terminus position, the terminal cabinet comprising one or more interconnection modules configured to exchange energy between arrays.

4. The framework of claim 1, wherein the first subset of cabinets and the second subset of cabinets are colinear.

5. The framework of claim 1, wherein either the first subset of cabinets or the second subset of cabinets is coupled to a load, a power grid, or both a load and a power grid.

6. The framework of claim 5, wherein the multi-phase energy system is further configured to receive an input voltage from the power grid.

7. The framework of claim 5, wherein a first cabinet of the first subset of cabinets or the second subset of cabinets comprises interface circuitry for each of phase of the multi-phase energy system, and wherein the interface circuitry is interposed between a system output of the multi-phase energy system and one or more of the load or the power grid.

8. The framework of claim 1, wherein the first subset of cabinets and the second subset of cabinets are connected electrically in parallel to each other.

9. The framework of claim 1, wherein the first subset of cabinets and the second subset of cabinets are connected to a common node, and the common node is coupled to a load, a power grid, or both a load and a power grid.

10. The framework of claim 1, wherein the second row of the second subset of cabinets is substantially parallel to the first row of the first subset of cabinets.

11. The framework of claim 1, wherein the plurality of cabinets further comprise a third subset of cabinets arranged in a third row and a fourth subset of cabinets arranged in a fourth row, wherein the third subset of cabinets and the fourth subset of cabinets are different from both the first subset of cabinets and the second subset of cabinets, and wherein the third subset of cabinets is different from the fourth subset of cabinets.

12. The framework of claim 11, wherein the third row is substantially parallel to the fourth row.

13. The framework of claim 11, wherein the first subset of cabinets and the second subset of cabinets are connected to a first set of interface circuitry, and wherein the third subset of cabinets and the fourth subset of cabinets are connected to a second set of interface circuitry, the first set of interface circuitry connecting the first subset of cabinets and the second subset of cabinets to one or both of a first grid or a first load, and the second set of interface circuitry connecting the third subset of cabinets and the fourth subset of cabinets to one or both of a second grid or a second load.

14. A method for assembling a multi-phase energy system comprising a plurality of modules arranged in levels, wherein a different module of each level services a different phase of the multi-phase energy system, the method comprising:

assembling, from the plurality of modules, modules belonging to a different level of the multi-phase energy system in each of a plurality of cabinets along an axis orthogonal to a reference plane such that respective modules of at least one same level from the levels are aligned along the axis and a module for each phase is located a distance defined for modules of its phase from the reference plane, wherein each module comprises an energy source configured to output a DC voltage having a value A, a converter coupled with the energy source, and a local control device is configured to control the converter to output a module voltage of +A volts, zero volts, or −A volts, wherein A is a non-zero real number; and arranging the plurality of cabinets so each cabinet is adjacent to another and equidistant from the reference plane;

wherein the plurality of modules are connected as a plurality of arrays, each array comprising multiple modules, and each array being configured to output an AC signal having a different phase angle, wherein the modules within each array are connected as levels of that array such that the AC signal output by that array is a superposition of output voltages across corresponding levels of that array from each module of that array, wherein, for at least two adjacent levels of the plurality of arrays, modules are stacked in arrays such that modules within a same array are aligned substantially parallel in a horizontal direction relative to the reference plane, and wherein the plurality of cabinets comprises a first subset of cabinets arranged in a first row and a second subset of cabinets arranged in a second row, the second subset of cabinets different from the first subset of cabinets.

15. The method of claim 14, wherein the first subset of cabinets and the second subset of cabinets are colinear.

16. The method of claim 14, wherein the first subset of cabinets and the second subset of cabinets are connected electrically in parallel to each other.

17. The method of claim 14, wherein the first subset of cabinets and the second subset of cabinets are connected to a common node, and the common node is coupled to a load, a power grid, or both a load and a power grid.

18. The method of claim 14, wherein the plurality of cabinets further comprise a third subset of cabinets arranged in a third row and a fourth subset of cabinets arranged in a fourth row, wherein the third subset of cabinets and the fourth subset of cabinets are different from both the first subset of cabinets and the second subset of cabinets, and wherein the third subset of cabinets is different from the fourth subset of cabinets.

19. The method of claim 18, wherein the third row is substantially parallel to the fourth row.

20. The method of claim 18, wherein the first subset of cabinets and the second subset of cabinets are connected to a first set of interface circuitry, and wherein the third subset of cabinets and the fourth subset of cabinets are connected to a second set of interface circuitry, the first set of interface circuitry connecting the first subset of cabinets and the second subset of cabinets to one or both of a first grid or a first load, and the second set of interface circuitry connecting the third subset of cabinets and the fourth subset of cabinets to one or both of a second grid or a second load.

* * * * *